(12) United States Patent
Yoon et al.

(10) Patent No.: US 10,777,834 B2
(45) Date of Patent: Sep. 15, 2020

(54) METHOD FOR SUPPLYING MOLTEN CARBONATE FUEL CELL WITH ELECTROLYTE AND MOLTEN CARBONATE FUEL CELL USING THE SAME

(71) Applicant: KOREA INSTITUTE OF SCIENCE AND TECHNOLOGY, Seoul (KR)

(72) Inventors: Sung Pil Yoon, Seoul (KR); Jonghee Han, Seoul (KR); Hyung Chul Ham, Seoul (KR); Chang Won Yoon, Seoul (KR); Sun-Hee Choi, Seoul (KR); Hyun Seo Park, Seoul (KR); Yeong Cheon Kim, Seoul (KR); Chang-Whan Lee, Seoul (KR); Hyoung-Juhn Kim, Seoul (KR); Tae Hoon Lim, Seoul (KR); Suk Woo Nam, Seoul (KR); Seong Cheol Jang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 116 days.

(21) Appl. No.: 15/675,233

(22) Filed: Aug. 11, 2017

(65) Prior Publication Data
US 2018/0048009 A1   Feb. 15, 2018

(30) Foreign Application Priority Data

Aug. 12, 2016 (KR) .......... 10-2016-0103298
Aug. 7, 2017 (KR) .......... 10-2017-0099737

(51) Int. Cl.
*H01M 8/14* (2006.01)
*C01D 7/00* (2006.01)
(Continued)

(52) U.S. Cl.
CPC .......... *H01M 8/145* (2013.01); *C01D 7/00* (2013.01); *C25B 1/04* (2013.01); *C25B 1/14* (2013.01);
(Continued)

(58) Field of Classification Search
CPC .......... H01M 8/14–148; H01M 8/145; H01M 8/04283; H01M 2008/147;
(Continued)

(56) References Cited

U.S. PATENT DOCUMENTS 4,596,751 A * 6/1986 Kunz .................. H01M 8/142
429/474
5,413,878 A * 5/1995 Williams ............. B01D 53/326
429/425
(Continued)

FOREIGN PATENT DOCUMENTS

EP   0184971 B1   6/1986
JP   60-212963   * 10/1985 .......... H01M 8/144
(Continued)

OTHER PUBLICATIONS

JP60-212963, Giyouten, Machine Translation, Oct. 1985 (Year: 1985).*

(Continued)

*Primary Examiner* — Devina Pillay
(74) *Attorney, Agent, or Firm* — Cantor Colburn LLP

(57) ABSTRACT

Disclosed are a method for supplying molten carbonate fuel cell with electrolyte and a molten carbonate fuel cell using the same, wherein a molten carbonate electrolyte is generated from a molten carbonate electrolyte precursor compound in a molten carbonate fuel cell and is supplied to the molten carbonate fuel cell.

15 Claims, 26 Drawing Sheets

(51) Int. Cl.
*C25B 1/04* (2006.01)
*H01M 8/04276* (2016.01)
*C25B 1/14* (2006.01)
*C01D 3/12* (2006.01)
*C01D 15/04* (2006.01)

(52) U.S. Cl.
CPC .......... *H01M 8/04283* (2013.01); *C01D 3/12* (2013.01); *C01D 15/04* (2013.01); *H01M 2008/147* (2013.01); *H01M 2300/0051* (2013.01); *Y02E 60/366* (2013.01); *Y02E 60/526* (2013.01)

(58) Field of Classification Search
CPC ... H01M 2300/0051; C01D 7/00; C01D 3/12; C01D 15/04; C25B 1/14; Y02E 60/366; Y02E 60/526
See application file for complete search history.

(56) References Cited

U.S. PATENT DOCUMENTS

| | | | | |
|---|---|---|---|---|
| 5,983,488 | A * | 11/1999 | Erickson | H01M 8/0295 205/343 |
| 6,824,913 | B2 | 11/2004 | Hong et al. | |
| 7,743,861 | B2 * | 6/2010 | Grieve | F01D 15/02 180/65.31 |
| 2003/0096155 | A1 | 5/2003 | Hong et al. | |
| 2012/0021328 | A1 * | 1/2012 | Hilmi | H01M 8/0254 429/478 |
| 2012/0193222 | A1 * | 8/2012 | Mustain, Jr. | C25B 3/08 204/252 |
| 2012/0196204 | A1 * | 8/2012 | Yoon | H01M 8/0295 429/475 |
| 2018/0261865 | A1 * | 9/2018 | Jahnke | H01M 8/0681 |

FOREIGN PATENT DOCUMENTS

| | | |
|---|---|---|
| KR | 100300756 B1 | 9/2001 |
| KR | 20030036964 A | 5/2003 |
| KR | 1020080016858 A | 2/2008 |
| KR | 1020090130733 A | 12/2009 |
| KR | 1020110073926 A | 6/2011 |
| KR | 101374868 B1 | 3/2014 |
| WO | 2006124444 A2 | 11/2006 |

OTHER PUBLICATIONS

Konde, "Development of an Intermediate Temperature Molten Salt Fuel Cell" A thesis submitted to the faculty of the Worcester Polytechnic Institute in partial fulfillment of the requirements for the Degree of Master of Science (Year: 2009).*
Berger, "Investigation of Alkali Carbonate Transport Toward the Catalyst in Internal Reforming MCFCs", J. Electrochem. Soc., vol. 143, No. 10, Oct. 1996, pp. 3186-3191 (Year: 1996).*
Ditmars, Walter E. et al., Journal of the American Chemical Society, 1953, vol. 75, No. 8, pp. 1830-1832.
H. Morita, et al., "Degradation mechanism of molten carbonate fuel cell based on long-term performance: Long-term operation by using bench-scale cell and post-test analysis of the cell", Journal of Power Sources 195 (2010) 6988-6996.
J. Y. Youn et al., Journal of Power Sources, 2006, vol. 157, pp. 121-127.
K. Tanimoto et al., Journal of Power Sources, 1998, vol. 72, pp. 77-82.
M. D. Pietra et al., EFC 2013—Proceedings of the 5th European Fuel Cell Piero Lunghi Conference, 2013, pp. 363-364.
Y. Fujita, Handbook of Fuel Cell-Fundamentals, Technology and Applications, Edited by Wolf Vielstich et al., 2010, pp. 969-982.
Yaws, Carl L. et al., Handbook of Vapor Pressure: vol. 4: Inorganic Compounds and Elements. vol. 4. Gulf Professional Publishing, 1995, pp. 352-357.

* cited by examiner

METHOD FOR SUPPLYING MOLTEN CARBONATE FUEL CELL WITH ELECTROLYTE AND MOLTEN CARBONATE FUEL CELL USING THE SAME

CROSS-REFERENCE TO RELATED APPLICATION

This application claims priorities to Korean Patent Applications Nos. 10-2016-0103298, filed on Aug. 12, 2016 and 10-2017-0099737, filed on Aug. 7, 2017, and all the benefits accruing therefrom under 35 U.S.C. § 119, the contents of which in their entirety are herein incorporated by reference.

BACKGROUND

1. Field

This present disclosure relates to a method for supplying molten carbonate fuel cell with electrolyte and a molten carbonate fuel cell using the same.

2. Description of the Related Art

Molten carbonate fuel cells (hereinafter may be referred to as MCFC) are a kind of fuel cells producing electricity by an electrochemical reaction using hydrogen and oxygen, and use a molten carbonate (mainly binary or ternary eutectic mixture of $Li_2CO_3$, $K_2CO_3$, and $Na_2CO_3$) for an electrolyte as opposed to other fuel cells.

This electrolyte is melted at 400° C. or higher, and the carbonate ion $CO_3^{2-}$ generated by the cathodic reaction in the air electrode (for example, NiO electrode) at the operating temperature (620 to 650° C.) transfers to the fuel electrode (for example, Ni electrode) and reacts with hydrogen to generate water vapor and electrons.

Molten carbonate fuel cells may operate at a high temperature of 620 to 650° C. or higher and thus can achieve a power generation efficiency of 45% to 60% without using a noble metal electrode material such as platinum, unlike low temperature fuel cells (PEMFC and PAFC), and the molten carbonate fuel cells can achieve a fuel efficiency maximum of 85% when using the waste heat as well.

Moreover, molten carbonate fuel cells may have advantages that various fuels such as coal, petroleum, landfill gas, by-product gas of sewage treatment etc. can be used as well as a natural gas, and additional reforming is not required when natural gas is used, and cogeneration using waste heat of good quality is easy. Further, since carbon monoxide (CO) is also used as a kind of the fuel, there is no problem of poisoning by carbon monoxide (CO), which is a concern in low temperature fuel cells.

Such molten carbonate fuel cells have a number of advantages in production of large capacity electric power when being operated in an assembled stack, and thus are attracting attention as a next generation energy source.

In order to commercialize such MCFC, it is required to secure price stability and long-term driving stability, in particular, long-term driving stability of 40,000 hours or longer. However, the performance of MCFC may deteriorate by loss of electrolyte (molten carbonate) due to corrosion of the cell separating plate and the collector plate, evaporation of the electrolyte, and/or degradation of the fuel cell constituents, and it is thus actually difficult to secure long-term driving stability of 40,000 hours or longer.

Particularly, a $Li_2CO_3$— $Na_2CO_3$-based electrolyte or a $Li_2CO_3$—$K_2CO_3$-based electrolyte which are used as an electrolyte of the MCFC are both present in a liquid state at 500° C. or higher and thus can be easily consumed by corrosion. Furthermore, as the electrolyte starts being consumed by the vapor at the time of long-term operation (40,000 hours or longer), the MCFC has a fundamental problem of 'electrolyte loss' from the viewpoint of long-term operation as compared to other fuel cells using a solid electrolyte, namely, polymer electrolyte membrane fuel cells (PEFC) and solid oxide fuel cells (SOFC).

In case of the electrolyte loss, the performance of the fuel cell may deteriorate by an increase in the internal resistance (IR) and an increase in the polarization resistance as well as a decrease in the contact area among the gas, the electrolyte, and the electrode due to the electrolyte loss. In addition, in case where the electrolyte evaporates, since the volatility is different depending on each kind of carbonates, the physical properties may differ from the initial state when the mole fraction of the remaining electrolyte is changed, and this may adversely affect the long-term operation.

Meanwhile, in order to achieve the long-term operation, the electrolytic loss problem may be solved by performing a direct input of carbonates in a laboratory-sized unit cell.

However, it is difficult to input carbonates into a large-capacity stack by using such a method. In other words, it is difficult to refill additional electrolytes during actual operation of MCFC or MCFC stack since the molten carbonates ($Li_2CO_3$— $Na_2CO_3$-based electrolyte, $Li_2CO_3$—$K_2CO_3$-based electrolyte, or a mixed electrolyte thereof) to be used for an electrolyte of MCFC are solid at a room temperature and liquefied at temperatures of 400° C. or higher.

Hence, in order to refill the consumed or depleted electrolyte during the operation of MCFC, a method may be used in which the MCFC is cooled to a room temperature or a low temperature at which additional supply of electrolyte is possible, and an electrolyte slurry such as $Li_2CO_3$— $Na_2CO_3$-based electrolyte or $Li_2CO_3$—$K_2CO_3$-based electrolyte is additionally supplied into the MCFC. Alternatively, a method may be used in which a structure capable of refilling an electrolyte into the MCFC or MCFC stack structure, namely, an additional structure such as an electrolyte supply pipe may be provided to additionally supply the consumed electrolyte.

However, according to the observation of the present inventors, it is difficult to commercialize MCFC or MCFC stack having such an additional structure of the electrolyte supply pipe since it causes structural complexity and an increase in manufacturing cost. In addition, in case of lowering the temperature of MCFC to a room temperature or a temperature lower than the operating temperature during MCFC operation, cracks may be formed in the MCFC matrix as the constituents of the fuel cell, such as the matrix, are physically deformed by the impact due to the coagulation of the electrolyte or the difference in coefficient of thermal expansion between the constituents. As a result, a cross-over phenomenon may occur between reactant gases, resulting in deterioration of fuel cell performance and shortened lifetime. Furthermore, particularly in case of MCFC stack, electrolyte refilling causes significant inconvenience and is very impractical as it is required to lower the temperature from the operating temperature to a temperature at which the electrolyte can be input, to disassemble the stack itself, and to add a solid or liquid electrolyte from the outside.

SUMMARY

According to example embodiments of the present invention, in an aspect, provided is a method for supplying molten carbonate fuel cell with electrolyte and a molten carbonate fuel cell using the same, where it is possible to easily refill an electrolyte of molten carbonate fuel cell, for example, at a temperature and/or pressure at which the molten carbonate fuel cell is operated, without disassembling the molten carbonate fuel cell or a stack structure including the molten carbonate fuel cell or lowering its operating temperature.

According to example embodiments of the present invention, in another aspect, provided is a method for supplying molten carbonate fuel cell with electrolyte and a molten carbonate fuel cell using the same, where it is possible to increase the operating time by solving the problems that the temperature of the molten carbonate fuel cell is increased and the electrode structure is changed by the consumption or depletion of the electrolyte and the accompanying crossover phenomenon and as a result the performance of the molten carbonate fuel cell deteriorates and the operation time is limited.

According to example embodiments of the present invention, in still another aspect, provided is a method for supplying molten carbonate fuel cell with electrolyte and a molten carbonate fuel cell using the same, where it is possible to easily refill the molten carbonate electrolyte directly in the interior of MCFC, even in case that the MCFC exhibits relatively low performance caused by problems such as mechanical defects including matrix cracks or pinholes and/or shortage of molten carbonate electrolyte etc.

In example embodiments of the present invention, a method for supplying molten carbonate fuel cell with electrolyte may include generating a molten carbonate electrolyte from a molten carbonate electrolyte precursor compound in a molten carbonate fuel cell, thereby providing the molten carbonate electrolyte to the molten carbonate fuel cell.

In an example embodiment, a molten carbonate electrolyte may be generated from at least one of carbonate ion, carbon dioxide and oxygen; and the molten carbonate electrolyte precursor compound.

In an example embodiment, the method may include supplying a molten carbonate electrolyte precursor compound to a first electrode and supplying a reaction gas containing carbon dioxide to a second electrode. The carbonate ion may be generated from the reaction gas and transferred to an electrochemical reaction site in the first electrode. Carbon dioxide may not be supplied to the first electrode.

In an example embodiment, the molten carbonate electrolyte precursor compound may be supplied to the first electrode in a gaseous state.

In an example embodiment, a mixed gas of a gaseous molten carbonate electrolyte precursor compound and a carrier gas which does not react with the first electrode may be provided to the first electrode.

In an example embodiment, a molten carbonate electrolyte precursor compound powder may be melted and provided to the first electrode in a gaseous state.

In an example embodiment, a molten carbonate electrolyte precursor compound powder may be dissolved in a solvent, then heated, and provided to the first electrode in a gaseous state.

In an example embodiment, the molten carbonate electrolyte precursor compound may react with at least one of carbonate ion, carbon dioxide, and oxygen to form a molten carbonate electrolyte, and the molten carbonate electrolyte precursor compound may be a material having a higher vapor pressure than lithium carbonate ($Li_2CO_3$), sodium carbonate ($Na_2CO_3$), or potassium carbonate ($K_2CO_3$) at an operating temperature of molten carbonate fuel cell.

In an example embodiment, a temperature at which a molten carbonate electrolyte precursor is input may be equal to or different from MCFC temperature or MCFC operating temperature.

In an example embodiment, a molten carbonate electrolyte precursor compound may be a compound containing at least one selected from the group consisting of lithium (Li), sodium (Na), and potassium (K); or a compound comprising at least one selected from the group consisting of lithium (Li), sodium (Na) and potassium (K) and additionally comprising at least one selected from the group consisting of cesium (Cs), lanthanum (La), and rubidium.

In an example embodiment, a molten carbonate electrolyte precursor compound may contain LiI and KI.

In an example embodiment, a molten carbonate electrolyte precursor compound may be at least one selected from the group consisting of metal lithium (Li), $Li_2O$, LiOH and a hydrate of LiOH, LiF, LiCl, LiI, $Li_3N$, $LiNH_2$, $Li_2C_2$, $LiMoO_4$, $LiAlH_4$, LiSn, LiPb, LiTi, LiHg, $Li_3Sb_2$, $Li_3Bi$, $Li_2SO_4$, $LiOCH_3$, $LiOC_2H_5$, metal sodium (Na), $Na_2O$, NaOH and a hydrate of NaOH, NaF, NaCl, NaI, $Na_3N$, $NaNH_2$, $Na_2SO_4$, $Na_2C_2O_4$, $NaC_2H_3O_2$, $NaOCH_3$, $NaOC_2H_5$, metal potassium (K), $K_2O$, KOH and a hydrate of KOH, KF, KCl, KI, $K_3N$, $KNH_2$, and $K_2SO_4$.

In an example embodiment, a molten carbonate electrolyte may be Li—K-based molten carbonate electrolyte, Li—Na-based molten carbonate electrolyte, or Li—Na—K-based molten carbonate electrolyte; or a molten carbonate electrolyte may be Li—K-based molten carbonate electrolyte, Li—Na-based molten carbonate electrolyte, or Li—Na—K-based molten carbonate electrolyte which additionally comprises at least one selected from the group consisting of $Cs_2CO_3$, $Rb_2CO_3$, and $La_2CO_3$.

In an example embodiment, a molten carbonate fuel cell may be operated in a water electrolysis mode wherein a current is applied. Herein, a first electrode may be an air electrode and a second electrode may be a fuel electrode. A reaction gas containing hydrogen, carbon dioxide and water vapor may be supplied to a fuel electrode, or a reaction gas containing carbon dioxide and oxygen or oxygen-containing gas in an oxygen partial pressure range in which the fuel electrode is not oxidized may be supplied to a fuel electrode. Carbonate ion generated in the fuel electrode by applying a current in a water electrolysis mode may transfer to an air electrode and generate a molten carbonate electrolyte by a reaction with a molten carbonate electrolyte precursor compound vapor at an electrochemical reaction site in the air electrode.

In an example embodiment, a molten carbonate fuel cell may be operated in a fuel cell mode wherein a current is output. Herein, a first electrode may be a fuel electrode and a second electrode may be an air electrode. A reaction gas containing oxygen or an oxygen-containing gas and carbon dioxide may be supplied to the air electrode. Carbonate ion generated in the air electrode by generating a current in the fuel cell mode may transfer to the fuel electrode and generate a molten carbonate electrolyte by a reaction with a molten carbonate electrolyte precursor compound vapor at an electrochemical reaction site in the fuel electrode.

In an example embodiment, a molten carbonate electrolyte may be generated by a reaction of at least one of oxygen and carbon dioxide generated from carbonate ion with a molten carbonate electrolyte precursor compound.

In an example embodiment, oxygen generated from carbonate ion may react with a molten carbonate electrolyte precursor compound to produce a molten carbonate electrolyte intermediate precursor compound, and this molten carbonate electrolyte intermediate precursor compound may react with carbon dioxide generated from carbonate ion to generate a molten carbonate electrolyte.

In an example embodiment, the method may include supplying a molten carbonate electrolyte precursor compound to a first electrode and supplying a reaction gas containing carbon dioxide to a second electrode. Carbon dioxide may not be supplied to the first electrode.

In electrochemical methods (water electrolysis mode and fuel cell mode), the carbonate ion generated in proportion to the amount of current applied (electrolysis mode) or the amount of current generated (fuel cell mode) transfers to the electrochemical reaction site in the first electrode and may directly react with the molten carbonate electrolyte precursor compound vapor in the first electrode or oxygen and carbon dioxide generated at the electrochemical reaction site in the first electrode may react with the molten carbonate electrolyte precursor compound vapor to generate a molten carbonate electrolyte.

In methods using concentration and pressure differences (for example at matrix cracks or pores, electrolyte wet seal areas, and the like), the reaction gas may transfer to the first electrode side by either of the concentration difference of the reaction gases between the first and second electrodes or the pressure difference between the first and second electrodes and react with the molten carbonate electrolyte precursor compound vapor to generate a molten carbonate electrolyte. Carbon dioxide may not be supplied to the first electrode.

In an example embodiment, a reaction gas to be supplied to a second electrode may contain carbon dioxide, water vapor and hydrogen or may contain carbon dioxide and oxygen or oxygen-containing gas.

In an example embodiment, a molten carbonate electrolyte may be generated by a reaction of at least one of carbon dioxide and oxygen with a molten carbonate electrolyte precursor compound.

In an example embodiment, a molten carbonate electrolyte may be provided when an incidence rate of nitrogen cross-over in a fuel electrode of a molten carbonate fuel cell is within 1% under a normal operating condition.

Meanwhile, in example embodiments of the present invention, a molten carbonate fuel cell may comprise a matrix containing a molten carbonate electrolyte; and first and second electrodes disposed to face each other with the matrix interposed therebetween, wherein a molten carbonate electrolyte is generated from a molten carbonate electrolyte precursor compound in a molten carbonate fuel cell and the molten carbonate electrolyte is provided to the molten carbonate fuel cell.

In an example embodiment, the molten carbonate fuel cell may comprise one or more first gas supply devices connected to the first electrode to supply a gaseous molten carbonate electrolyte precursor compound to the first electrode; and one or more second gas supply devices connected to the second electrode to supply a reaction gas containing carbon dioxide to the second electrode.

In an example embodiment, the molten carbonate fuel cell may comprise a first carrier gas supply device connected to the first gas supply device; and a second carrier gas supply device connected to the second gas supply device, wherein one or more first carrier gas supply devices are provided and at least one first carrier gas supply device is connected to one first gas supply device and one or more second carrier gas supply devices are provided and at least one second carrier gas supply device is connected to one second gas supply device.

In an example embodiment, the molten carbonate fuel cell may comprise a molten carbonate electrolyte precursor vessel for storing a molten carbonate electrolyte precursor compound and providing a molten carbonate electrolyte precursor compound to the first electrode, wherein the vessel is mounted or connected to one or more first gas supply devices.

In an example embodiment, in the molten carbonate fuel cell, the vessel may be configured to melt and vaporize a carbonate electrolyte precursor compound by heating.

In an example embodiment, in the molten carbonate fuel cell, the vessel may be configured to dissolve a molten carbonate electrolyte precursor compound powder in a solvent, to heat the solution, and to provide the molten carbonate electrolyte precursor compound powder in a gaseous state.

In an example embodiment, in the molten carbonate fuel cell, the vessel may include a thermocouple for monitoring a temperature of the vessel, the molten carbonate fuel cell may include a heating device for controlling a temperature of the vessel, and the heating device may be mounted to the first gas supply device so as to enclose the vessel.

BRIEF DESCRIPTION OF THE DRAWINGS

The above and other aspects, features and advantages of the disclosed example embodiments will be more apparent from the following detailed description taken in conjunction with the accompanying drawings in which:

FIGS. 1H and 1I are schematic conceptual views illustrating the mechanism for supplying a molten carbonate electrolyte by using the pressure difference or the concentration difference of a carbon dioxide-containing reaction gas between the first electrode and the second electrode and LiOHl/NaOH/KOH in an example embodiment of the present invention, and a water electrolysis mode (FIG. 1H) and a fuel cell mode (FIG. 1I) are illustrated, respectively;

FIGS. 4 and 5 are photographs and drawings illustrating a molten carbonate electrolyte precursor vessel and a thermocouple according to example embodiments of the present invention, wherein FIG. 4 is a photograph of an electrolyte precursor vessel for adding a small amount of electrolyte, and FIG. 5 is an electrolyte precursor vessel which is in the form of a saturator to add a large amount of electrolyte and includes a device for supplying a carrier gas;

DESCRIPTION OF REFERENCE NUMERALS

Figure 1A:
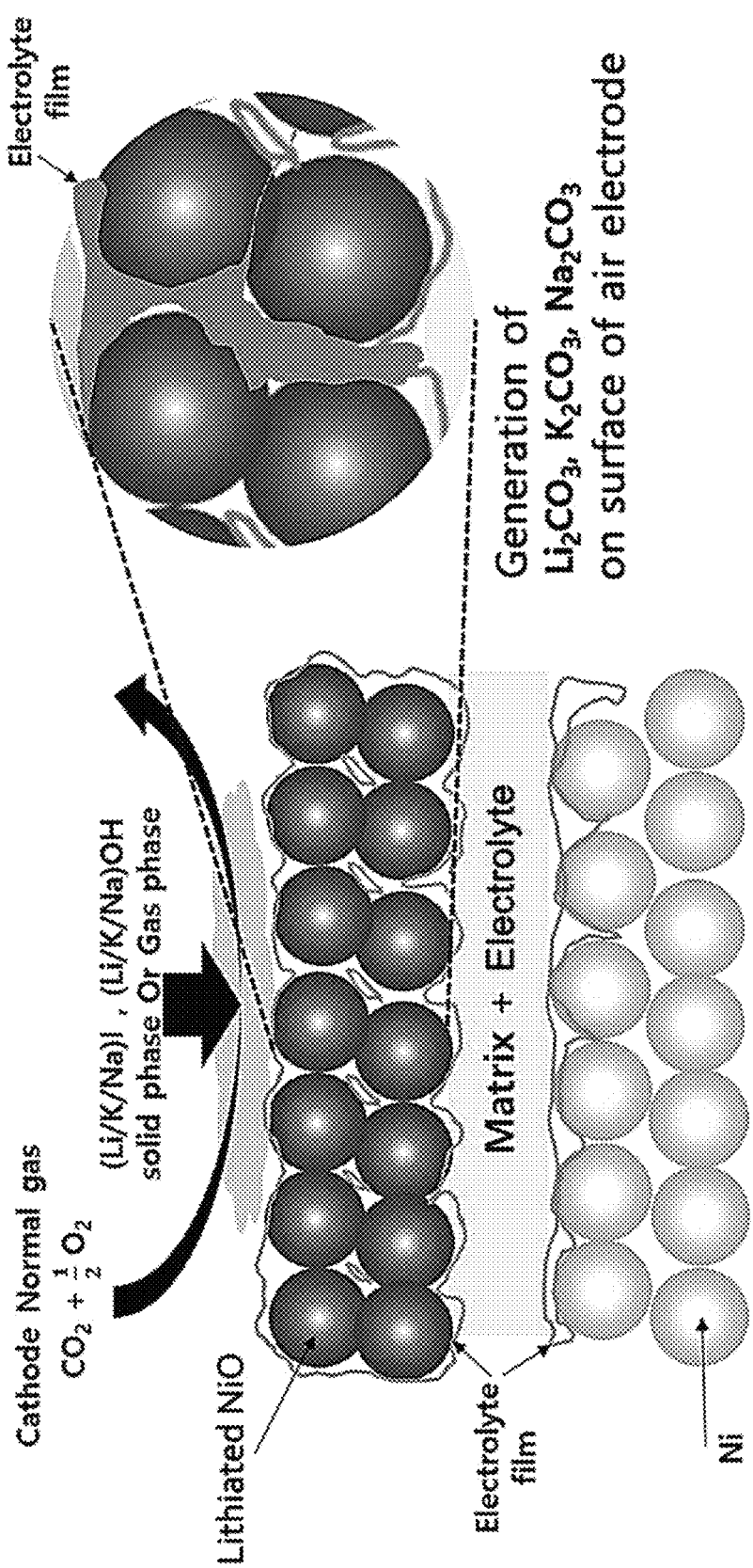
FIG. 1A is a schematic conceptual view illustrating a mechanism for generating a molten carbonate electrolyte in a molten carbonate fuel cell by providing a molten carbonate electrolyte precursor in an example embodiment of the present invention.

100: Molten carbonate fuel cell (MCFC)
110: Matrix
120 and 130: First and second electrodes
140 and 150: First and second gas supply devices
145 and 155: First and second carrier gas supply devices
160: Molten carbonate electrolyte precursor vessel
161: Storage of molten carbonate electrolyte precursor vessel
162: Thermocouple
170: Power supply device
180: Current supply device
190: Heating device
200: Molten carbonate fuel cell (MCFC) stack

DETAILED DESCRIPTION

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Term Definition

In this disclosure, the term that a molten carbonate fuel cell is operated in a water electrolysis mode means that an electrolysis reaction takes place in a fuel electrode of the molten carbonate fuel cell so as to generate hydrogen from water as a current is applied to the molten carbonate fuel cell from the outside.

In this disclosure, the term that a molten carbonate fuel cell is operated in a fuel cell mode means that a fuel cell reaction takes place and thus a current is generated (output) from the molten carbonate fuel cell and water is generated.

In this disclosure, an air electrode means an air electrode that supplies air (oxygen) which is referred as such usually in a fuel cell, and a fuel electrode means a fuel electrode that supplies fuel (hydrogen) which is referred as such usually in a fuel cell.

In this disclosure, the term that a cross-over phenomenon occurs means that hydrogen gas supplied to a fuel electrode of a molten carbonate fuel cell and oxygen gas supplied to an air electrode of the molten carbonate fuel cell are physically and chemically mixed.

In this disclosure, the term that a $N_2$ cross-over phenomenon occurs in a molten carbonate fuel cell (MCFC) means that a nitrogen concentration increases to a certain value or more at an outlet portion of a fuel electrode when air and carbon dioxide (for example, usually under a condition having an oxygen utilization rate of 40%) are put as the air electrode gas of the molten carbonate fuel cell and hydrogen, carbon dioxide, and water vapor (for example, usually under a condition having a hydrogen utilization rate of 40%) are put as the fuel electrode gas.

Typically, it may be predicted that a performance of MCFC begins to deteriorate by the depletion of the molten carbonate electrolyte when the incidence rate of nitrogen cross-over is 1% or more. The incidence rate of nitrogen cross-over may be calculated by measuring a gas composition at an outlet of a fuel electrode of a molten carbonate fuel cell by gas chromatography.

In this disclosure, the expression that performances of molten carbonate fuel cell (MCFC) begin to deteriorate means that the incidence rate of nitrogen cross-over increases to 1% or more at a fuel electrode of MCFC. A molten carbonate electrolyte may be additionally supplied at the time point at which the performance of the molten carbonate fuel cell begins to deteriorate. However, only the degree of recovery of cell performance is affected but the effect by an electrolyte addition method of example embodiments of the present invention is the same even if the electrolyte addition method of example embodiments of the present invention is used before or after the incidence rate of nitrogen cross-over reaches 1%.

Hereinafter, example embodiments of the present invention will be described in detail with reference to the accompanying drawings.

Method of Supplying Electrolyte of Molten Carbonate Fuel Cell

Figure 1B:
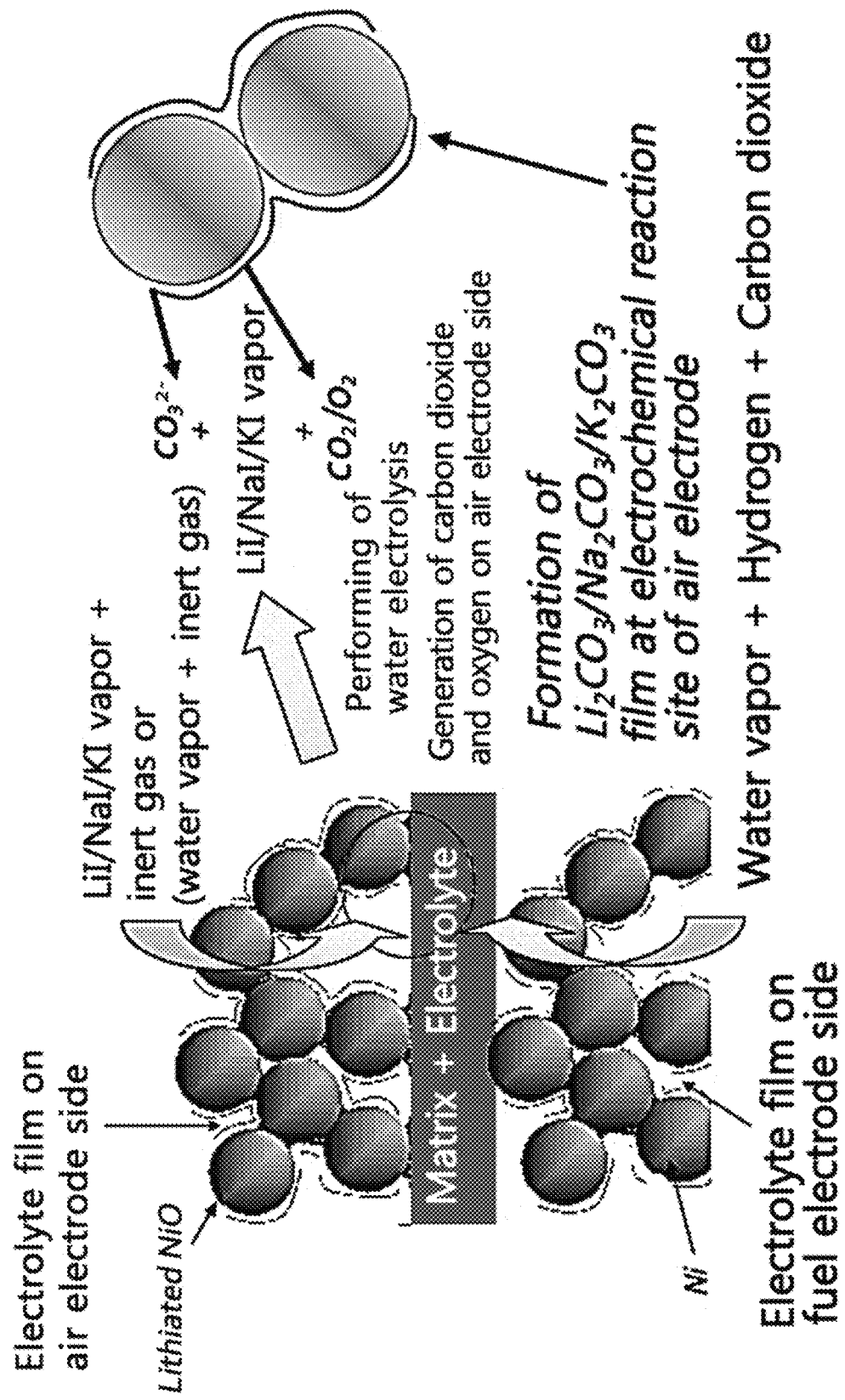
FIG. 1B is a schematic conceptual view illustrating a mechanism for supplying a molten carbonate electrolyte in a water electrolysis mode by using LiI/NaI/KI in an example embodiment of the present invention.
Figure 1C:
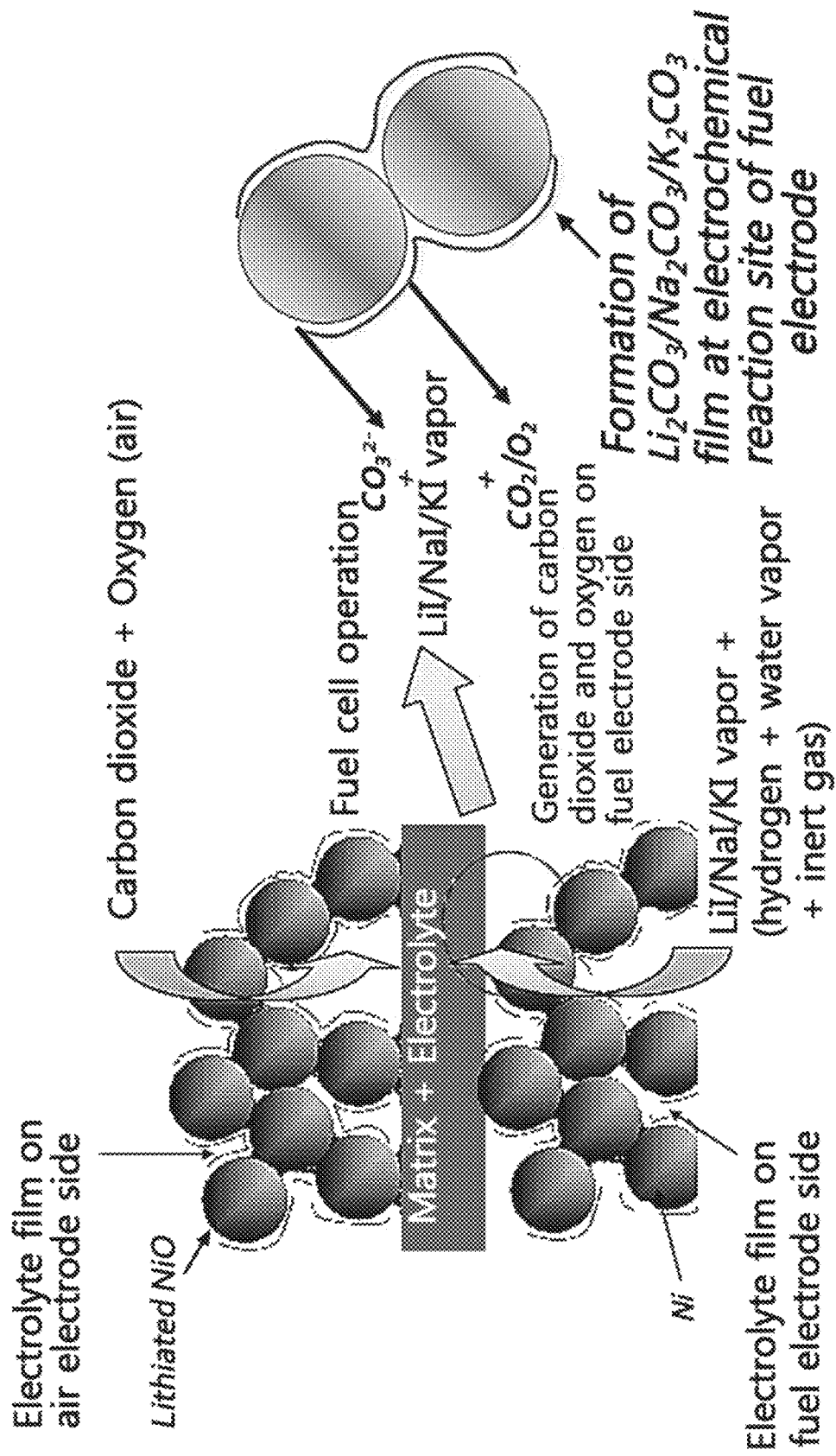
FIG. 1C is a schematic conceptual view illustrating the mechanism for supplying a molten carbonate electrolyte in a fuel cell mode by using LiI/NaI/KI in an example embodiment of the present invention.
Figure 1D:
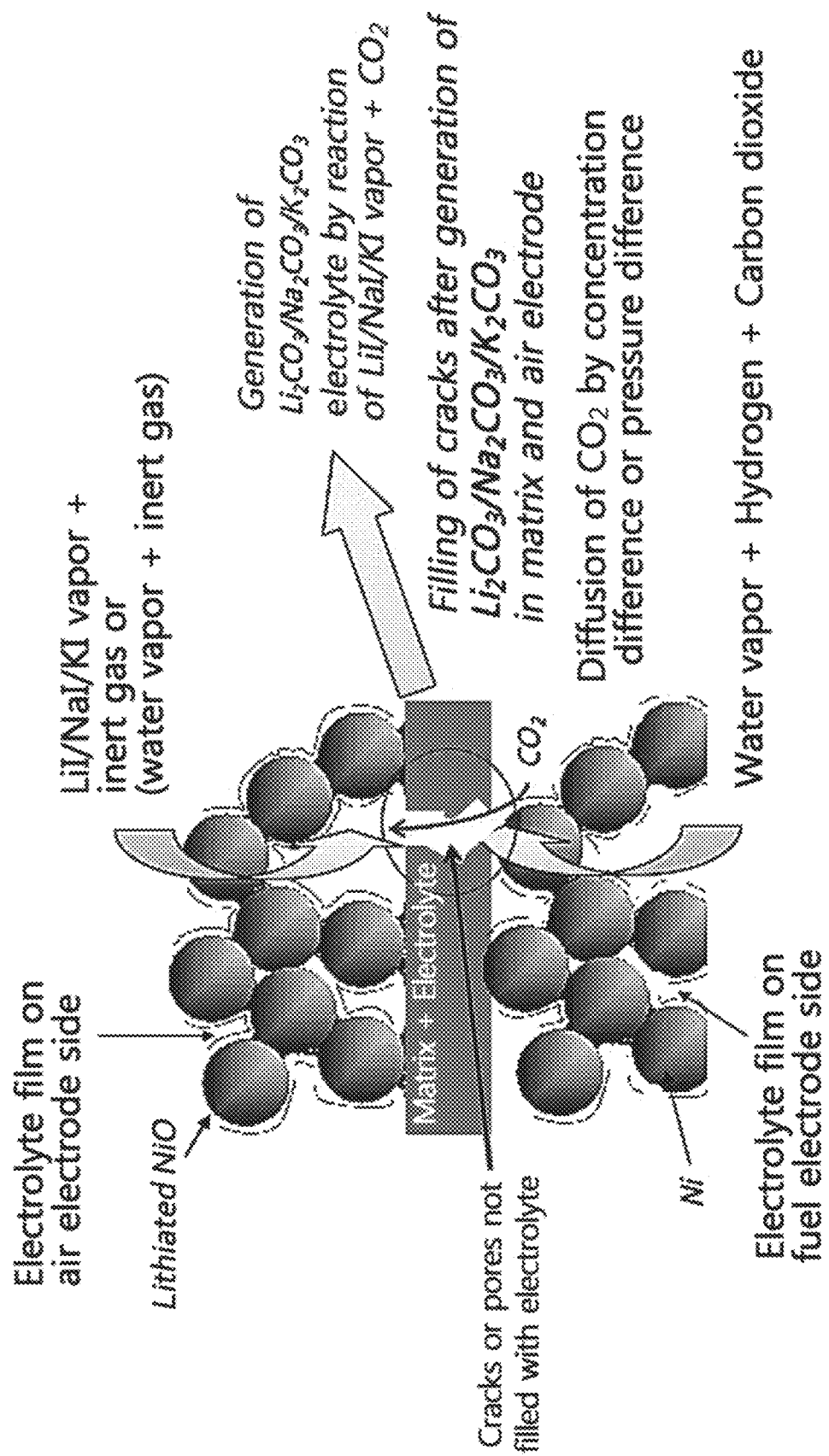
FIGS. 1D and 1E are schematic conceptual views illustrating the mechanism for supplying a molten carbonate electrolyte by using the pressure or the concentration difference of a carbon dioxide-containing reaction gas between the first electrode and the second electrode and LiI/NaI/KI in an example embodiment of the present invention, and a water electrolysis mode (FIG. 1D) and a fuel cell mode (FIG. 1E) are illustrated, respectively.
Figure 1E:
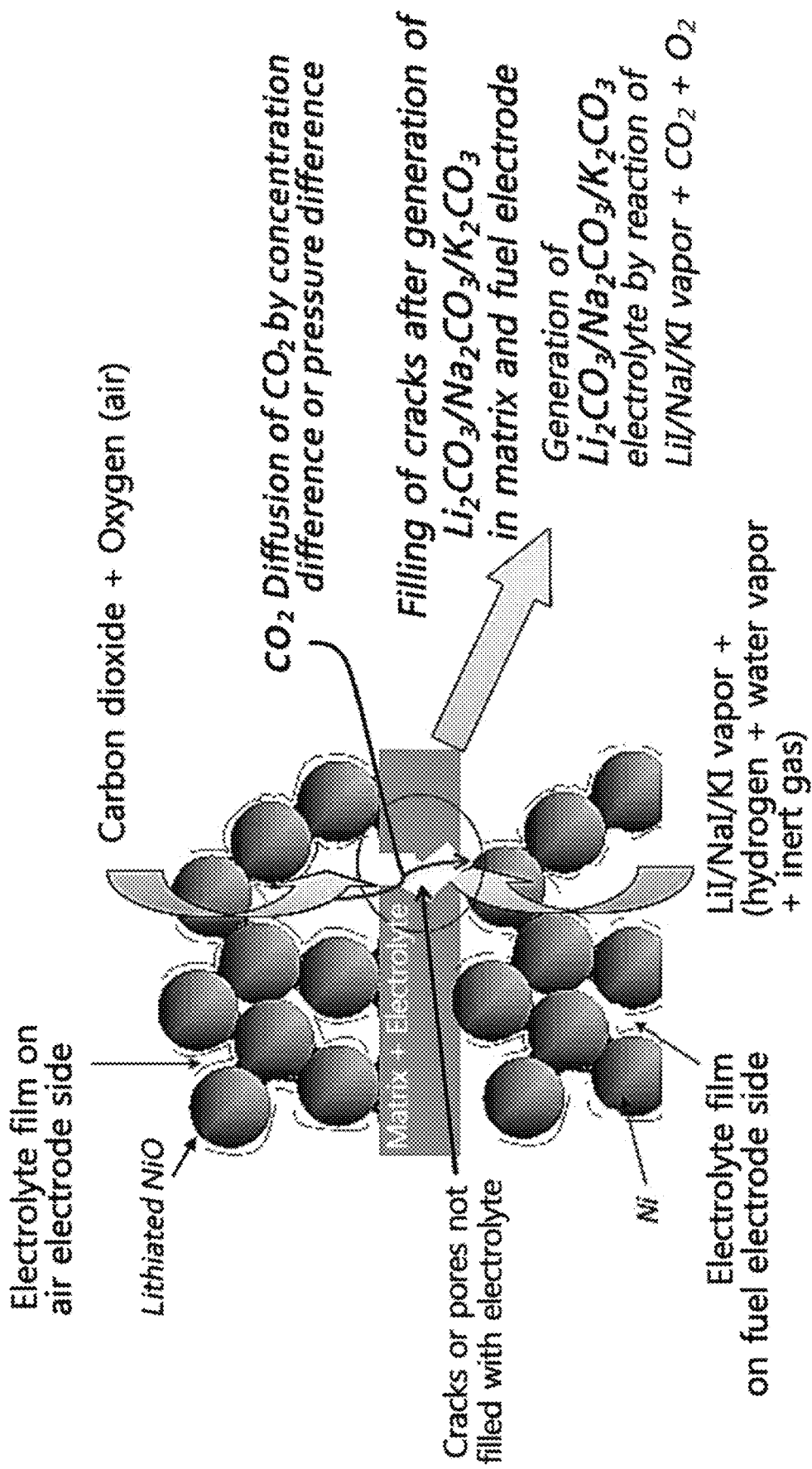
Figure 1F:
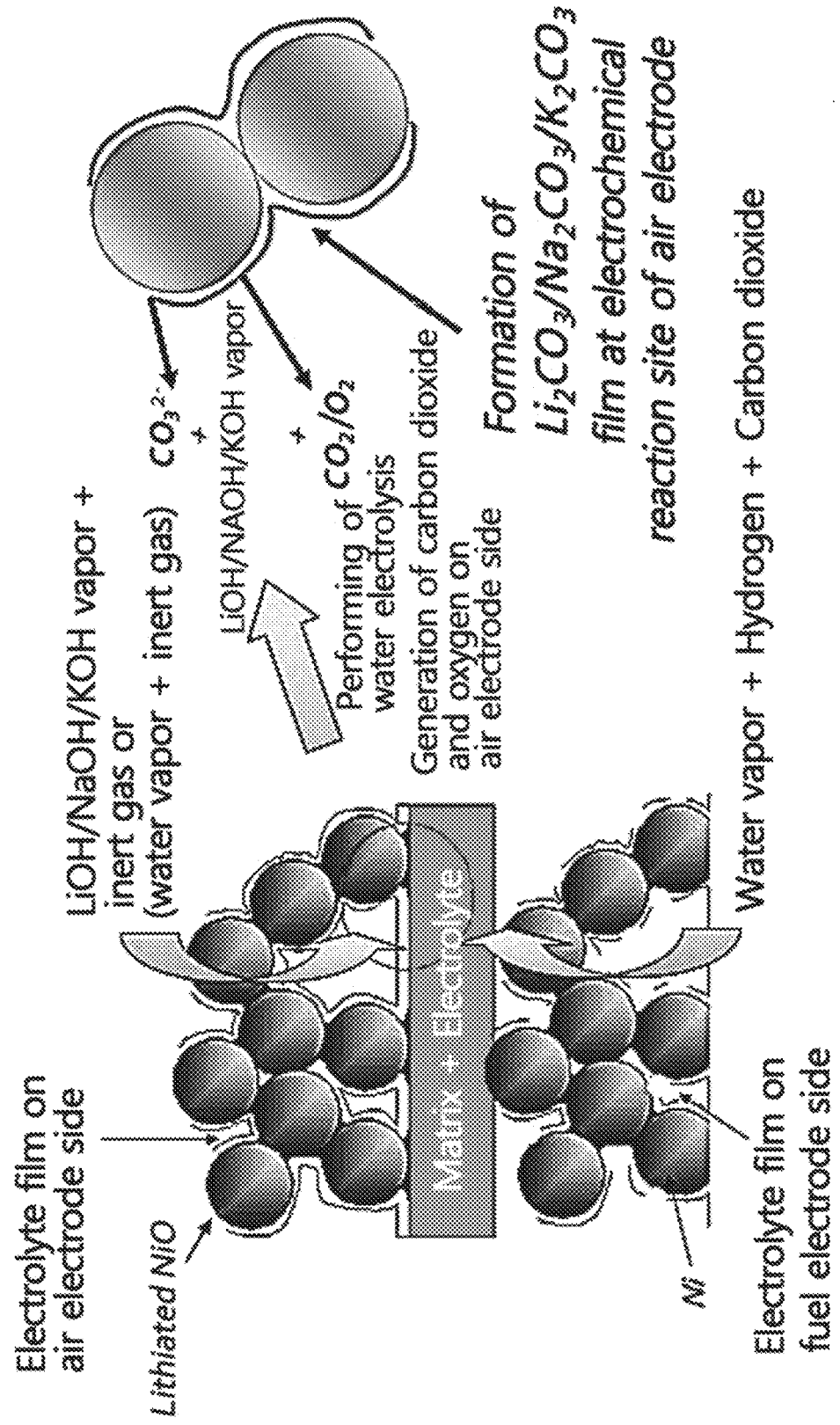
FIG. 1F is a schematic conceptual view illustrating the mechanism for supplying a molten carbonate electrolyte according to a water electrolysis mode by using LiOHl/NaOH/KOH in an example embodiment of the present invention.
Figure 1G:
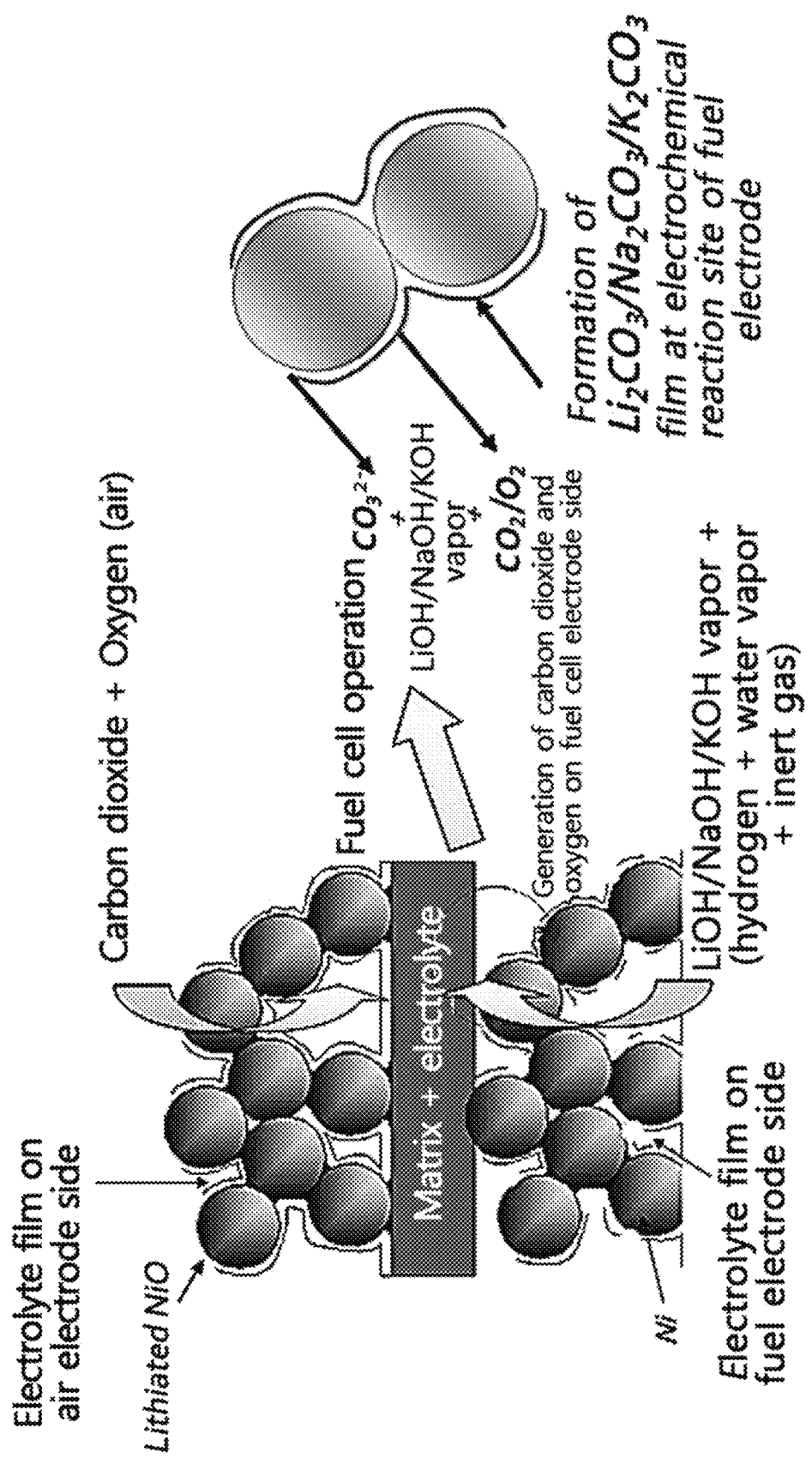
FIG. 1G is a schematic conceptual view illustrating the mechanism for supplying a molten carbonate electrolyte according to a fuel cell mode by using LiOHl/NaOH/KOH in an example embodiment of the present invention.
Figure 1H:
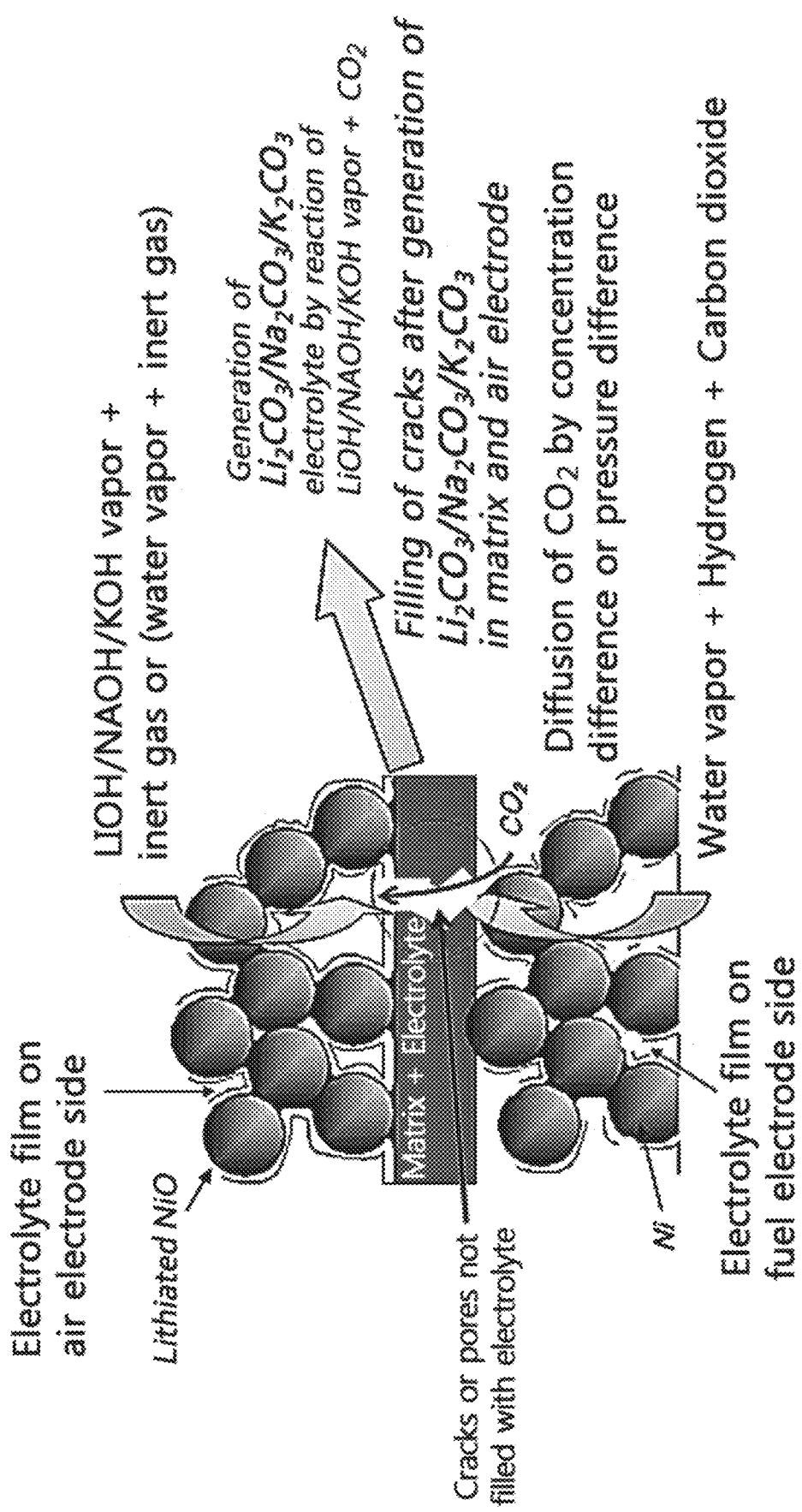

FIG. 1A is a schematic conceptual view illustrating a mechanism for generating a molten carbonate electrolyte in a molten carbonate fuel cell by providing a molten carbonate electrolyte precursor in an example embodiment of the present invention;

FIG. 1B is a schematic conceptual view illustrating a mechanism for supplying a molten carbonate electrolyte in a water electrolysis mode by using LiI/NaI/KI in an example embodiment of the present invention;

FIG. 1C is a schematic conceptual view illustrating the mechanism for supplying a molten carbonate electrolyte in a fuel cell mode by using LiI/NaI/KI in an example embodiment of the present invention;

FIGS. 1D and 1E are schematic conceptual views illustrating the mechanism for supplying a molten carbonate electrolyte by using the pressure or the concentration difference of a carbon dioxide-containing reaction gas between the first electrode and the second electrode and LiI/NaI/KI in an example embodiment of the present invention, and a water electrolysis mode (FIG. 1D) and a fuel cell mode (FIG. 1E) are illustrated, respectively;

FIG. 1F is a schematic conceptual view illustrating the mechanism for supplying a molten carbonate electrolyte according to a water electrolysis mode by using LiOHI/NaOH/KOH in an example embodiment of the present invention;

FIG. 1G is a schematic conceptual view illustrating the mechanism for supplying a molten carbonate electrolyte according to a fuel cell mode by using LiOHI/NaOH/KOH in an example embodiment of the present invention;

FIGS. 1H and 1I are schematic conceptual views illustrating the mechanism for supplying a molten carbonate electrolyte by using the pressure difference or the concentration difference of a carbon dioxide-containing reaction gas between the first electrode and the second electrode and LiOHI/NaOH/KOH in an example embodiment of the present invention, and a water electrolysis mode (FIG. 1H) and a fuel cell mode (FIG. 1I) are illustrated, respectively;

In a method for supplying a molten carbonate fuel cell (may be referred to as MCFC) with electrolyte according to example embodiments of the present invention, a molten carbonate electrolyte is provided to a MCFC by generating the molten carbonate electrolyte from a molten carbonate electrolyte precursor compound in the MCFC. In particular, the method may be performed through the following processes.

In example embodiments, first, a molten carbonate electrolyte precursor compound in a gaseous or vapor state may be supplied to a first electrode of MCFC, and a reaction gas containing carbon dioxide may be supplied to a second electrode of the MCFC. Herein, carbon dioxide may not be supplied to the first electrode. In addition, the supply of the precursor compound and the like may be performed at an operating temperature and pressure of the MCFC. For example, a temperature of the MCFC may be maintained at the MCFC operating temperature, for example, in the range of 500° C. to 800° C., and a heating device 190 for melting or vaporizing the precursor compound may be maintained at a temperature in the range of 50° C. to 1000° C. The first and second electrodes disposed so as to face each other with the matrix interposed therebetween in the MCFC may function as the air electrode and the fuel electrode (in the water electrolysis mode) or the fuel electrode and the air electrode (in the fuel cell mode), respectively.

In example embodiments, the molten carbonate electrolyte precursor compound is capable of reacting with one or more of carbonate ion, carbon dioxide, and/or oxygen to form a molten carbonate electrolyte. The molten carbonate electrolyte precursor compound may also be a compound having a higher vapor pressure than the molten carbonate electrolyte such as lithium carbonate ($Li_2CO_3$), sodium carbonate ($Na_2CO_3$), or potassium carbonate ($K_2CO_3$), etc., at the operating temperature of the MCFC.

In example embodiments, the molten carbonate electrolyte precursor compound may comprise at least one selected from the group consisting of lithium (Li), sodium (Na) and potassium (K), or further comprise at least one selected from the group consisting of cesium (Cs), lanthanum and rubidium (Rb) in addition thereto.

In a non-limited example, the molten carbonate electrolyte precursor compound may be, for example, metal lithium (Li), $Li_2O$, LiOH and a hydrate thereof, LiF, LiCl, LiI, $Li_3N$, $LiNH_2$, $Li_2C_2$, $LiMoO_4$, $LiAlH_4$, LiSn, LiPb, LiTi, LiHg, $Li_3Sb_2$, $Li_3Bi$, $Li_2SO_4$, $LiOCH_3$, $LiOC_2H_5$, metal sodium (Na), $Na_2O$, NaOH and a hydrate thereof, NaF, NaCl, NaI, $Na_3N$, $NaNH_2$, $Na_2SO_4$, $Na_2C_2O_4$, $NaC_2H_3O_2$, $NaOCH_3$, $NaOC_2H_5$; metal potassium (K), $K_2O$, KOH and a hydrate thereof, KF, KCl, KI, $K_3N$, $KNH_2$, $K_2SO_4$, and/or any combination thereof.

In example embodiments, the molten carbonate electrolyte precursor compound may be supplied to the first electrode in a vapor or gaseous state by melting each or a mixture of the powders of the compounds described above or dissolving them in a solvent such as water, methanol, or ethanol, etc. at a room temperature and then heating the solution.

For example, the powders of LiOH, NaOH, KOH, and/or any hydrates thereof may be supplied to the first electrode in a vapor state by melting each or a mixture of them or dissolving them in water at a room temperature and then heating the solution.

In addition, for example, the powders of LiF, LiCl, LiI, NaF, NaCl, NaI, KF, KCl, and/or KI may be supplied to the first electrode in a gaseous state by melting each or a mixture of them or dissolving them in water at a room temperature and then heating the solution.

In a non-limited example, it is preferable that he molten carbonate electrolyte precursor compound comprises LiI and KI.

In example embodiments, the molten carbonate electrolyte precursor compound in a vapor or gaseous state may be supplied to the first electrode as a mixed gas with a carrier gas which does not react with the first electrode. The carrier gas may contain, for example, an inert gas such as helium, nitrogen, or argon and/or water vapor, and preferably, it may contain an inert gas, such as helium, which is light and has a high diffusion coefficient so as that the diffusion coefficient of the mixed gas is increased and the reaction for generating the molten carbonate electrolyte can thus easily take place in the interior of the first electrode and at the electrochemical reaction sites. The mixed gas does not contain carbon dioxide.

Meanwhile, in example embodiments, in the water electrolysis mode, the reaction gas may further contain hydrogen and water vapor in addition to carbon dioxide, and may be supplied to the second electrode. Alternatively, the reaction gas may further contain an oxygen or an oxygen-containing gas, such air and water vapor, in addition to carbon dioxide. In this case, the reaction gas may be supplied to the second electrode in an oxygen partial pressure range in which the second electrode is not oxidized.

In example embodiments, in the fuel cell mode, the reaction gas may further contain oxygen or oxygen-containing gas such as air and water vapor in addition to carbon dioxide, and may be supplied to the second electrode.

Meanwhile, in the water electrolysis mode or the fuel cell mode, the reaction gas may be supplied to the second electrode as a mixed gas with a carrier gas containing an inert gas.

In an example embodiment, an electrochemical method in which a current is applied to the first and second electrodes may be performed. Referring to FIGS. 1B and 1F, herein, the MCFC is operated in the water electrolysis mode, the first electrode is the air electrode, the second electrode is the fuel electrode, and carbonate ion may be generated from the reaction gas in proportion to the amount of current applied by the water electrolysis reaction in the second electrode.

Alternatively, in another example embodiment, an electrochemical method in which a current is generated from the first and second electrodes may be performed. Referring to FIGS. 1C and 1G, in this case, the MCFC is operated in a fuel cell mode, the first electrode is a fuel electrode, the second electrode is an air electrode, and carbonate ion may be generated from the reaction gas in proportion to the amount of current generated by the fuel cell reaction in the second electrode.

In the water electrolysis mode (see FIGS. 1B and 1F), the amount of current applied to the first and second electrodes may be appropriately selected in consideration of the vapor pressure (mole fraction) of the molten carbonate electrolyte precursor mixture and the supply amount of the molten carbonate electrolyte precursor mixture according to the flow rate of carrier gas. In particular, it may be appropriately selected in consideration of the amount of molten carbonate electrolyte consumed during the operation of MCFC.

In a non-limiting example, more specifically, the minimum amount of current applied (A) at which all of the molten carbonate electrolyte precursor mixture supplied into the MCFC can react to generate a molten carbonate electrolyte may be calculated by Mathematical Equation (1).

$$\text{Minimum amount of current applied } (A) = \frac{F \times W \times Av}{(L/sec)/22.4 \text{ (mol/L)}}$$ [Mathematical Equation 1]

In [Mathematical Equation 1], F is the faraday constant (96,485 A·sec/mol), W is the vapor pressure (mole fraction) of the molten carbonate electrolyte precursor compound at the MCFC operating temperature, and Av is the flow rate of the carrier gas. At this time, W can be referred to, for example, [Table 1].

TABLE 1

| Temperature (° C.) | LiOH vapor pressure[1,3] (mole fraction) | KOH vapor pressure[2,3] (mole fraction) | NaOH vapor pressure[2,3] (mole fraction) |
|---|---|---|---|
| 600 | $2.34 \times 10^{-7}$ | $1.04 \times 10^{-4}$ | $1.81 \times 10^{-6}$ |
| 650 | $1.10 \times 10^{-6}$ | $3.31 \times 10^{-4}$ | $8.40 \times 10^{-6}$ |
| 700 | $4.65 \times 10^{-6}$ | $9.20 \times 10^{-4}$ | $2.26 \times 10^{-5}$ |
| 900 | $1.75 \times 10^{-4}$ | $4.00 \times 10^{-2}$ | $1.25 \times 10^{-3}$ |

(see 1. Ditmars, Walter E., and Herrick L. Johnston. "Vapor Pressures of Inorganic Substances. X. Dissociation Pressures of Lithium Hydroxide between 650° and 800° K. 1." Journal of the American Chemical Society 75.8 (1953): 1830-1832;
2. Yaws, Carl L. Handbook of Vapor Pressure: Volume 4: Inorganic Compounds and Elements. Vol. 4. Gulf Professional Publishing, 1995; and
3. STANJAN chemical equilibrium solver (v3.93L IBM-PC © Stanford University 1981, 1984, 1985, 1986, 1987)

In addition, in a case where the molten carbonate electrolyte used in MCFC operation is, for example, $Li_2CO_3$ and/or $K_2CO_3$, the amount of the molten carbonate electrolyte consumed during the MCFC operation may be calculated by [Mathematical Equation 2] and/or [Mathematical Equation 3].

Amount of $Li_2CO_3$ consumed (mg/cm$^2$)=(2.402×$t^{1/2}$+ 6.525)×S×$M_{Li2CO3}$×10$^{-3}$     [Mathematical Equation 2]

Amount of $K_2CO_3$ consumed (mg/cm$^2$)=(0.158×$t^{1/2}$+ 9.391)×S×$M_{K2CO3}$×10$^{-3}$     [Mathematical Equation 3]

In Mathematical Equations 2 and 3, t is the operating time (h), S is the reaction area (cm$^2$) of the unit cell or cell stack, and $M_{Li2CO3}$ and $M_{K2CO3}$ are the molecular weight of $Li_2CO_3$ (73.89 g/mol) and the molecular weight of $K_2CO_3$ (138.20 g/mol), respectively. The above equations are empirical formulas, and the consumed amounts of each may vary depending on the experimental conditions and the MCFC constituents. Therefore, the consumed amount can be used as a reference on the tendency towards the consumption of MCFC electrolyte, namely, what kind of electrolyte is consumed first and in what percentage the electrolyte is consumed.

The carbonate ion may be generated through Reaction Formula 1 when the reaction gas contains carbon dioxide, hydrogen, and water vapor. Alternatively, the carbonate ion may be generated through Reaction Formula 2 when the reaction gas contains carbon dioxide and oxygen or oxygen-containing gas.

$CO_2+H_2O+2e^- \rightarrow CO_3^{2-}+H_2$     [Reaction Formula 1]

$CO_2+½O_2+2e^- \rightarrow CO_3^{2-}$     [Reaction Formula 2]

The carbonate ion generated from the reaction gas may transfer from the second electrode to the first electrode and generate carbon dioxide at least partially in the first electrode through Reaction Formula 3.

$CO_3^{2-} \rightarrow CO_2+½O_2+2e-$     [Reaction Formula 3]

Meanwhile, when generating a current in the MCFC, the MCFC is operated in the fuel cell mode (see FIGS. 1C and 1G), and carbonate ion may be generated from the reaction gas in the second electrode (air electrode) through Reaction Formula 2 described above. The generated carbonate ion may then transfer to the first electrode (fuel electrode) and generate carbon dioxide at least partially in the first electrode through Reaction Formula 3.

Accordingly, carbonate ion, carbon dioxide, and oxygen may be present in the first electrode, and at least some of these carbonate ion, carbon dioxide and oxygen may react with the molten carbonate electrolyte precursor compound vapor at the electrochemical site in the first electrode to generate a molten carbonate electrolyte.

The molten carbonate electrolyte may be, for example, a Li—K-based molten carbonate electrolyte, a Li—Na-based molten carbonate electrolyte, or a Li—Na—K-based molten carbonate electrolyte, and it may additionally contain $Cs_2CO_3$, $Rb_2CO_3$, and/or $La_2CO_3$.

In example embodiments, when the molten carbonate electrolyte precursor compound is LiOH, NaOH, and/or KOH, a molten carbonate electrolyte can be generated through [Reaction Formula 4] to [Reaction Formula 6]. The molten carbonate electrolyte generated may be, for example, $Li_2CO_3$, $Na_2CO_3$, and/or $K_2CO_3$.

$2LiOH+CO_2 \rightarrow Li_2CO_3+H_2O$     [Reaction Formula 4]

$2NaOH+CO_2 \rightarrow Na_2CO_3+H_2O$     [Reaction Formula 5]

$2KOH+CO_2 \rightarrow K_2CO_3+H_2O$     [Reaction Formula 6]

In example embodiments, when the molten carbonate electrolyte precursor compound does not contain oxygen, that is, for example, the molten carbonate electrolyte precursor compound is metal lithium (Li), metal sodium (Na), metal potassium (K), LiH, NaH, KH, and/or any combination thereof, the molten carbonate electrolyte precursor compound vapor may first react with oxygen to form a molten carbonate electrolyte intermediate precursor compound in the form of an oxide such as $Li_2O$, $Na_2O$, $K_2O$, etc. and this can react with carbon dioxide to finally generate molten carbonate electrolytes such as $Li_2CO_3$, $Na_2CO_3$, $K_2CO_3$ and/or any combination thereof.

More specifically, when the molten carbonate electrolyte precursor compound contains, for example, metal lithium (Li) vapor, a molten carbonate electrolyte $Li_2CO_3$ may be generated through [Reaction Formula 7] and [Reaction Formula 8]. Alternatively, when the molten carbonate electrolyte precursor compound contains, for example, LiH, the molten carbonate electrolyte $Li_2CO_3$ may be generated through [Reaction Formula 9] and [Reaction Formula 10].

$2Li(g)+½O_2(g) \rightarrow Li_2O(c)$     [Reaction Formula 7]

$Li_2O(c)+CO_2(g) \rightarrow Li_2CO_3(c)$     [Reaction Formula 8]

$2LiH(g)+O_2(g) \rightarrow Li_2O(c)+H_2O(g)$     [Reaction Formula 9]

$Li_2O(c)+CO_2(g) \rightarrow Li_2CO_3(c)$     [Reaction Formula 10]

Meanwhile, the processes described above may be performed when the MCFC performance begins to deteriorate. After the MCFC lifetime is substantially ran out, or when all the molten carbonate electrolyte inside the MCFC electrode is substantially depleted and to this end the molten carbonate electrolyte in the matrix begins to be consumed, it may be difficult to restore the performance of the MCFC to the initial level because of the deterioration in performance due to corrosion even if the molten carbonate electrolyte is additionally supplied through the processes described above. Furthermore, the processes described above may be repeatedly performed one or more times in order to maintain the MCFC performance. Hence, it is preferable to repeatedly perform the processes described above one or more times to additionally supply the molten carbonate electrolyte before the significant performance deterioration of the MCFC, for example, when an increase in internal resistance (IR) of the MCFC is less than 200% based on the internal resistance value at the initial stage of operation or the incidence rate of nitrogen cross-over is less than 1%.

As described above, it is possible to generate and supply the molten carbonate electrolyte directly in the MCFC in which the electrochemical reaction take place by supplying a molten carbonate electrolyte precursor compound in a gaseous or vapor state to the first electrode and a reaction gas containing carbon dioxide to the second electrode, and then applying a current to the first and second electrodes or generating a current from the first and second electrodes.

Particularly, when consumption of the electrolyte occurs in an MCFC to be operated by using a liquid electrolyte, the electrolyte of the MCFC can be additionally refilled to the required amount through the method described above without changing the operating temperature and/or pressure of the MCFC. Hence, a problem can be solved that the temperature of the MCFC may increase and the electrode structure may be changed by the consumption of the electrolyte and the accompanying cross-over phenomenon, resulting in performance deterioration and limited operation time of MCFC. Moreover, deterioration of the cell performance due to consumption of the electrolyte of the existing liquid electrolyte-using MCFC may be fundamentally solved, thus the lifetime of MCFC can be extended to the ultimate operating time that is determined by the MCFC constituents, and the long-term driving stability of MCFC can be effectively secured.

In other example embodiments, according to the method for supplying an electrolyte to a molten carbonate fuel cell (MCFC) of the present invention, when there is a portion where defects such as matrix cracks or pinholes are caused, by using these defects, it is possible to diffuse the reaction gas containing carbon dioxide from the second electrode to the first electrode by a concentration difference. Accordingly, in the case of a MCFC having mechanical defects such as matrix cracks or pinholes, it is possible to easily refill the molten carbonate electrolyte directly in the interior thereof (see FIGS. 1D and 1E, FIGS. 1H and 1I). Alternatively, in other example embodiments, in a case in which there is a portion where defects such as matrix cracks or pinholes are caused, by using these defects, it is possible to transfer the reaction gas containing carbon dioxide from the second electrode to the first electrode by a pressure difference which may be caused when the internal pressure of the first and/or second electrodes are controlled so that the second electrode has a higher pressure than the first electrode. Accordingly, the reaction gas may pass through at least a part of the matrix, which may be present in an empty pore state due to the shortage of molten carbonate electrolyte. As a result, a molten carbonate electrolyte may be generated in the matrix and the first electrode and the molten carbonate electrolyte can be easily refilled directly in the MCFC which may exhibit relatively low performance (see FIGS. 1D and 1E, FIGS. 1H and 1I).

Accordingly, even in the case of MCFC which may exhibit a relatively low performance due to the above-described defects, the molten carbonate electrolyte can be easily supplied directly to the interior of the MCFC. Furthermore, when there is a defect, the molten carbonate electrolyte can be directly supplied to the interior of the MCFC by using only the pressure difference between the first and second electrodes and/or the concentration difference of the reaction gas without using an electrochemical method, which thereby provides an additional advantage.

Molten Carbonate Fuel Cell

Figure 2:
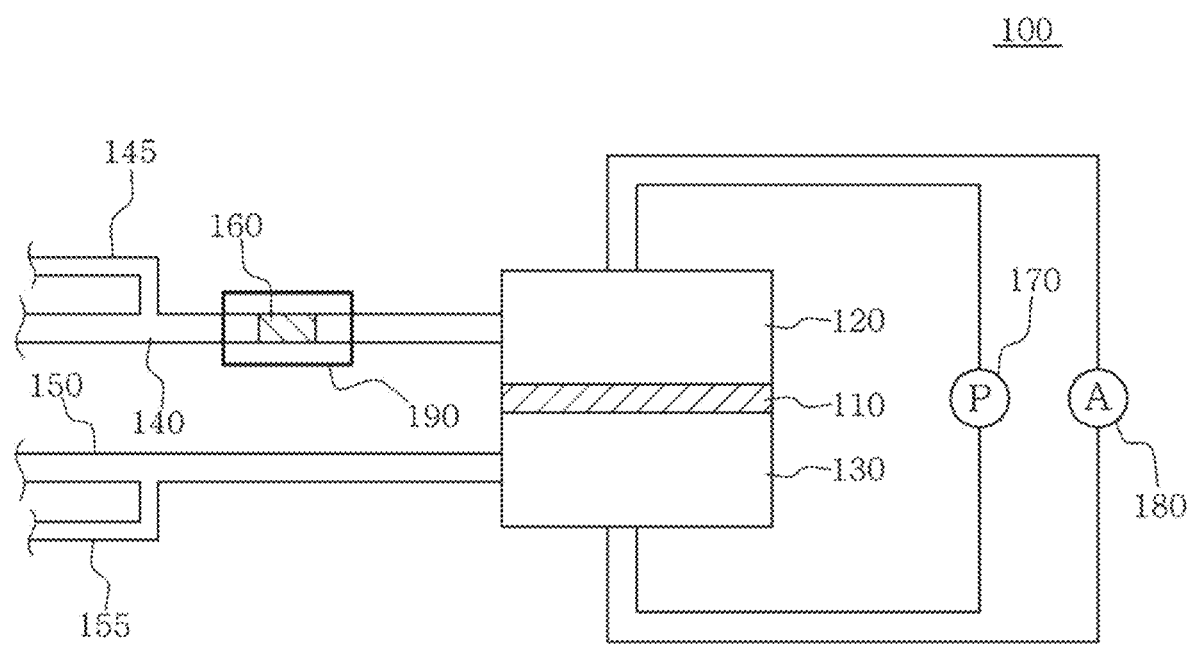
FIGS. 2 and 3 are schematic cross-sectional views illustrating a molten carbonate fuel cell (MCFC) including a molten carbonate electrolyte supply device according to two example embodiments of the present invention.
Figure 3:
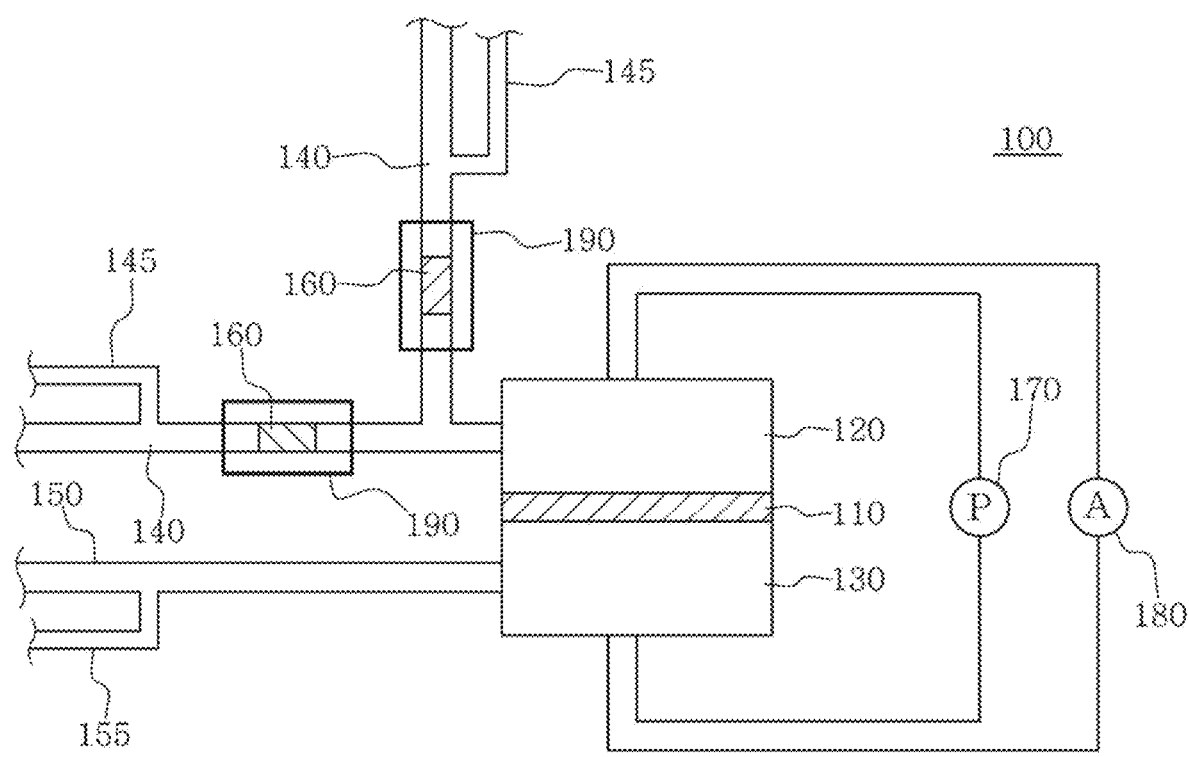

FIGS. 2 and 3 are cross-sectional views illustrating molten carbonate fuel cells (MCFC) including a molten carbonate electrolyte supply device according to two example embodiments of the present invention.

In case of using an MCFC including a molten carbonate electrolyte supply device as illustrated in FIG. 2, two or more molten carbonate electrolyte precursor compounds may be mixed, then inserted into one precursor vessel 160, and supplied to a first electrode 120 through a first gas supply device 140 together with the carrier gas. Such a structure is particularly advantageous for additionally supplying a molten carbonate electrolyte into the MCFC when a specific molten carbonate electrolyte component is insufficient. However, in the structure illustrated in FIG. 2, it is difficult to individually control the temperature for controlling the vapor pressure of each of the two or more molten carbonate electrolyte precursor compounds, and it may be thus limited to supply a molten carbonate electrolyte having a specific composition. Thus, an MCFC including a molten carbonate electrolyte supply device as illustrated in FIG. 3 may be used.

The MCFC as illustrated in FIG. 3 further includes a separate first gas supply device 140 and a heating device 190 for each of the two or more molten carbonate electrolyte precursor compounds as the molten carbonate electrolyte supply device. Hence, it is easy to control the vapor pressure of each of the two or more molten carbonate electrolyte precursor compounds, and it is thus possible to individually supply the electrolyte precursor compound vapor generated and to efficiently generate a molten carbonate electrolyte having a desired composition in MCFC 100.

Figure 4:
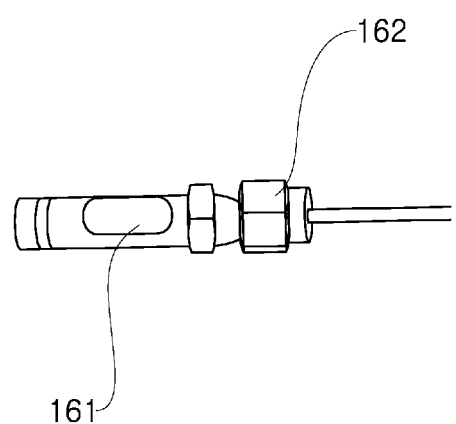
Figure 5:
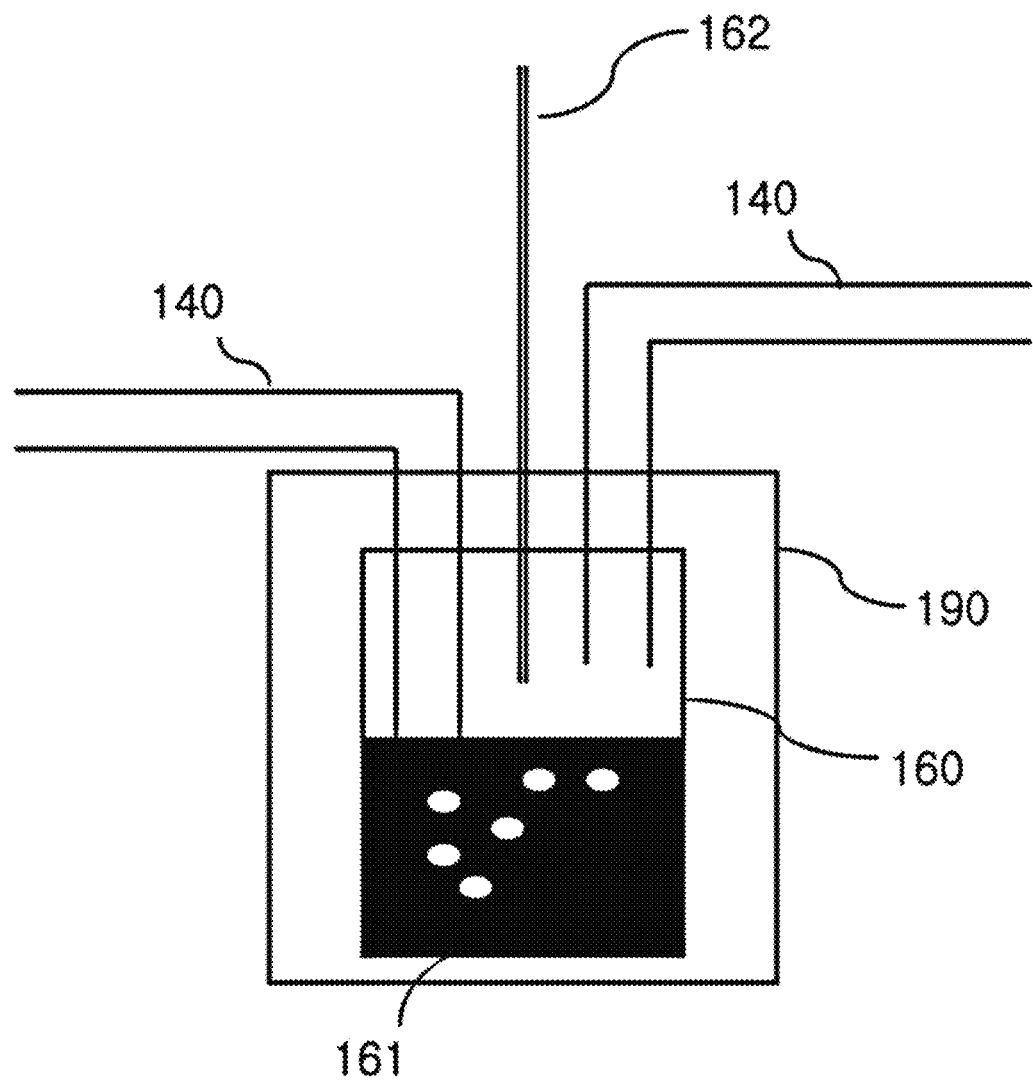

FIGS. 4 and 5 illustrate vessels containing an electrolyte precursor. FIG. 4 is an advantageous form when a small amount of electrolyte is added, and FIG. 5 is a saturator type vessel for facilitating addition of a large amount of electrolyte. That is, as illustrated in FIG. 5, the electrolyte precursor vessel 160 may be fabricated in the form of a saturator in which a first gas supply device containing a carrier gas is inserted into the molten precursor compound liquid so that the carrier gas can readily reach the equilibrium vapor pressure as it passes through the electrolyte precursor solution. In this case, there is an advantage that a larger amount of electrolyte can be continuously added than when the precursor vessel of FIG. 4 is used.

Meanwhile, even in case of a MCFC having the structure illustrated in FIG. 2, although it is not particularly illustrated, the vapor pressure of the molten carbonate electrolyte precursor compound can be controlled as two or more precursor vessels are inserted into one first gas supply device and the heating devices are mounted in parallel or two or more precursor vessels are inserted at different positions in one first gas supply device without a heating device and the temperatures thereof are controlled to be different from one another. As a result, the composition of the molten carbonate electrolyte to be supplied to the MCFC can be controlled even by the structure illustrated in FIG. 2.

More specifically, the constituents and structures of molten carbonate fuel cells (MCFC) including the molten carbonate electrolyte supply device according to an example embodiment of the present invention illustrated in FIGS. 2 and 3 are as follows.

Referring to FIG. 2, a molten carbonate fuel cell (MCFC) 100 according to example embodiments of the present invention may include a matrix 110, first and second electrodes 120 and 130, first and second gas supply devices 140 and 150, first and second carrier gas supply devices 145 and 155, molten carbonate electrolyte precursor vessel 160, a heating device 190, a power supply device 170, and a current supply device 180. Accordingly, the MCFC 100 of example embodiments of the present invention may directly generate a molten carbonate electrolyte from the molten carbonate electrolyte precursor compound supplied to the interior thereof through the first gas supply device 140, and preferably the molten carbonate electrolyte may be easily supplied to the MCFC 100 without changing the temperature and/or the pressure of the cell operating device, namely, the matrix 110 and the electrodes 120 and 130 during operation.

The matrix 110 may be disposed between the first and second electrodes 120 and 130 in the MCFC 100 and may contain a Li—K-based molten carbonate electrolyte, a Li—Na-based molten carbonate electrolyte, or a Li—Na—K-based molten carbonate electrolyte. The matrix 110 may contain, for example, $\gamma$-$LiAlO_2$ or $\alpha$-$LiAlO_2$.

The first and second electrodes 120 and 130 may be disposed in the MCFC 100 so as to face each other with the matrix 110 interposed therebetween and provided as either of a fuel electrode or an air electrode of the MCFC 100 to be different from each other. More specifically, the first and second electrodes 120 and 130 may be respectively provided as an air electrode and a fuel electrode when the MCFC 100 is operated in the water electrolysis mode, and they may be respectively provided as a fuel electrode and an air electrode when the MCFC 100 is operated in the fuel cell mode. The first or second electrode 120 or 130 may contain lithiated NiO when provided as an air electrode and a Ni alloy, for example, Ni—Al, Ni—Cr, Ni—Al—Cr, etc. when provided as a fuel electrode.

The first gas supply device 140 may be connected to the first electrode 120 so as to supply the molten carbonate electrolyte precursor compound in a gaseous or vapor state to the first electrode 120 together with the carrier gas. The first carrier gas supply device 145 may be connected to the first gas supply device 140 as a supply device for supplying a separate carrier gas as described above. This makes it possible to supply the molten carbonate electrolyte precursor compound in a gaseous or vapor state to the first electrode 120 in the form of a mixed gas with the carrier gas.

Meanwhile, only one first gas supply device 140 and one first carrier gas supply device 145 are illustrated in FIG. 2, but a plurality of separate first gas supply devices 140 and a plurality of first carrier gas supply devices 145 may be equipped. In other words, referring to FIG. 3, in example embodiments, one or more first gas supply devices 140 and one or more first carrier gas supply devices 145 connected to the first gas supply devices 140 are equipped and connected to the first electrode 120. In this case, the same or different kinds of molten carbonate electrolyte precursor compounds may be easily supplied to the first electrode 120. In particular, when supplying two or more molten carbonate electrolyte precursor compounds having different vaporization temperatures or different vapor pressures, the precursor compounds may be easily supplied individually or in a desired composition only by simply controlling the temperatures of the heating devices 190 mounted to the respective first gas supply devices 140 to be different from each other. Hence, the amount of vapor generated and flow rate of each molten carbonate electrolyte precursor compound may be easily controlled.

The second gas supply device 150 may be connected to the second electrode 130 so as to supply the reaction gas containing carbon dioxide and/or with the carrier gas to the second electrode 130. The second carrier gas supply device 155 may be a supply device for supplying a separate carrier gas, and may be connected to the second gas supply device 150. This makes it possible to supply the reaction gas to the second electrode 130 in the form of a mixed gas with the carrier gas.

Meanwhile, only one second gas supply device 150 and one second carrier gas supply device 155 are illustrated in FIGS. 2 and 3, but the present invention is not limited thereto. In example embodiments, a plurality of second gas supply devices 150 and a plurality of second carrier gas supply devices 155 connected to the second gas supply devices 150 may be equipped and connected to the second electrode 130.

The molten carbonate electrolyte precursor vessel 160 may store a molten carbonate electrolyte precursor compound and heat and melt it to provide the molten carbonate electrolyte precursor compound in a gaseous or vapor state to the first electrode 120. Alternatively, the vessel 160 may dissolve the molten carbonate electrolyte precursor compound powder in a solvent and then heat the solution to provide the molten carbonate electrolyte precursor compound in a gaseous state. Herein, as illustrated in FIGS. 2 and 3, the precursor vessel 160 may heat and melt the molten carbonate electrolyte precursor compound by controlling the temperature to a desired temperature range by using the heating device 190 mounted outside the first gas supply device 140, for example, so as to enclose the outer surface of the precursor vessel 160. The heating device 190 may be, for example, a heater such as an electric heater, a gas heater, etc. Alternatively, a heat exchanger may be used as the heating device 190. In particular, in order to continuously add a large amount of electrolyte, as illustrated in FIG. 5, the first gas supply device 140 may be inserted into the large-capacity electrolyte precursor vessel 160, the carrier gas may be allowed to bubble in the electrolyte precursor solution, and then the carrier gas containing the electrolyte precursor compound vapor may be finally supplied to the first electrode.

The molten carbonate electrolyte precursor vessel 160 may be mounted, for example, so as to be inserted into the first gas supply device 140 as illustrated in FIGS. 2 and 3 or separately mounted in the form of a saturator as illustrated in FIG. 5. In addition, in the case of equipping a plurality of the first gas supply devices 140, a plurality of the molten carbonate electrolyte precursor vessels 160 may be respectively mounted to the first gas supply devices 140, for example, so as to be inserted respectively or in the form of a saturator.

Referring to FIGS. 4 and 5, the molten carbonate electrolyte precursor vessel 160 may include a storage device 161 for storing a powder of the molten carbonate electrolyte precursor compound in the interior of the molten carbonate electrolyte precursor vessel 160, and it may further include a thermocouple 162 for monitoring the temperature of the molten carbonate electrolyte precursor vessel 160.

By mounting the thermocouple 162 in the molten carbonate electrolyte precursor vessel 160, it is possible to monitor the temperature of the molten carbonate electrolyte precursor vessel 160, and to easily control the temperature of the molten carbonate electrolyte precursor vessel 160 to a suitable temperature range for providing the molten carbonate electrolyte precursor compound in a gaseous or vapor state by using the heating device 190.

Figure 6:
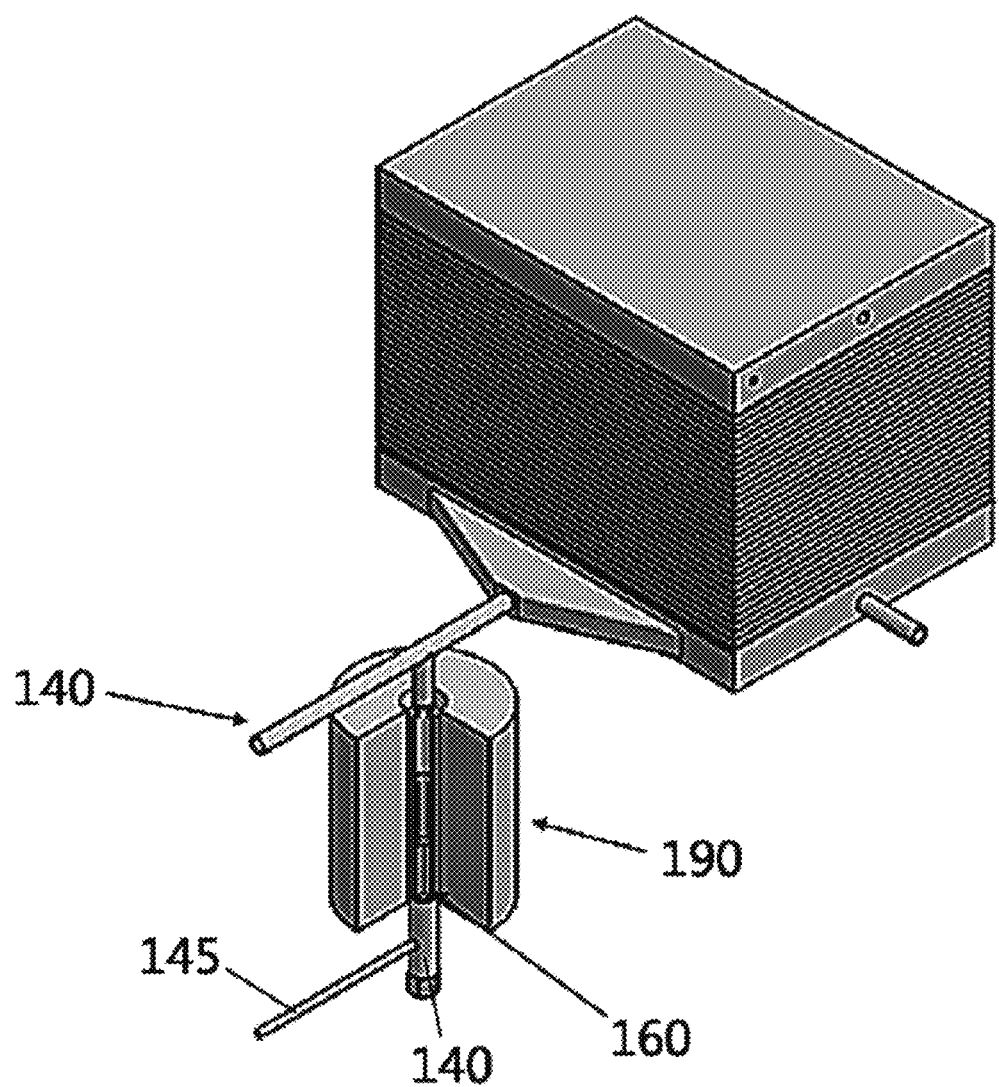
FIG. 6 is a schematic perspective view illustrating an MCFC stack including a molten carbonate electrolyte supply device according to an example embodiment of the present invention.

Meanwhile, a unit MCFC has been described with reference to FIGS. 2 and 3, but as referred to FIG. 6, for example, it should be understood that the MCFC stack having the above-described characteristics is also included in the scope of the present invention.

Hereinafter, specific Examples according to example embodiments of the present invention will be described in more detail. However, it should be understood that the present invention is not limited to the following Examples, various forms of Examples may be implemented within the scope of the appended claims, and the following Examples are only intended to facilitate the complete disclosure of the invention and to facilitate the practice of the invention to those skilled in the art.

<Experiment 1: Case of Using LiOH/KOH>

Figure 11:
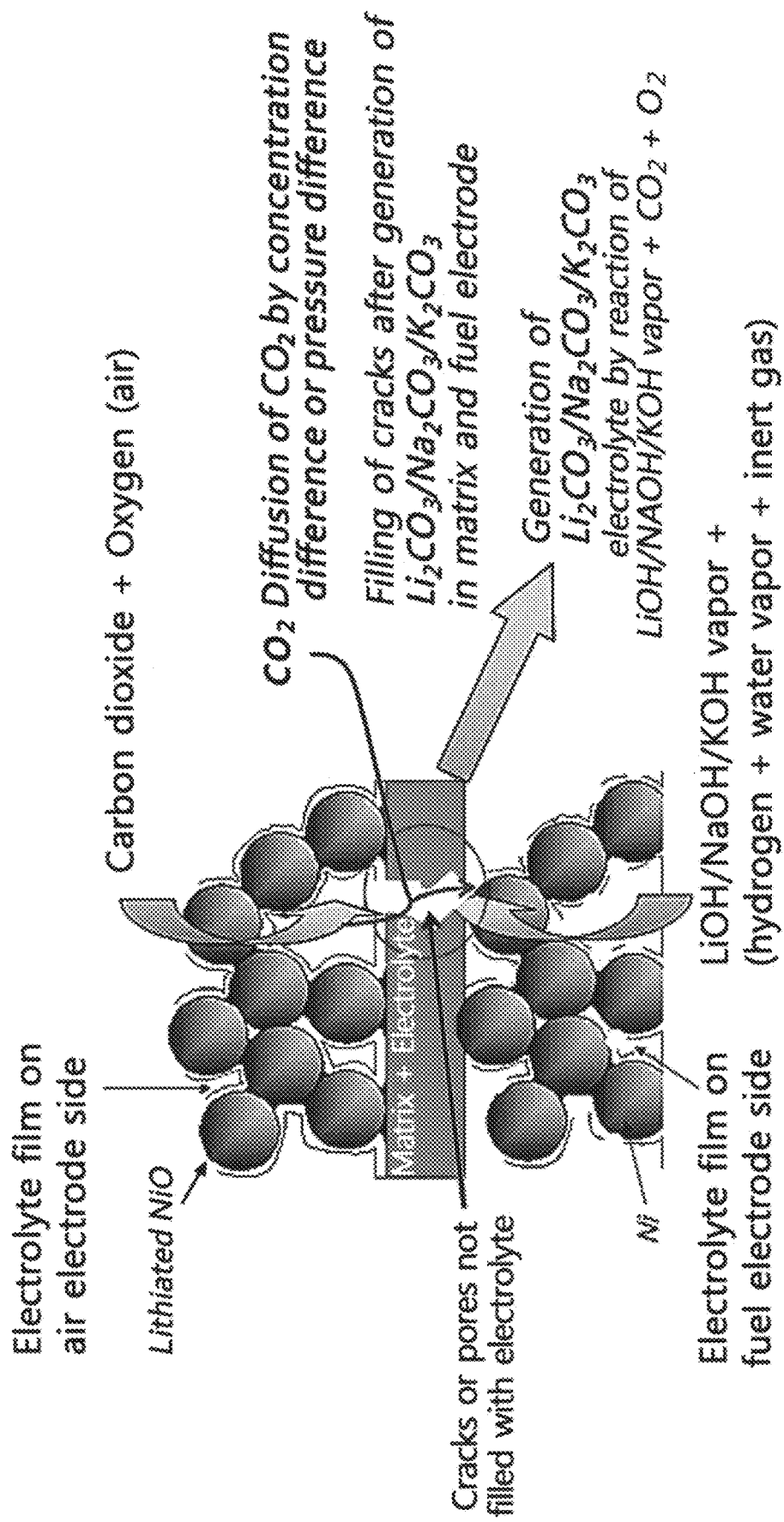
FIG. 11 is a graph illustrating a change in performance of a MCFC to which a molten carbonate electrolyte is additionally supplied according to Examples 2 to 4 of Experiment 1 of the present invention.
Figure 7:
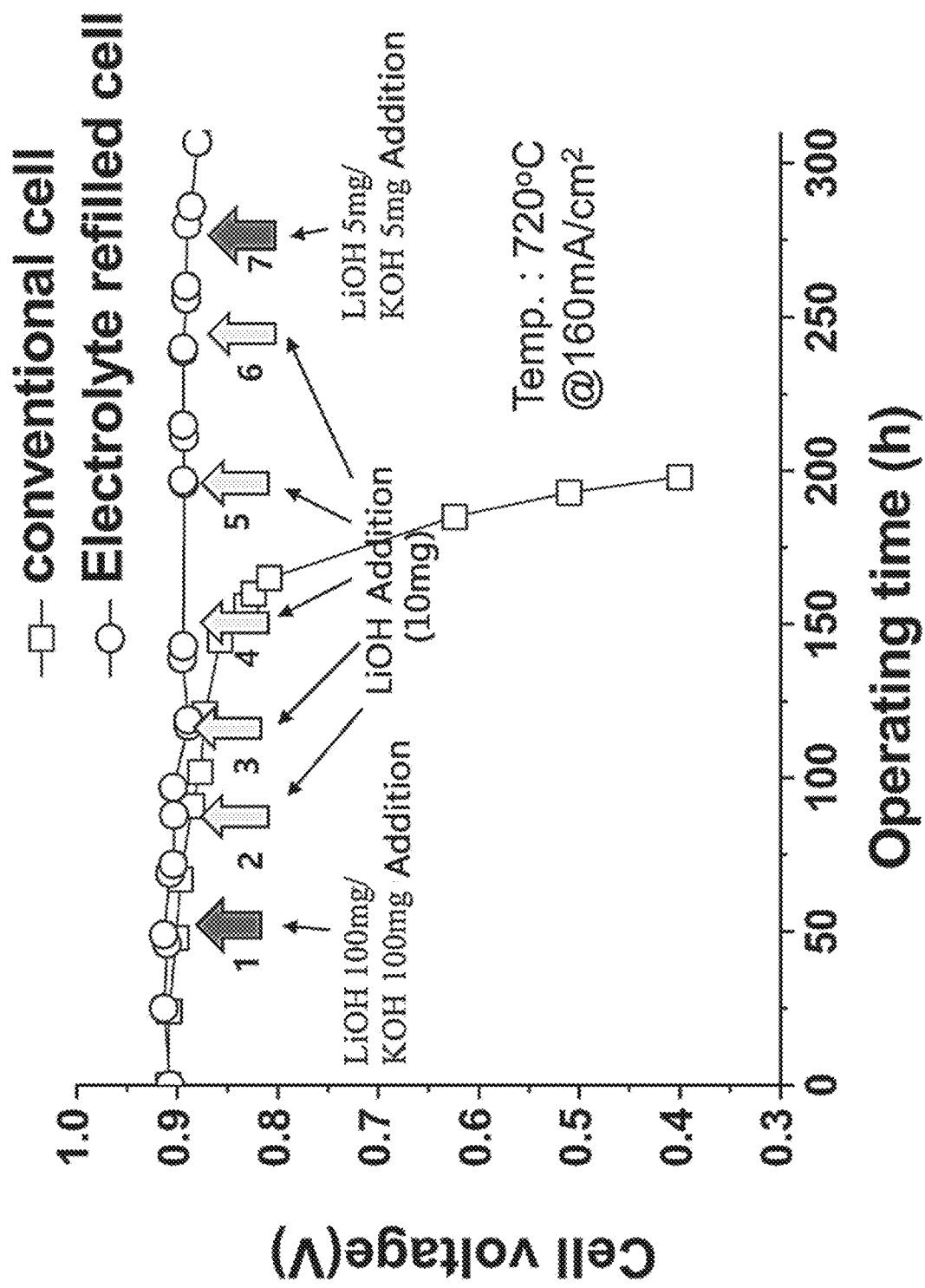
FIG. 7 is a graph illustrating a change in performance of a MCFC to which a molten carbonate electrolyte is additionally supplied according to Example 1 of Experiment 1 of the present invention.
Figure 8:
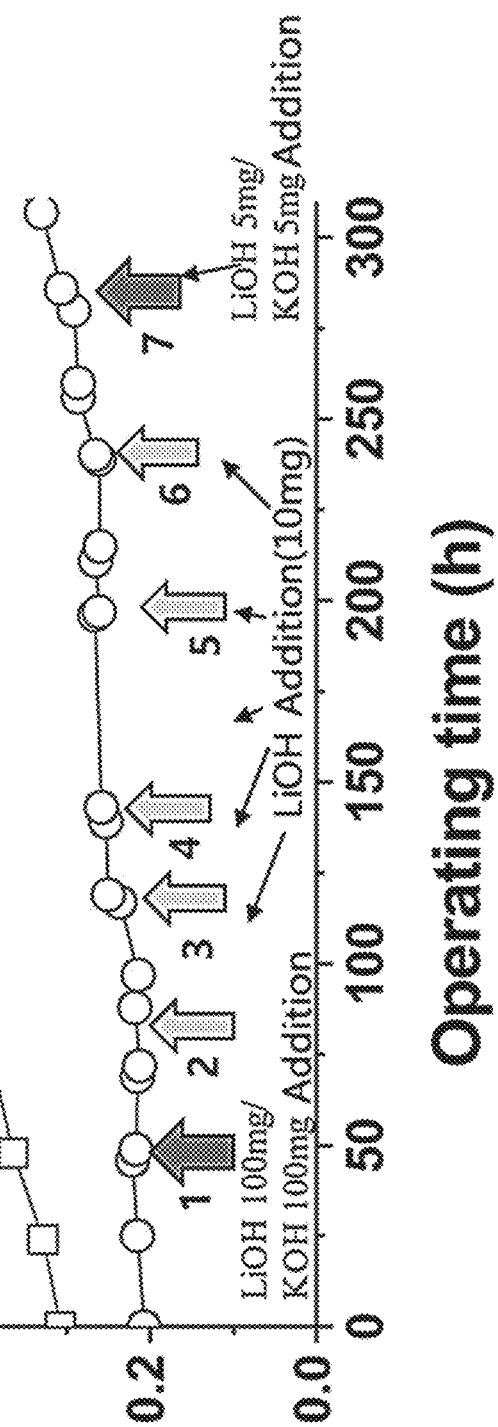
FIG. 8 is a graph illustrating a change in internal resistance (IR) of a MCFC to which a molten carbonate electrolyte is additionally supplied according to Example 1 of Experiment 1 of the present invention.
Figure 9:
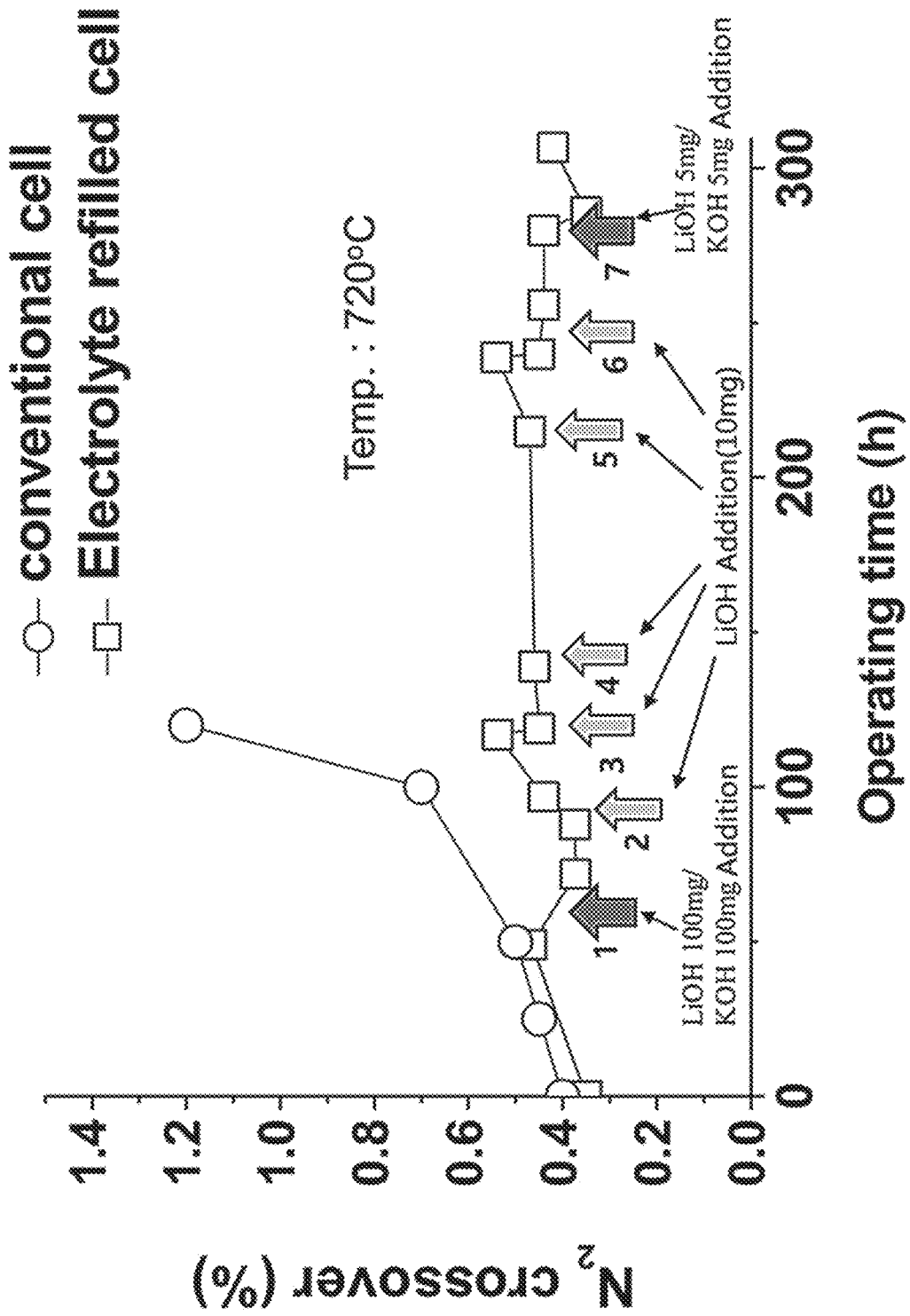
FIG. 9 is a graph illustrating a change in incidence rate of nitrogen cross-over (%) in the fuel electrode of a MCFC to which a molten carbonate electrolyte is additionally supplied according to Example 1 of Experiment 1 of the present invention.
Figure 10:
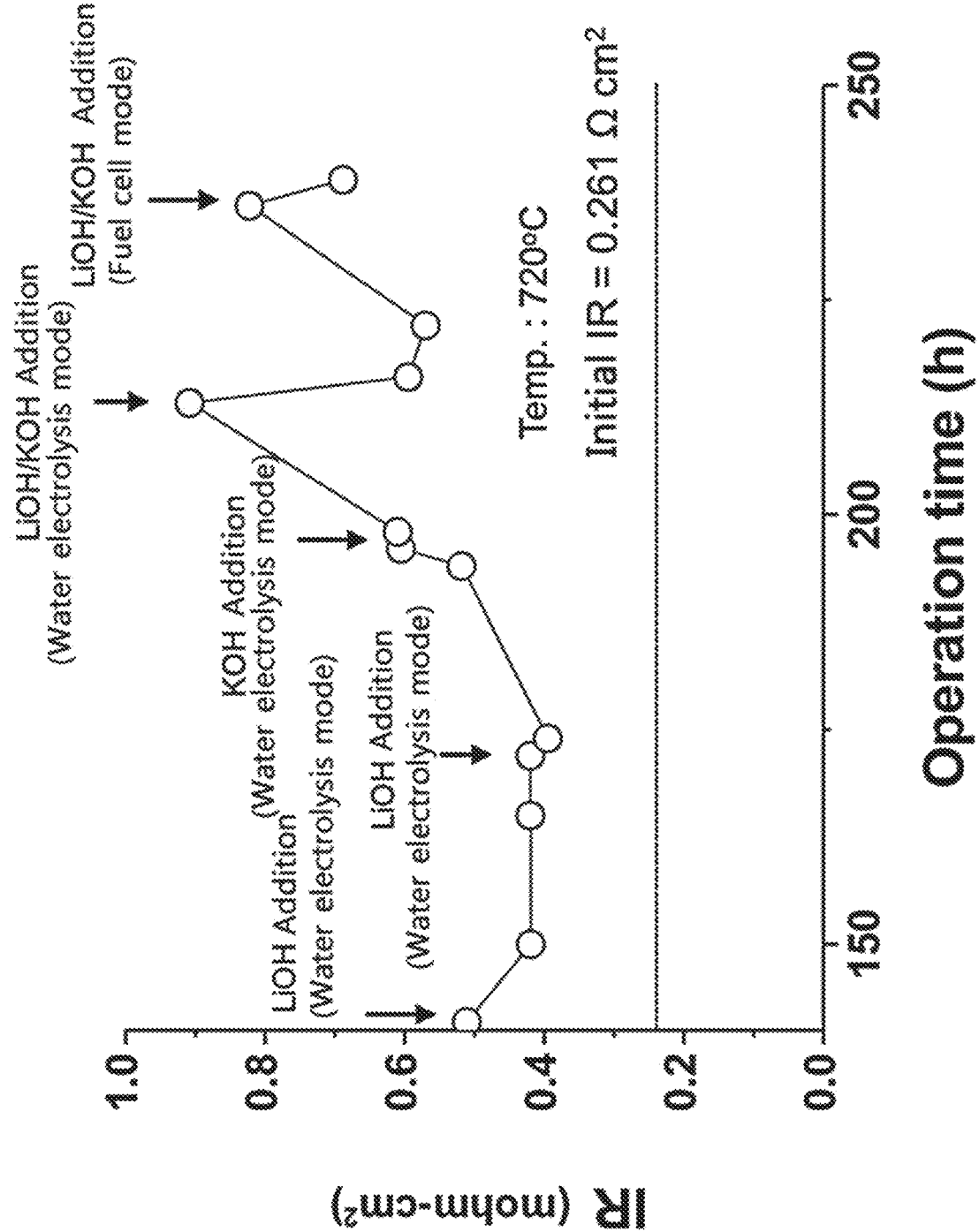
FIG. 10 is a graph illustrating a change in internal resistance (IR) of a MCFC to which a molten carbonate electrolyte is additionally supplied according to Examples 2 to 4 of Experiment 1 of the present invention.
Figure 11:
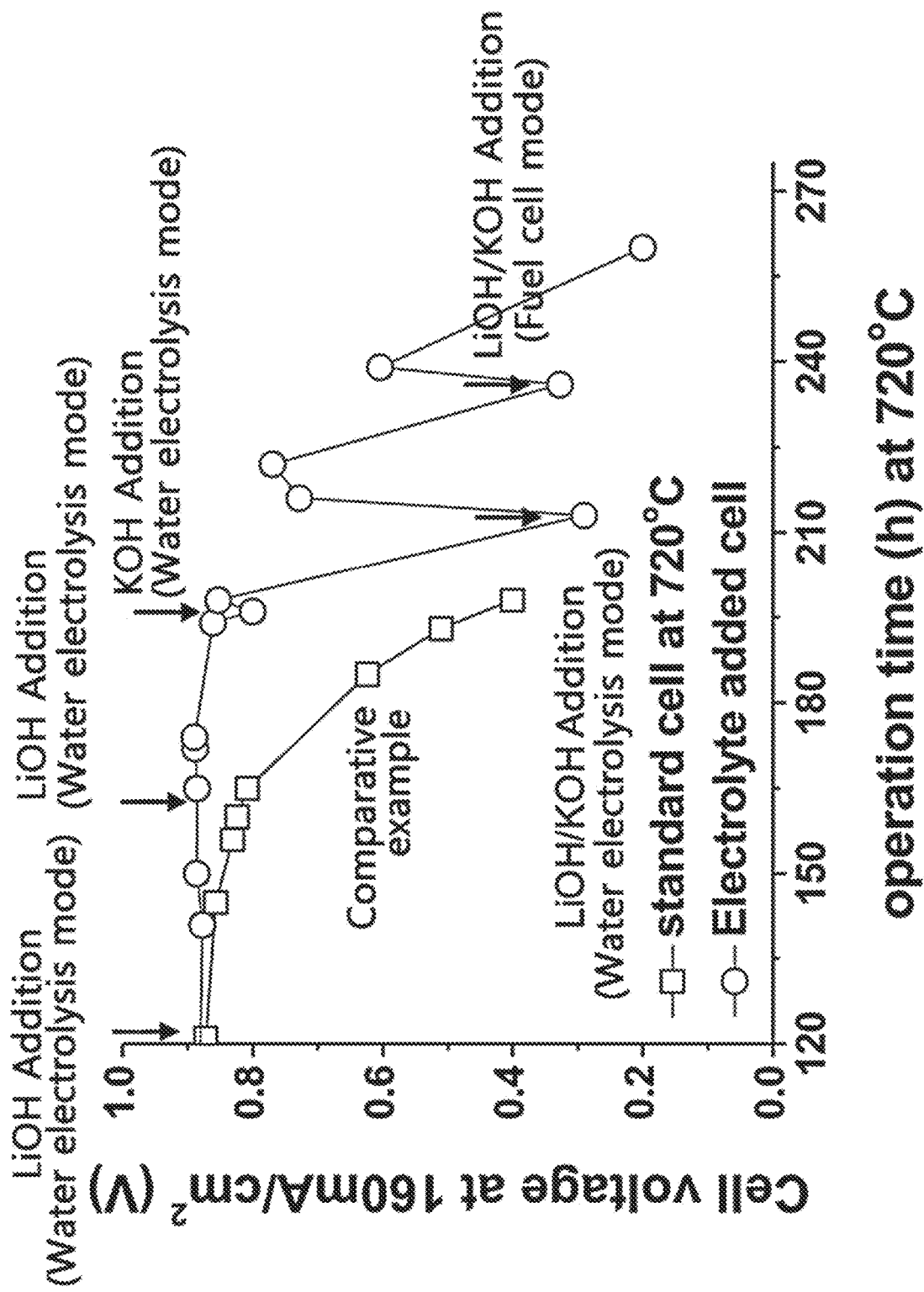
Figure 12:
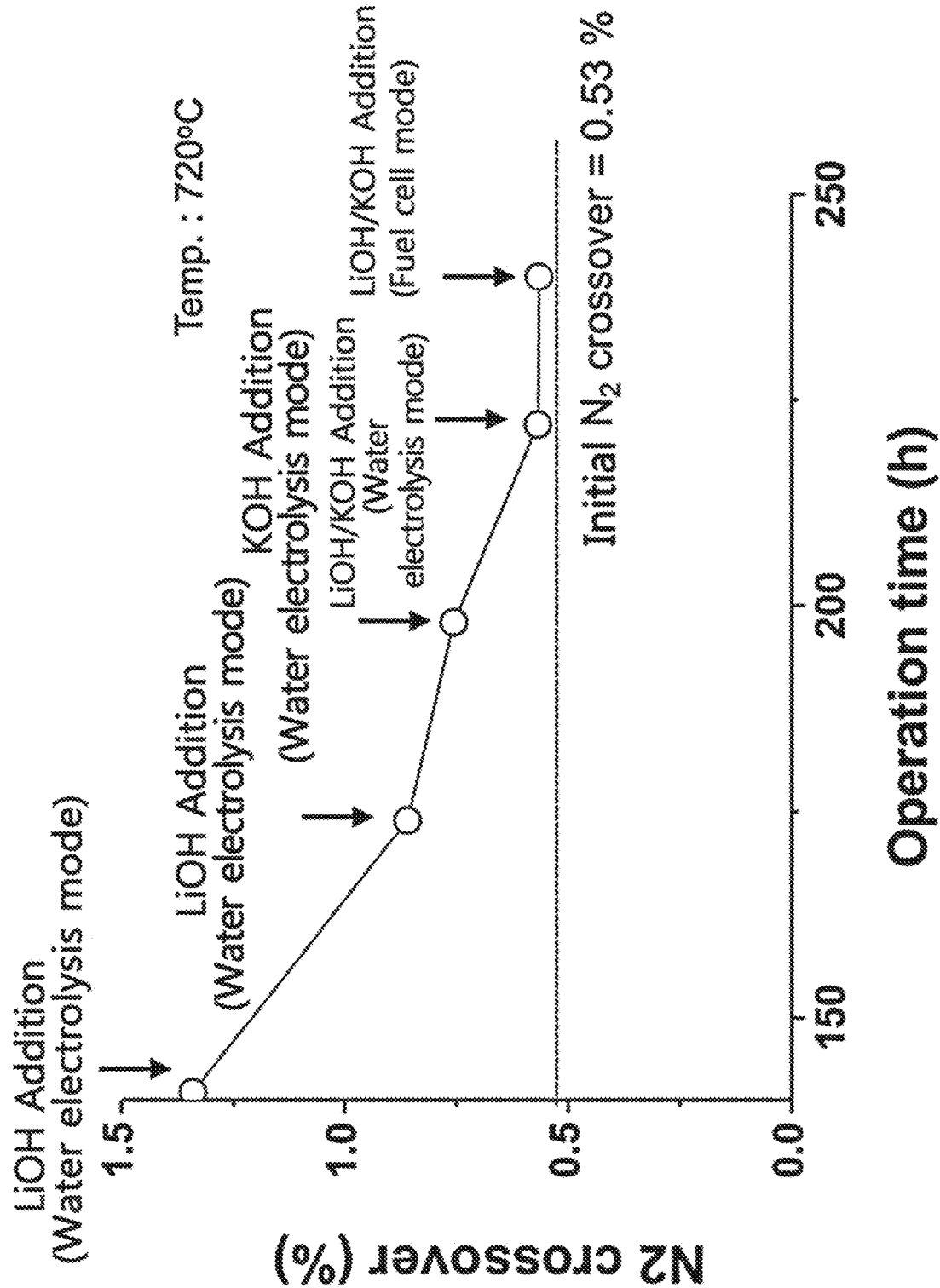
FIG. 12 is a graph illustrating a change in incidence rate of nitrogen cross-over (%) in the fuel electrode of a MCFC to which a molten carbonate electrolyte is additionally supplied according to Examples 2 to 4 of Experiment 1 of the present invention.

FIG. 7 is a graph illustrating a change in performance of a MCFC to which a molten carbonate electrolyte is additionally supplied according to Example 1 of Experiment 1 of the present invention;

FIG. 8 is a graph illustrating a change in internal resistance (IR) of a MCFC to which a molten carbonate electrolyte is additionally supplied according to Example 1 of Experiment 1 of the present invention;

FIG. 9 is a graph illustrating a change in incidence rate of nitrogen cross-over (%) in the fuel electrode of a MCFC to which a molten carbonate electrolyte is additionally supplied according to Example 1 of Experiment 1 of the present invention;

FIG. 10 is a graph illustrating a change in internal resistance (IR) of a MCFC to which a molten carbonate electrolyte is additionally supplied according to Examples 2 to 4 of Experiment 1 of the present invention;

FIG. 11 is a graph illustrating a change in performance of a MCFC to which a molten carbonate electrolyte is additionally supplied according to Examples 2 to 4 of Experiment 1 of the present invention;

FIG. 12 is a graph illustrating a change in incidence rate of nitrogen cross-over (%) in the fuel electrode of a MCFC to which a molten carbonate electrolyte is additionally supplied according to Examples 2 to 4 of Experiment 1 of the present invention;

Example 1: Water Electrolysis Mode (Current Application) Before Cell Performance Deterioration Typically, MCFC is operated at a temperature of 650° C. or lower, but in the present Example, a MCFC unit cell is operated at 720° C., which is higher than the normal operating temperature, in order to observe the performance deterioration due to the consumption of molten carbonate electrolyte in a short period of time. The operating conditions of the MCFC unit cell used are as presented in [Table 2].

TABLE 2

| Temperature | | 720° C. |
|---|---|---|
| Pressure | | 1 atm |
| Sealing pressure | | 0.2 MPa |
| Gas utilization | | 0.1 at |
| (anode: $H_2$/cathode: $O_2$ and $CO_2$) | | 150 mA/cm$^2$ |
| Gas flow rate | Anode | 357 sccm |
| | Cathode | 952 sccm |
| Input gas | Anode | $H_2/CO_2/H_2O$ = 0.72:0.18:0.1 |
| Composition | Cathode | Air/$CO_2$ = 0.7:0.3 |

TABLE 2-continued

| Anode | Ni—Ni5 wt % Al |
|---|---|
| Cathode | Lithiated NiO |
| Matrix | γ-LiAlO$_2$ |
| Electrolyte | (Li/K)$_2$CO$_3$ = (70:30) |

A MCFC unit cell of 5×5 cm$^2$ is operated under the conditions presented in Table 2, the operation thereof is temporarily stopped while maintaining the operating temperature and pressure, and nitrogen of an inert gas is then sufficiently supplied into the first gas supply device for 30 minutes for purging.

The reaction gas such as carbon dioxide and oxygen that may possibly remain in the air electrode (first electrode portion) of the MCFC is thus completely removed. Thereafter, the molten carbonate electrolyte is supplied by performing the processes to be described below before the sudden performance deterioration of the MCFC occurred, that is, when the incidence rate of nitrogen cross-over is less than 1%.

In each of molten carbonate electrolyte precursor vessels, 100 mg of LiOH powder and 100 mg of KOH powder, which are solid at a room temperature, are respectively put, and the vessels are respectively inserted into the first gas supply devices connected to the air electrode (first electrode) of the MCFC.

Subsequently, by using a heating device mounted outside the first gas supply device so as to enclose the vessel, the temperature of the vessels is controlled to a temperature of 462° C. or higher to be suitable for melting and vaporizing the electrolyte precursor compound (since the melting point of LiOH is 462° C. and the melting point of KOH is 360° C.), and finally, the temperature of the LiOH vessel is heated to 900° C. and the KOH vessel is heated to 700° C.

Herein, monitoring the temperature of the vessel by using a thermocouple mounted inside the vessel make it possible to keep the temperature of the vessel constant so that the molten carbonate electrolyte precursor powder is maintained in a molten state and has a desired vapor pressure. As a result, LiOH vapor (about 1.75×10$^{-4}$, see [Table 1]) is generated from the completely melted LiOH powder, and KOH vapor (about 9.20×10$^{-4}$, see [Table 1]) is generated from the completely melted KOH powder. The vapors thus generated are supplied to the air electrode (first electrode) of the MCFC together with a carrier gas containing helium gas (97%) and water vapor (3%, 25° C. saturator) at a flow rate (Av) of 1.59×10$^{-2}$ L/sec (952 ml/min).

In addition, a reaction gas containing hydrogen (72%), carbon dioxide (18%), and water vapor (10%) is supplied to the fuel electrode (second electrode) of the MCFC through the second gas supply device at a flow rate of 6.67×10$^{-3}$ L/sec (400 ml/min).

Next, a current of 10 mA/cm$^2$ [a current greater than the current required for the reaction (1.1 mA/cm$^2$) is applied so as to generate more amounts of oxygen and carbon dioxide, see Mathematical Equations 4 and 7] is applied to the MCFC for 320 minutes (see Mathematical Equations 5 and 8) so that water electrolysis reaction takes place in the MCFC. Herein, the amount of current applied is calculated by Mathematical Equations 4 and 7, and this is the sum of the calculated values. The time for current application is calculated by Mathematical Equations 5 and 8, and this represents the longer time among the calculated values.

Amount of current applied (mA/cm$^2$)=
($W_{LiOH,900°\,C.}$×1.59×10$^{-2}$ (L/sec)/22.4
(L/mol))×F(A·sec/mol)×1000(mA/A)/25 cm$^2$=
1.1 mA/cm$^2$ [Mathematical Equation 4]

Time required for LiOH evaporation (sec)=(amount of LiOH supplied (100 mg)/1000(mg/g)/ $M_{LiOH}$)/($W_{LiOH,900° C.}$×1.59×10$^{-2}$ (L/sec)/22.4 (L/mol))=320 min    [Mathematical Equation 5]

The amount of $Li_2CO_3$ generated can be calculated by Mathematical Equation 6 if the entire amount of LiOH added reacts with carbon dioxide supplied by the electrochemical reaction of water electrolysis (see Reaction Formula 4) to generate $Li_2CO_3$ in the MCFC.

Amount of $Li_2CO_3$ generated (mg/cm$^2$)=(amount of LiOH supplied (100 mg)/1000(mg/g)/$M_{LiOH}$)× $M_{Li2CO3}$/25 cm$^2$=3.5 mg/cm$^2$    [Mathematical Equation 6]

In the same manner, in case of KOH, the amount of current applied can be calculated by Mathematical Equation 7, and the time required for KOH evaporation can be calculated by Mathematical Equation 8. In addition, the amount of $K_2CO_3$ generated in the MCFC can be calculated by Mathematical Equation 9 if the entire amount of KOH added reacts with carbon dioxide supplied by the electrochemical reaction of water electrolysis (see Reaction Formula 4) to generate $K_2CO_3$ in the MCFC.

Amount of current applied (mA/cm$^2$)= ($W_{KOH,700° C.}$×6.67×10$^{-3}$ (L/sec)/22.4 (L/mol))× F(A·sec/mol)×1000(mA/A)/ 25 cm$^2$=1.1 mA/cm$^2$    [Mathematical Equation 7]

Time required for KOH evaporation (sec)=(amount of KOH supplied (100 mg)/1000(mg/g)/$M_{KOH}$)/ ($W_{KOH,700° C.}$×6.67×10$^{-3}$ (L/sec)/22.4 (L/mol))=109 min    [Mathematical Equation 8]

Amount of $K_2CO_3$ generated (mg/cm$^2$)=(amount of KOH supplied (100 mg)/1000(mg/g)/$M_{KOH}$)× $M_{K2CO3}$/25 cm$^2$=3.7 mg/cm$^2$    [Mathematical Equation 9]

In Mathematical Equations 4 to 9, F is the Faraday constant, $W_{LiOH,900° C.}$ is the LiOH vapor pressure 1.75× 10$^{-4}$ at the vessel temperature (900° C.), and $W_{KOH,700° C.}$ is the KOH vapor pressures 2.04×10$^{-3}$ at the vessel temperature (700° C.). $M_{LiOH}$ and $M_{KOH}$ are respectively the molecular weight of LiOH (23.95 g/mol) and the molecular weight of KOH (74.11 g/mol), and $M_{Li2CO3}$ and $M_{K2CO3}$ are respectively the molecular weight of $Li_2CO_3$ (73.89 g/mol) and the molecular weight of $K_2CO_3$ (138.20 g/mol).)

As a result of calculation by Mathematical Equations 6 and 9, it can be seen that the $Li_2CO_3$ molten carbonate electrolyte is generated by 3.5 mg/cm$^2$ and the $K_2CO_3$ molten carbonate electrolyte is generated by 3.7 mg/cm$^2$.

Thereafter, 10 mg of LiOH of a molten carbonate electrolyte precursor compound is repeatedly supplied five times in total (see FIGS. 7 to 9) in order to add $Li_2CO_3$ molten carbonate electrolyte which is much consumed at the initial stage. In addition, 5 mg of LiOH and 5 mg of KOH, which are molten carbonate electrolyte precursor compounds, are respectively supplied (see FIG. 7).

Referring to FIG. 7, as a result, it is confirmed that the lifetime of a standard cell to which a molten carbonate electrolyte is not added at 720° C. is shorter than 170 hours, but the MCFC according to Example 1 in which the molten carbonate electrolyte is periodically refilled, is stably operated for 300 hours or longer without performance deterioration as described above.

Referring to FIG. 8, in case of a standard cell to which a molten carbonate electrolyte is not additionally supplied, the internal resistance (IR) value rapidly increases after 150 hours of operation (at 720° C. and 160 mA/cm$^2$). However, in case of the MCFC according to Example 1 in which the molten carbonate electrolyte is periodically refilled as described above, it is confirmed that the internal resistance hardly increase as the internal resistance changes from 2.1 Ω·cm$^2$ to 2.6 Ω·cm$^2$ after 300 hours of operation.

Referring to FIG. 9, in case of a standard cell to which a molten carbonate electrolyte is not additionally supplied, the incidence rate of nitrogen cross-over begins to rapidly increase after 120 hours of operation (at 720° C. and 160 mA/cm$^2$) and exceeds 1%. However, in case of the MCFC according to Example 1 in which the molten carbonate electrolyte is periodically refilled as described above, it is confirmed that the incidence rate of nitrogen cross-over is maintained within 0.4% to be close to the initial value (0.35%) even during the operation for 300 hours.

Meanwhile, in case of supplying a small amount of electrolyte precursor compound (for example, the seventh addition of molten carbonate electrolyte to supply 5 mg of LiOH and 5 mg of KOH, respectively, see FIG. 7) as described above, carbon dioxide can be discharged to the air electrode (first electrode portion) in a level of ppm by corrosion or pyrolysis at a high temperature of the molten carbonate electrolyte of MCFC itself, and there is thus a possibility that a small amount of molten carbonate electrolyte is generated even if carbon dioxide is not additionally supplied to the fuel electrode (second electrode portion). However, considering workability and efficiency, it is considered preferable to supply the reaction gas containing carbon dioxide through the second gas supply device when supplying the molten carbonate electrolyte precursor compound through the first gas supply device for the generation and addition of molten carbonate electrolyte.

Example 2: Water Electrolysis Mode (Current Application) After Initial Cell Performance Deterioration Referring to FIGS. 10 to 12, electrolyte addition is performed in the initial cell performance deterioration period (after 120 hours of operation under the conditions presented in [Table 2]) in which the MCFC performance is not significantly changed as the output is 0.87 V at 160 mA/cm$^2$ but the internal resistance value is increased to about two-fold (0.51 Ω·cm$^2$) the initial value (0.26 Ω·cm$^2$) and the incidence rate of nitrogen cross-over (%) is increased to approximately 1.3%.

First, 100 mg of LiOH.H$_2$O electrolyte precursor compound is melted to produce a vapor while maintaining the temperature of the MCFC at 720° C., and the vapor (900° C.) thereof is supplied to the air electrode (first electrode portion) of the MCFC together with the carrier gas at a flow rate of 1.59×10$^{-2}$ L/sec (952 ml/min) through the first gas supply device. Subsequently, a current of 10 mA/cm$^2$ (0.25 A) is applied thereto for 320 minutes (calculated by Mathematical Equation 4 and Mathematical Equation 5) so that the water electrolysis reaction take place. As a result, a Li$_2$CO$_3$ molten carbonate electrolyte is generated and added in the interior of the MCFC (first additional supply of molten carbonate electrolyte).

As a result, it is confirmed that the performance of the MCFC is slightly improved (see FIG. 11) as compared to that before the addition of the Li$_2$CO$_3$ molten carbonate electrolyte, the internal resistance value of the MCFC is decreased to about 0.4 Ω·cm$^2$ so as to be improved by about 20% (see FIG. 10), and the incidence rate of nitrogen cross-over (%) is decreased by about 40% (see FIG. 12).

Thereafter, a Li$_2$CO$_3$ molten carbonate electrolyte is additionally supplied (second additional supply of molten carbonate electrolyte) by using 100 mg of LiOH.H$_2$O electrolyte precursor compound in a water electrolysis mode, and a $K_2CO_3$ molten carbonate electrolyte is additionally supplied (third additional supply of molten carbonate electrolyte) by using 100 mg of KOH electrolyte precursor compound in a water electrolysis mode as third addition. Herein, the temperature of the MCFC is maintained at 720° C. and the carrier gas is supplied at a flow rate of $6.67 \times 10^{-3}$ L/sec (400 ml/min).

As a result, there is no significant change in the performance of the MCFC after the addition of $Li_2CO_3$ molten carbonate electrolyte (second additional supply of molten carbonate electrolyte) and the addition of $K_2CO_3$ molten carbonate electrolyte (third additional supply of molten carbonate electrolyte)(see FIG. 11), but the internal resistance value tends to decrease (see FIG. 10). In addition, the incidence rate of nitrogen cross-over (%) is improved every time when the electrolyte is additionally supplied so as to be greatly decreased from 1.3% of the initial value to 0.75% (see FIG. 12). Particularly, the performance improving effect is greater in case of adding $Li_2CO_3$ electrolyte by using $LiOH \cdot H_2O$ than in case of adding $K_2CO_3$ electrolyte by using KOH, and it is considered that this is because consumption of the molten carbonate electrolyte at the initial stage of MCFC operation is mainly led by the consumption of $Li_2CO_3$ electrolyte due to the lithiation of the air electrode of the MCFC and the corrosion of the current collector, etc.

Example 3: Water Electrolysis Mode (Current Application) After Remarkable Cell Performance Deterioration Referring to FIGS. 10 to 12, a molten carbonate electrolyte is additionally supplied at a level at which the lifetime of the MCFC almost runs out (0.3 V at 160 mA/cm², after 210 hours of operation under the conditions presented in [Table 2]) (fourth additional supply of molten carbonate electrolyte). Herein, $Li_2CO_3$ electrolyte and $K_2CO_3$ electrolyte are added at the same time by mixing 175 mg of $LiOH \cdot H_2O$ and 144 mg of KOH (molten carbonate electrolyte eutectic composition: 62 mol % $Li_2CO_{3/38}$ mol % $K_2CO_3$) under the same operating conditions as described in Example 2. The processes performed are as follows.

First, mixed powders of 175 mg of $LiOH \cdot H_2O$ powder and 144 mg of KOH powder are melted together in a precursor vessel at 900° C. to generate LiOH vapor and KOH vapor (vapor pressure: $1.75 \times 10^{-4}$ and $4.00 \times 10^{-2}$, respectively, see [Table 1]), and these vapors are supplied to the air electrode of the MCFC together with a helium (100%) carrier gas at a flow rate (Av) of $1.59 \times 10^{-2}$ L/sec (952 ml/min). A reaction gas containing hydrogen (72%), carbon dioxide (18%), and water vapor (10%) is supplied to the fuel electrode of the MCFC through the second gas supply device at a flow rate of $6.67 \times 10^{-3}$ L/sec (400 ml/min). Subsequently, a current of 10 mA/cm² (0.25 A) is applied thereto for 320 minutes (calculated by Mathematical Equation 4 and Mathematical Equation 5) so that the water electrolysis reaction take place. As a result, a $Li_2CO_3$ molten carbonate electrolyte and a $K_2CO_3$ molten carbonate electrolyte are generated and added in the interior of the MCFC.

As a result, both the internal resistance improvement (see FIG. 10) and the performance improvement (see FIG. 11) are more effective in case of adding $Li_2CO_3$ electrolyte and $K_2CO_3$ electrolyte at the same time by mixing $LiOH \cdot H_2O$ and KOH than in case of adding $K_2CO_3$ electrolyte singly using KOH. It is considered that this is also because the consumption of electrolyte at the initial stage of MCFC operation is mainly led by the consumption of $Li_2CO_3$ electrolyte.

Particularly, in case of adding $Li_2CO_3$ electrolyte and $K_2CO_3$ electrolyte at the same time by mixing $LiOH \cdot H_2O$ and KOH when the cell performance is greatly deteriorated, it is confirmed that the performance of the MCFC is immediately restored as illustrated in FIG. 11. In addition, as illustrated in FIG. 10, it is confirmed that the internal resistance is improved by 30% or more and the incidence rate of nitrogen cross-over (%) decreases from 0.75% to 0.55% as illustrated in FIG. 12.

However, the MCFC performance is not recovered to the initial level as in case of Example 1 in which the molten carbonate electrolyte is additionally supplied before the cell performance deterioration (when the incidence rate of nitrogen cross-over (%) is less than 1%) (see FIG. 11). As reported in the literatures, this is in agreement with the results showing that the cell performance is not recovered to the initial level in a performance deterioration period in which the molten carbonate electrolyte inside the electrode is once completely depleted and the molten carbonate electrolyte of the matrix begins to be consumed, even if the molten carbonate electrolyte is forcibly added from the outside. That is, a nitrogen cross-over phenomenon may occur as the molten carbonate electrolyte of the matrix begins to be consumed, and thereafter, hydrogen and oxygen of the reaction gas may be mixed together to cause chemical combustion when the nitrogen cross-over phenomenon continues and the incidence rate of nitrogen cross-over increases to about 1% or more. This combustion of the fuel gas may involve a localized hot spot, which accelerates corrosion, and eventually accelerates the electrolyte loss and as a result, performance of the molten carbonate fuel cell may drastically deteriorate. In case of adding the molten carbonate electrolyte in this state, the problem of an increase in electrode polarization due to consumption of the molten carbonate electrolyte can be improved, but it is difficult to improve the problem of an increase in internal resistance due to corrosion. Accordingly, in a cell deterioration period in which the corrosion is accelerated by consumption of the molten carbonate electrolyte in the matrix (the period in which the incidence rate of nitrogen cross-over is 1% or more), it is not possible to recover the cell performance to the initial level by merely additionally refilling the molten carbonate electrolyte. However, even when the performance of the MCFC is deteriorated, additional performance deterioration of the MCFC is able to be prevented by additionally supplying the molten carbonate electrolyte through the processes described above. As a result, the cell lifetime is further prolonged as compared to a general MCFC (standard cell) which is operated under the same conditions but is not additionally supplied with a molten carbonate electrolyte (see FIG. 11).

Example 4: Fuel Cell Mode (Current Generation) After Remarkable Cell Performance Deterioration The MCFC unit cell of which the performance is recovered according to Example 3 is subjected to harsh operation so as to exhibit performance of 0.35 V at 160 mA/cm² or less again (high current density operation at 400 mA/cm²), and a molten carbonate electrolyte is then additionally supplied in the period in which the cell lifetime almost runs out (fifth additional supply of molten carbonate electrolyte). The processes performed are as follows.

The operation of the unit MCFC of 5×5 cm² being operated at 720° C. is temporarily stopped, and then the same process as described in Example 1 is performed to purge the interior of the fuel electrode (first electrode) of the MCFC. The reaction gas such as carbon dioxide and oxygen that possibly remained in the MCFC is thus completely removed.

Thereafter, 175 mg of $LiOH \cdot H_2O$ powder and 144 mg of KOH powder which are solid at a room temperature are mixed so as to have a molten carbonate electrolyte eutectic composition (62 mol % $Li_2CO_3$/38 mol % $K_2CO_3$) and put in a molten carbonate electrolyte precursor vessel, and the vessel is inserted into the first gas supply device connected to the fuel electrode (first electrode) of the MCFC. Subsequently, the LiOH vapor and the KOH vapor are generated by melting the mixed powder of $LiOH \cdot H_2O$ powder and KOH powder by controlling the vessel temperature to 700° C. Herein, the temperature of the vessel is maintained at 700° C. (melting point of LiOH: 462° C. and melting point of KOH: 360° C.) by monitoring the temperature of the vessel using a thermocouple mounted inside the vessel. The vapors thus generated are supplied to the fuel electrode (first electrode) of the MCFC together with a carrier gas containing nitrogen gas (32%), hydrogen (50%), and water vapor (18%, 70° C. saturator) at a flow rate (Av) of $6.67 \times 10^{-3}$ L/sec (400 ml/min). In addition, a reaction gas containing air (70%) and carbon dioxide (30%) is supplied to the air electrode (second electrode) of the MCFC through the second gas supply device at a flow rate of $6.67 \times 10^{-3}$ L/sec (400 ml/min).

The MCFC is operated in the fuel cell mode by generating a current of 10 mA/cm$^2$ (0.25 A) for 320 minutes (see Mathematical Equation 4 and Mathematical Equation 5) in a state of maintaining the cell temperature and the flow rate of carrier gas. As a result, a $Li_2CO_3$ electrolyte and a $K_2CO_3$ electrolyte are generated and added in the interior of the MCFC.

Referring to FIGS. 10 to 12, as a result, after supplying the molten carbonate electrolyte in the fuel cell mode through the processes as described above, it is confirmed that the internal resistance of the cell is decreased (see FIG. 10) and the cell performance is improved (see FIG. 11). In addition, as illustrated in FIG. 12, it is confirmed that the incidence rate of nitrogen cross-over is recovered to the level measured at the time of initial operation of the MCFC. However, the cell performance is not recovered to the level measured at the time of initial operation, and it is considered that the effect by additional supply of the molten carbonate electrolyte is halved by the corrosion phenomenon due to depletion of the electrolyte in the matrix as described in Example 3. However, as a result, it can be seen that it is possible to additionally supply the molten carbonate electrolyte by using the fuel cell mode and thus to solve the problem of cell performance deterioration due to consumption of the electrolyte.

Example 5: Addition of Molten Carbonate Electrolyte Using Reaction Gas Diffusion by Concentration Difference A unit MCFC having an open circuit voltage to be 90% or less of the theoretical open circuit voltage and an incidence rate of nitrogen cross-over of 2% or more is subjected to the following processes.

$LiOH \cdot H_2O$ (lithium hydroxide monohydrate) powder and $NaOH \cdot H_2O$ (sodium hydroxide monohydrate) powder which are solid at a room temperature are mixed at a ratio of 52 mol % $Li_2CO_3$:48 mol % $Na_2CO_3$ of the molten carbonate eutectic composition. This mixed powder is used to generate a mixed vapor of $LiOH \cdot H_2O$ and $NaOH \cdot H_2O$, and the mixed vapor thus generated is supplied to the air electrode (first electrode portion) of the MCFC together with a carrier gas containing helium gas (97%) and water vapor (3%, 25° C. saturator) at a flow rate (Av) of $6.67 \times 10^{-3}$ L/sec (400 ml/min). In addition, a reaction gas containing hydrogen (72%), carbon dioxide (18%), and water vapor (10%) is supplied to the fuel electrode (second electrode) of the MCFC through the second gas supply device at a flow rate of $6.67 \times 10^{-3}$ L/sec (400 ml/min). Subsequently, by using the concentration difference of the reaction gas between the air electrode (first electrode portion) and the fuel electrode (second electrode portion) of the MCFC, the carbon dioxide-containing reaction gas is diffused from the fuel electrode (second electrode portion) to the air electrode (first electrode portion) through the matrix crack-generated and/or pinhole-generated portion. Accordingly, a two-component molten carbonate electrolyte containing $Li_2CO_3$ and $Na_2CO_3$ is generated in the air electrode (first electrode portion) and the matrix crack-generated portion of the MCFC.

As a result, it is confirmed that the measurement open circuit voltage of the MCFC is recovered to 98% or more of the theoretical open circuit voltage and the incidence rate of nitrogen cross-over is improved from 2% to 0.5% or less. Hence, it can be seen that it is possible to additionally supply the molten carbonate electrolyte to a MCFC having defects such as matrix cracks and/or pinholes by the above-described method and thus to solve the problem of deterioration in performance and lifetime of cell. Furthermore, it can be seen that it is possible to effectively improve the performance and lifetime of cell by the above-described method even in a case in which the performance and lifetime of cell are deteriorated by the depletion of electrolyte at the electrolyte sealing site.

Example 6: Addition of Molten Carbonate Electrolyte Using Reaction Gas Transfer by Pressure Difference A unit MCFC having an open circuit voltage to be 85% or less of the theoretical open circuit voltage and an incidence rate of nitrogen cross-over of 2.5% or more is subjected to the following processes.

$LiOH \cdot H_2O$ (lithium hydroxide monohydrate) powder and $KOH \cdot H_2O$ (potassium hydroxide monohydrate) powder which are solid at a room temperature are mixed at a ratio of 62 mol % $Li_2CO_3$:38 mol % $Na_2CO_3$ of the molten carbonate eutectic composition. This mixed powder is used to generate a mixed vapor of $LiOH \cdot H_2O$ and $KOH \cdot H_2O$, and the mixed vapor thus generated is supplied to the fuel electrode (first electrode portion) of the MCFC together with a carrier gas containing hydrogen (72%), nitrogen gas (18%), and water vapor (10%, 70° C. saturator) at a flow rate (Av) of $3.33 \times 10^{-3}$ L/sec (200 ml/min). In addition, a reaction gas containing air (70%) and carbon dioxide (30%) is supplied to the air electrode (second electrode) of the MCFC through the second gas supply device at a flow rate of $1 \times 10^{-2}$ L/sec (600 ml/min). Subsequently, by using the pressure difference between the fuel electrode (first electrode portion) and the air electrode (second electrode portion) of the MCFC due to the flow rate difference, the carbon dioxide-containing reaction gas is diffused from the air electrode (second electrode portion) to the fuel electrode (first electrode portion) through the matrix crack-generated and/or pinhole-generated portion. Accordingly, a two-component molten carbonate electrolyte containing $Li_2CO_3$ and $K_2CO_3$ is generated in the fuel electrode (first electrode portion) and the matrix crack-generated portion of the MCFC.

As a result, it is confirmed that the measurement open circuit voltage of the MCFC is recovered to 99% or more of the theoretical open circuit voltage and the incidence rate of nitrogen cross-over is improved from 2.5% to 0.45% or less. Hence, it can be seen that it is possible to additionally supply the molten carbonate electrolyte to a MCFC having defects such as matrix cracks and/or pinholes by the above-described method and thus to solve the problem of deterioration in performance and lifetime of cell. Furthermore, it can be seen that it is possible to effectively improve the performance and lifetime of cell by the above-described method even in a case in which the performance and lifetime of cell are deteriorated by the depletion of electrolyte at the electrolyte sealing site.

Example 7: Control of Generation Amount of Two or More Molten Carbonate Electrolyte Precursor Compound Vapors/Water Electrolysis Mode (Current Application)

MCFC operated at 650° C. for 500 hours or longer so that the internal resistance value thereof is increased from 0.3 $\Omega \cdot cm^2$ of the initial to 0.42 $\Omega \cdot cm^2$ and the cell performance also deteriorated from 0.85 V at 160 mA/$cm^2$ to 0.77 V at 160 mA/$cm^2$ is subjected to the following processes under the same conditions presented in Table 2 except that the operating temperature is 650° C.

First, two different first gas supply devices equipped with a heating device are connected to the air electrode (first electrode) of the MCFC and purged by supplying nitrogen gas to each of the first gas supply devices at $6.67 \times 10^{-3}$ L/sec (400 ml/min).

Thereafter, 175 mg of LiOH.$H_2O$ powder is prepared and filled in the first electrolyte precursor compound vessel, and this is inserted into the first gas supply device. The temperature of the first electrolyte precursor compound vessel is controlled to and maintained at 900° C. by using a heating device mounted to the first gas supply device. In addition, 144 mg of KOH powder is prepared and filled in a second electrolyte precursor compound vessel, and this is inserted into a separate first gas supply device different from the first gas supply device into which the first electrolyte precursor compound vessel is inserted. The temperature of the second electrolyte precursor compound vessel is controlled to and maintained at 600° C. by using a heating device mounted to the separate first gas supply device. Accordingly, LiOH vapor having a vapor pressure of $1.75 \times 10^{-4}$ is generated from the first electrolyte precursor compound vessel maintained at 900° C., KOH vapor having a vapor pressure of $1.05 \times 10^{-4}$ is generated from the second electrolyte precursor compound vessel maintained at 600° C. (see Table 1), and the mixed vapor having a composition of 62 mo % LiOH: 32 mol % KOH is supplied to the air electrode (first electrode) of the MCFC.

Subsequently, the MCFC is operated in the water electrolysis mode by applying a current of 10 mA/$cm^2$ (0.25 A) for 13 hours (see FIG. 1A). Accordingly, a molten carbonate electrolyte having a composition of 62 mol % $Li_2CO_3$: 32 mol % $K_2CO_3$ is generated and added in the interior of the MCFC. Herein, the time required for the final reaction is calculated by using Mathematical Equation 5 and Mathematical Equation 8, and the amount of current applied is calculated by using Mathematical Equation 4 and Mathematical Equation 7. As a result, the internal resistance of the MCFC decreased to 0.31 $\Omega \cdot cm^2$ being close to the initial internal resistance (0.3 $\Omega \cdot cm^2$) and the cell performance is also improved from 0.77 V at 160 mA/$cm^2$ to 0.83 V at 160 mA/$cm^2$ being close to the initial value.

Example 8: Addition of Molten Carbonate Electrolyte After Intentional Shortage of Initial Molten Carbonate Electrolyte Amount/Water Electrolysis Mode (Current Application) and Fuel Cell Mode (Current Generation)

In the present Example, MCFC unit cell is subjected to the following processes under the same conditions presented in [Table 2] except that the operating temperature is 650° C.

In general, the initial input amount of electrolyte is determined on the assumption that 100% of the matrix porosity, 40% of the air electrode porosity, and 20% of the fuel electrode porosity are filled with the molten carbonate electrolyte, but in the present Example, for the condition in which the electrolyte is in an initial amount smaller than such a general amount, the molten carbonate electrolyte is intentionally input in an amount capable of filling only 70% of the matrix porosity at the time of the unit cell mounting. The initial internal resistance and incidence rate of nitrogen cross-over of the unit cell after reaching the operating temperature of 650° C. are respectively 0.7 $\Omega \cdot cm^2$ and 0.8% which are about two-fold or more the internal resistance (0.3 $\Omega \cdot cm^2$) and the incidence rate of nitrogen cross-over (0.4%) of a general cell in which the molten carbonate electrolyte is sufficiently input. In addition, the initial cell performance is 0.62 V at 160 mA/$cm^2$, which is much lower than 0.85 V at 160 mA/$cm^2$ of the initial performance of the general cell. In order to perform a process of adding the molten carbonate electrolyte to the MCFC having such initial shortage of molten carbonate electrolyte, a large-capacity electrolyte adding vessel is used in the form of a saturator as illustrated in FIG. 5 since a large amount of electrolyte is required to be added in the present Example. That is, in the present Example, by using an electrolyte precursor saturator as illustrated in FIG. 5, two different saturators of molten carbonate electrolyte precursor compound 160, namely, a first precursor saturator for generating LiOH vapor and a second precursor saturator for generating KOH vapor are sequentially positioned in the first gas supply device 140, and the vapor pressures of the LiOH vapor and the KOH vapor are controlled respectively by controlling the temperature of the saturators to be different from each other by using the heating device 190 so that mixed vapor having a composition of 62 mol % LiOH: 32 mol % KOH is generated.

The specific processes performed are as follows. That is, LiOH powder is prepared and filled in the first electrolyte precursor compound saturator (a device for allowing the carrier gas to pass through the liquid precursor compound and to reach the equilibrium vapor pressure) of FIG. 5, and the temperature of the saturator is maintained at 900° C. of the operating temperature for electrolyte addition by using the heating device 190 and the thermocouple 162.

Herein, the carrier gas (helium gas used) supplied to the first gas supply device 140 is allowed to bubble in the large precursor compound vessel 160 serving as a saturator and supplied to the first electrode 120. In addition, KOH powder is prepared and filled in the second electrolyte precursor compound saturator of FIG. 5, the temperature of the saturator is maintained at 600° C. by using the heating device 190 and a thermocouple 162, and the KOH vapor is supplied to a separate first gas supply device 140 as in the case of LiOH.

Accordingly, LiOH vapor having a vapor pressure of $1.75\times10^{-4}$ is generated from the first electrolyte precursor compound saturator maintained at 900° C., KOH vapor having a vapor pressure of $1.05\times10^{-4}$ is generated from the second electrolyte precursor compound saturator maintained at 600° C. (see [Table 1]), and the mixed vapor having a composition of 62 mo % LiOH: 32 mol % KOH is supplied to the air electrode (first electrode) of the MCFC. Herein, each carrier gas (helium) is input at a flow rate of 1 L/min.

Subsequently, the MCFC is operated in the water electrolysis mode by applying a current of 10 mA/cm² (0.25 A) for 20 hours (four-fold the amount of electrolyte input in the previous Examples, that is, 400 mg of LiOH and 576 mg of KOH) (see FIG. 1A). Herein, the time required for current application is calculated by using Mathematical Equation 5 and Mathematical Equation 8, and the amount of current applied is calculated by using Mathematical Equation 4 and Mathematical Equation 7. Accordingly, a molten carbonate electrolyte having a composition of 62 mol % $Li_2CO_3$: 32 mol % $K_2CO_3$ is generated and added in the interior of the MCFC (first addition of molten carbonate electrolyte).

As a result, the internal resistance of the MCFC decreases from 0.7 Ω·cm² to 0.4 Ω·cm² to be close to the internal resistance of a general cell and the cell performance is improved from 0.62 V at 160 mA/cm² (initial value) to 0.78 V at 160 mA/cm² to be close to the performance of a general cell. In addition, after continuous measurement of the incidence rate of nitrogen cross-over at the outlet of the fuel electrode of the unit cell during the above-described processes, it is confirmed in real time that the occurrence of nitrogen cross-over is improved.

Thereafter, the following processes are performed to additionally supply a molten carbonate electrolyte to the unit cell (second addition of molten carbonate electrolyte).

The same processes as the processes in the first addition of molten carbonate electrolyte are performed to generate a mixed vapor having a composition of 62 mol % LiOH: 32 mol % KOH. The vapors thus generated are supplied to the fuel electrode (first electrode) of the MCFC together with a carrier gas containing nitrogen gas (32%), hydrogen (50%), and water vapor (18%, 70° C. saturator) at a flow rate (Av) of $1.67\times10^{-2}$ L/sec (400 ml/min) through the first gas supply device after passing through the respective electrolyte precursor compound saturators of FIG. 5. In addition, a reaction gas containing air (70%) and carbon dioxide (30%) is supplied to the air electrode (second electrode) of the MCFC through the second gas supply device at a flow rate of $6.67\times10^{-3}$ L/sec (400 ml/min).

Subsequently, the MCFC is operated in the fuel cell mode by applying a current of 10 mA/cm² (0.25 A) for 10 hours (two-fold the amount of electrolyte input in the previous Examples, that is, 200 mg of LiOH and 288 mg of KOH) (see FIG. 1B). Herein, the time required for current application is calculated by using Mathematical Equation 5 and Mathematical Equation 8, and the amount of current applied is calculated by using Mathematical Equation 4 and Mathematical Equation 7. Accordingly, a molten carbonate electrolyte having a composition of 62 mol % $Li_2CO_3$: 32 mol % $K_2CO_3$ is generated and added in the interior of the MCFC.

As a result, the internal resistance of the MCFC slightly decreases from 0.4 Ω·cm² to 0.35 Ω·cm² and the cell performance is improved from 0.78 V at 160 mA/cm² to 0.81 V at 160 mA/cm² as compared to those before the second addition of molten carbonate electrolyte.

<Experiment 2: Case of Using LiI/KI>

In the following Comparative Examples and Examples, the impedance (10,000 Hz to 0.01 Hz) is measured by electrochemical impedance spectroscopy using an apparatus Solatron S1287 and 1255B in the OCV state.

The performance is measured by using an electric loader (ELTO DC Electronics Co., ESL 300Z), and the current density is measured at 50 mA/cm², 100 mA/cm², and 150 mA/cm² at a constant current and an operating temperature of 650° C.

Figure 13:
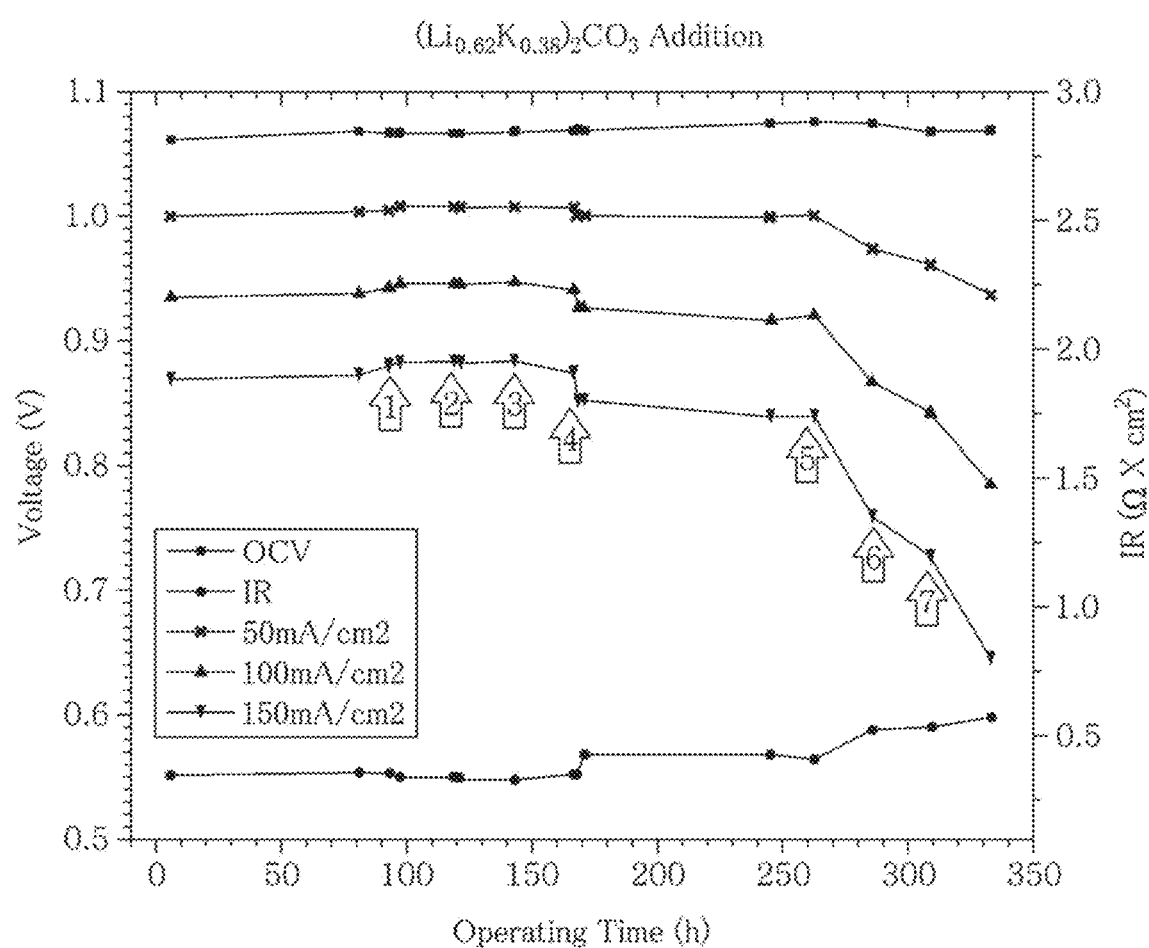
FIG. 13 is a graph illustrating a change in performance of a MCFC to which a molten carbonate electrolyte is additionally supplied according to Example 1 of Experiment 2 of the present invention.
Figure 14:
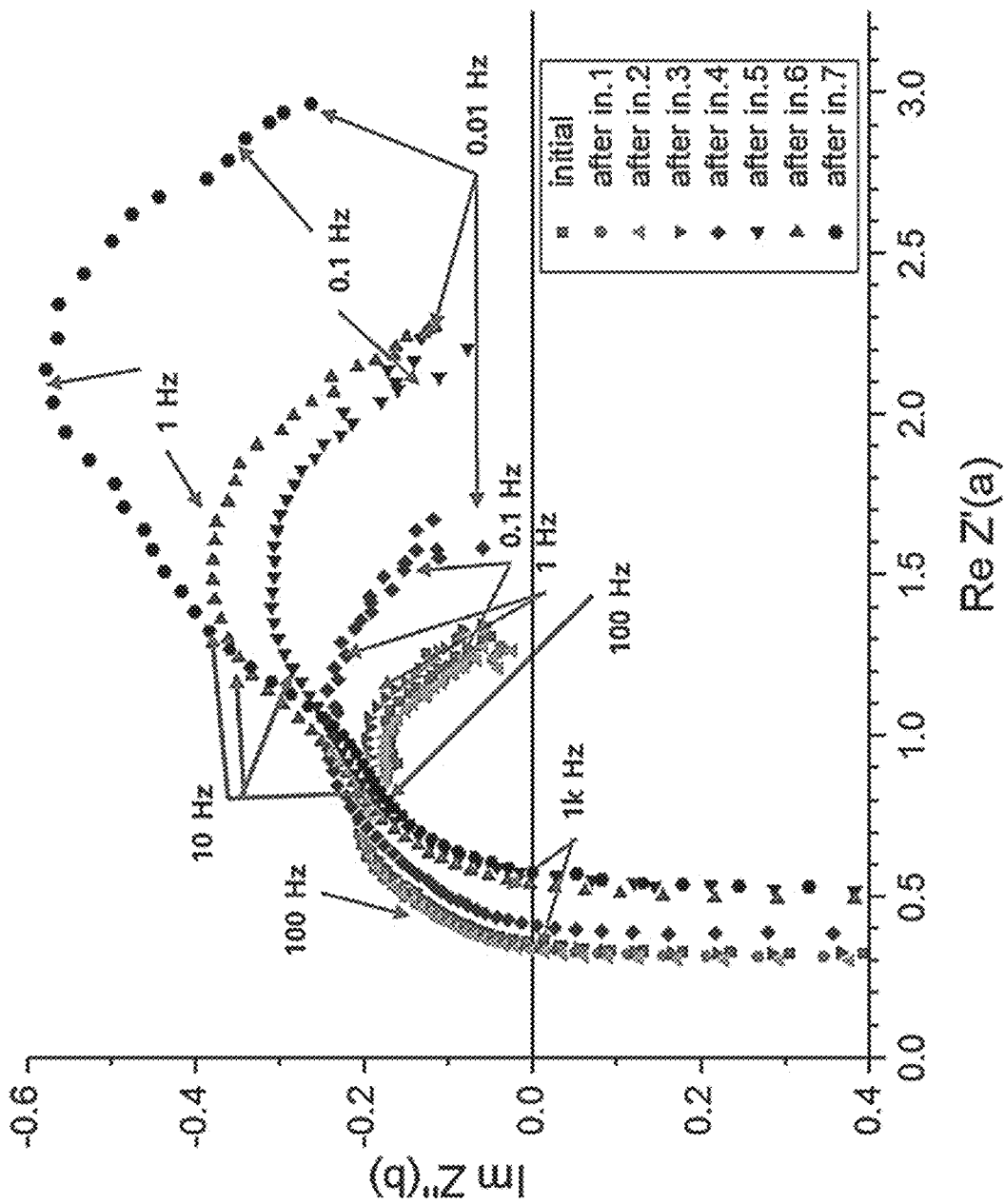
FIG. 14 is a graph illustrating a change in electrochemical impedance spectroscopy of a MCFC to which a molten carbonate electrolyte is additionally supplied according to Example 1 of Experiment 2 of the present invention.
Figure 15:
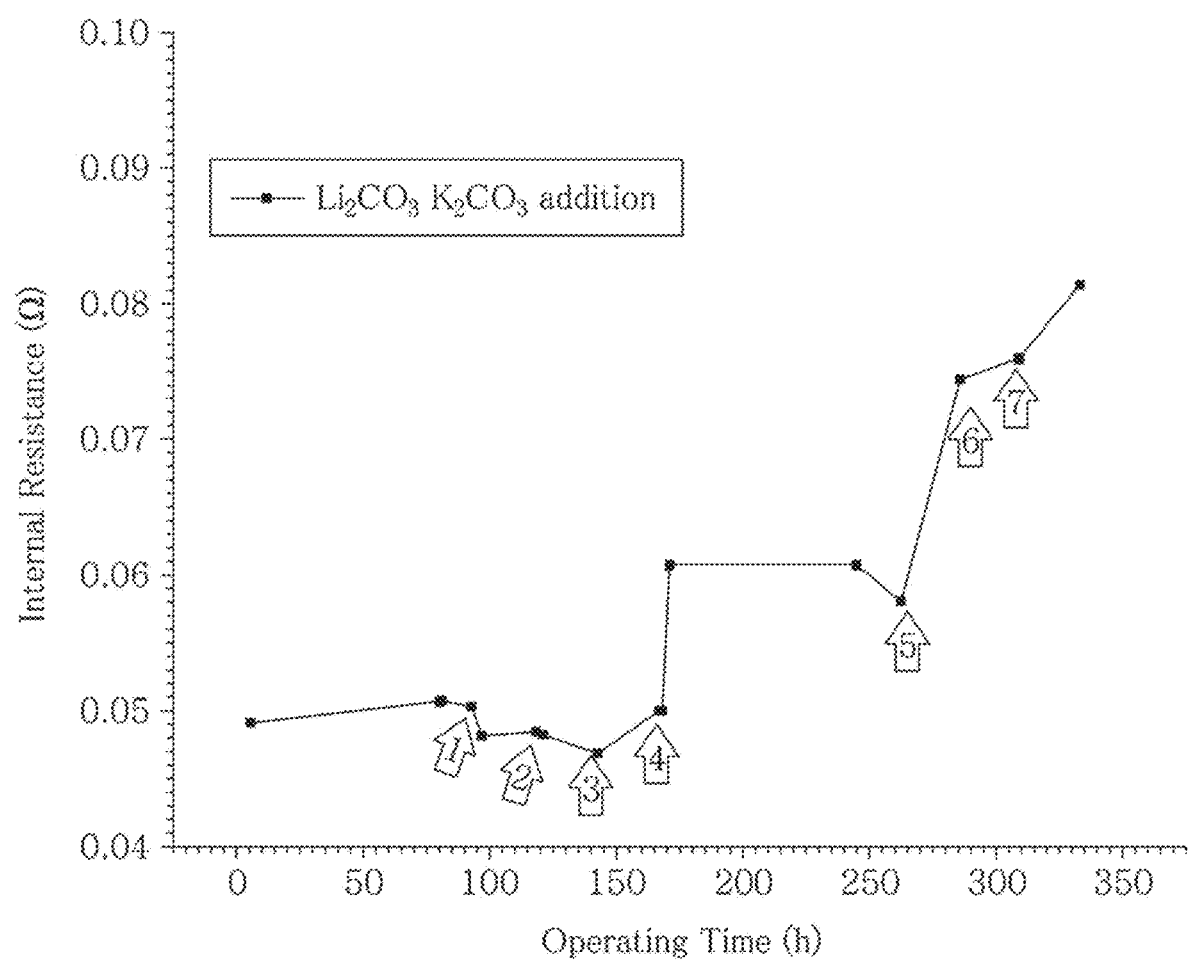
FIG. 15 is a graph illustrating a change in internal resistance (IR) of a MCFC to which a molten carbonate electrolyte is additionally supplied according to Example 1 of Experiment 2 of the present invention.
Figure 16:
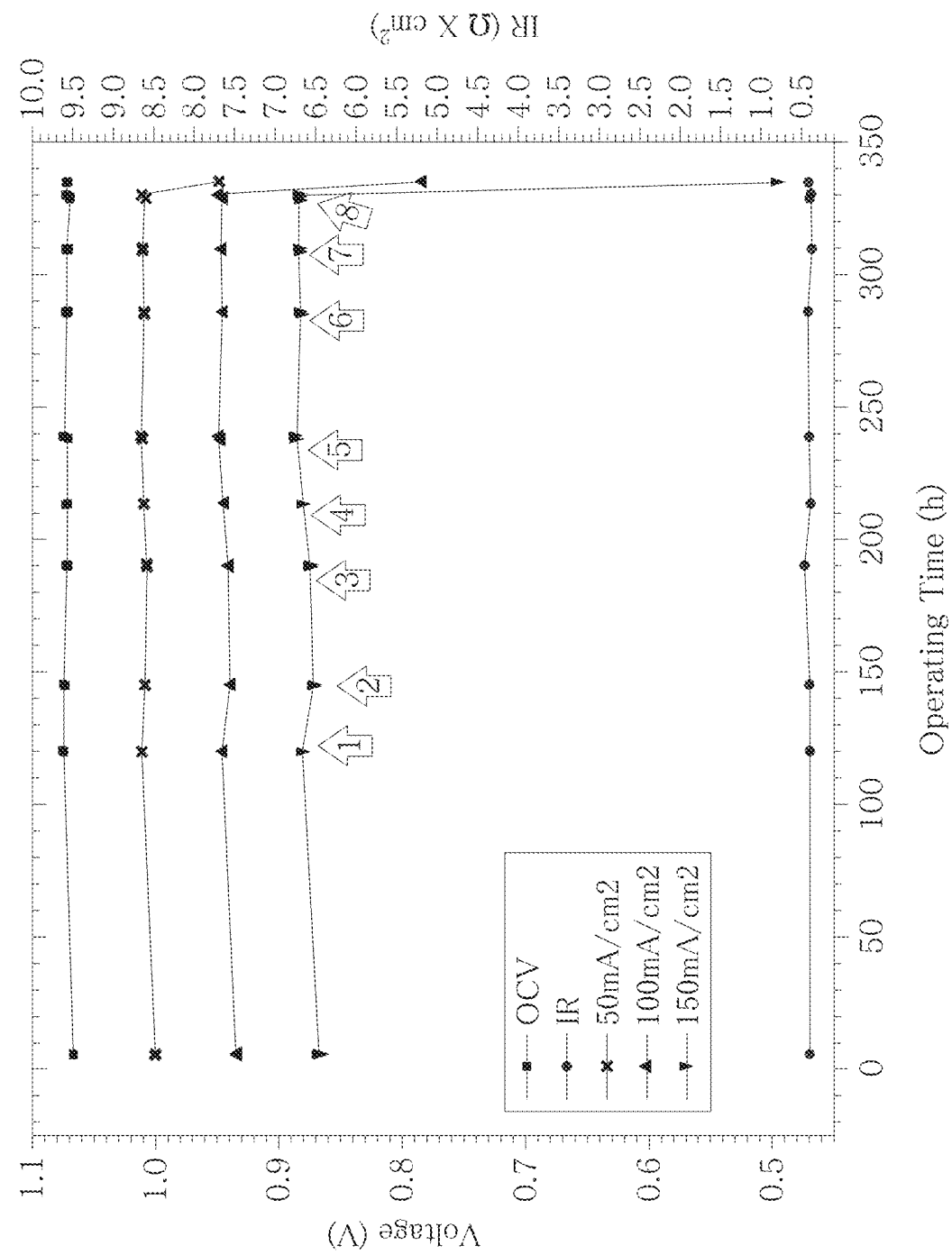
FIG. 16 is a graph illustrating a change in performance of a MCFC to which a molten carbonate electrolyte is additionally supplied according to Examples 2 to 4 of Experiment 2 of the present invention.
Figure 17:
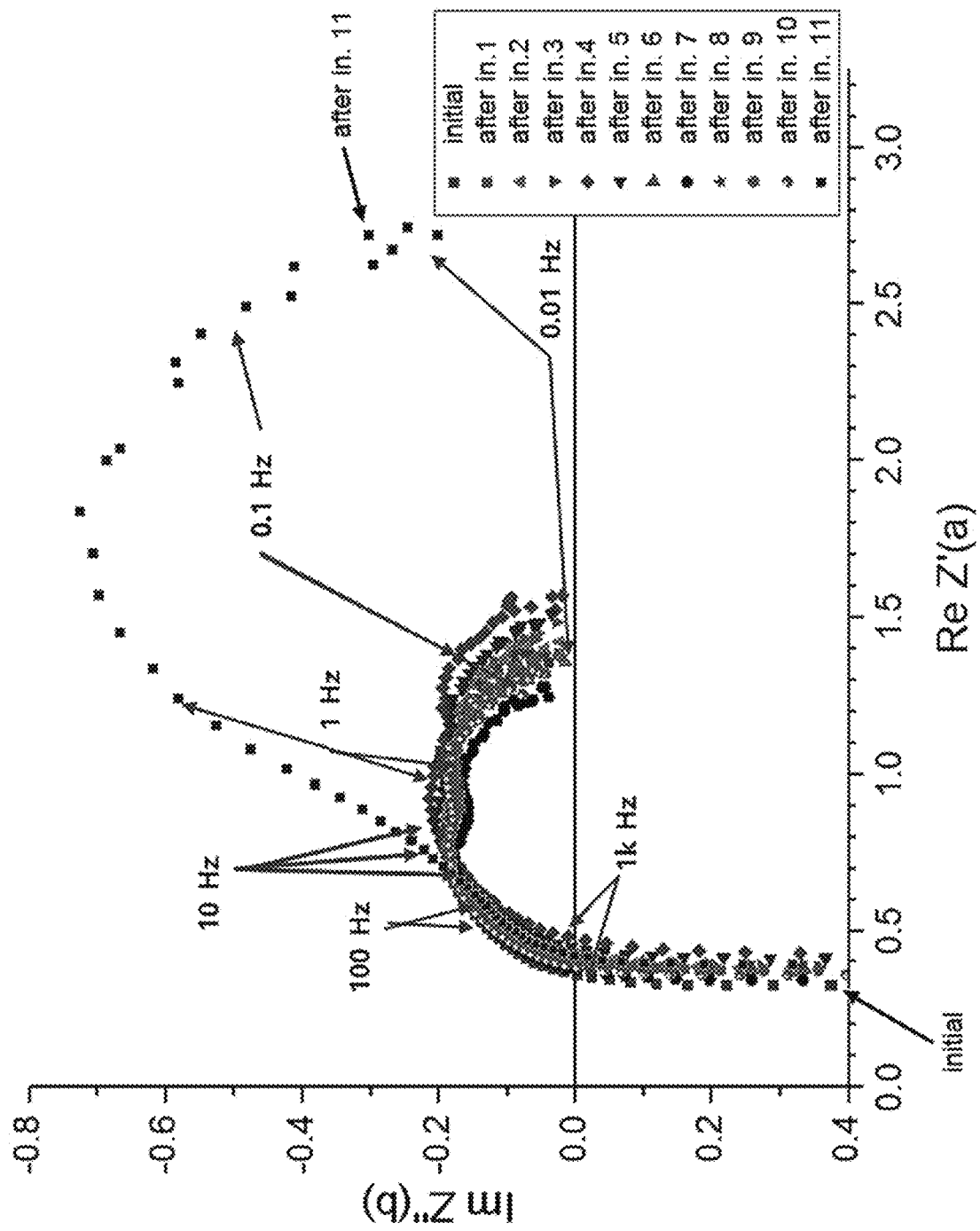
FIG. 17 is a graph illustrating a change in electrochemical impedance spectroscopy of a MCFC to which a molten carbonate electrolyte is additionally supplied according to Examples 2 to 4 of Experiment 2 of the present invention.
Figure 18:
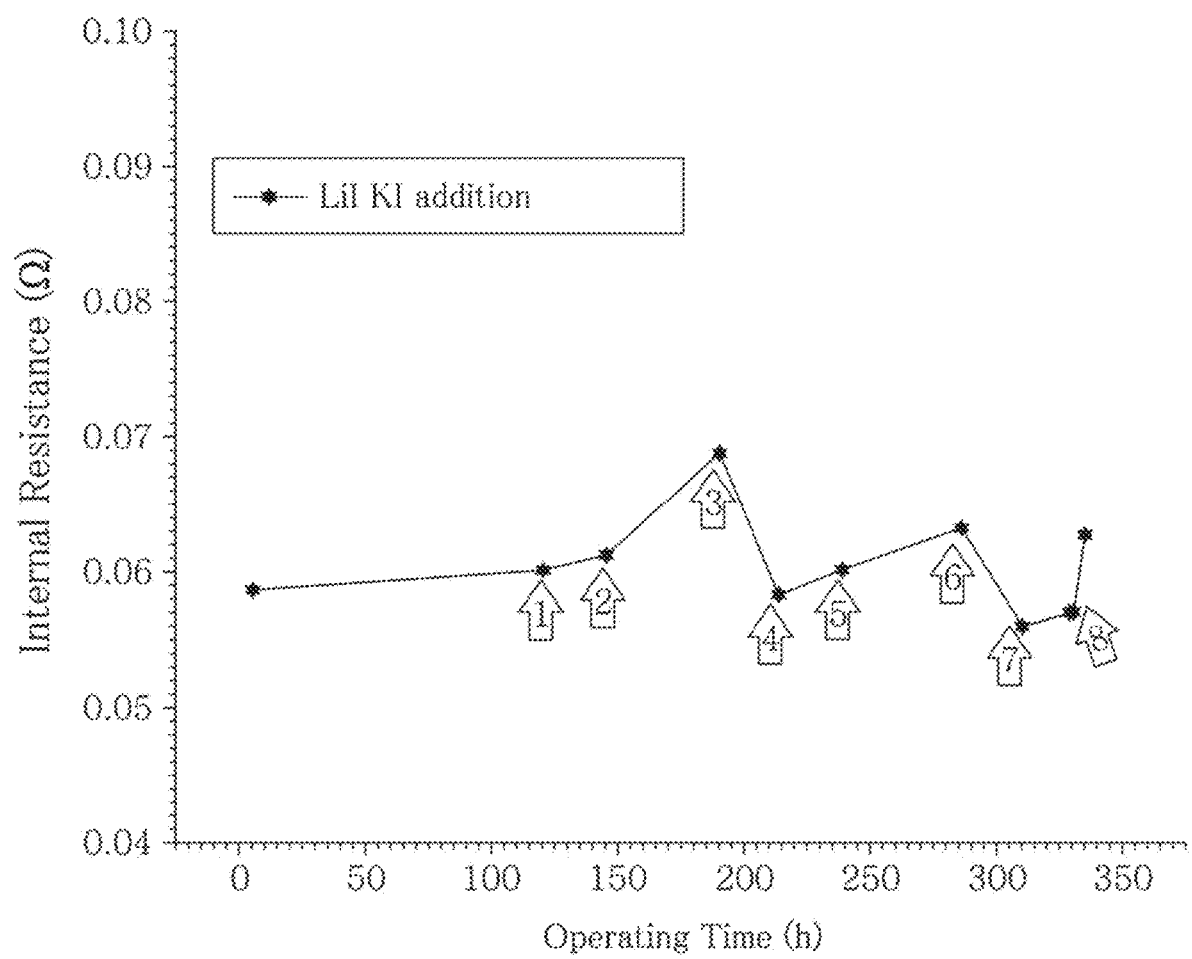
FIG. 18 is a graph illustrating a change in internal resistance (IR) of a MCFC to which a molten carbonate electrolyte is additionally supplied according to Example 2 of Experiment 2 of the present invention.

FIG. 13 is a graph illustrating a change in performance of a MCFC to which a molten carbonate electrolyte is additionally supplied according to Example 1 of Experiment 2 of the present invention;

FIG. 14 is a graph illustrating a change in electrochemical impedance spectroscopy of a MCFC to which a molten carbonate electrolyte is additionally supplied according to Example 1 of Experiment 2 of the present invention;

FIG. 15 is a graph illustrating a change in internal resistance (IR) of a MCFC to which a molten carbonate electrolyte is additionally supplied according to Example 1 of Experiment 2 of the present invention;

FIG. 16 is a graph illustrating a change in performance of a MCFC to which a molten carbonate electrolyte is additionally supplied according to Examples 2 to 4 of Experiment 2 of the present invention;

FIG. 17 is a graph illustrating a change in electrochemical impedance spectroscopy of a MCFC to which a molten carbonate electrolyte is additionally supplied according to Examples 2 to 4 of Experiment 2 of the present invention; and FIG. 18 is a graph illustrating a change in internal resistance (IR) of a MCFC to which a molten carbonate electrolyte is additionally supplied according to Example 2 of Experiment 2 of the present invention.

Comparative Example 1: Direct Input of $(Li_{0.62}K_{0.38})_2CO_3$

For comparison, an electrolyte $[(Li_{0.62}K_{0.38})_2CO_3]$ is forcibly input into the interior of a specially fabricated unit cell. The experimental results are presented in FIGS. 13 to 15. [Table 3] shows the direct input amount of $(Li_{0.62}K_{0.38})_2CO_3$ over time.

TABLE 3

| | Input order | | | | | | |
|---|---|---|---|---|---|---|---|
| | 1 | 2 | 3 | 4 | 5 | 6 | 7 |
| $Li_2CO_3$ | 0.0289 g | 0.0207 g | 0.0240 g | 0.0251 g | 0.0248 g | 0.0297 g | 0.0248 g |
| $K_2CO_3$ | 0.0311 g | 0.0223 g | 0.0258 g | 0.0269 g | 0.0267 g | 0.0318 g | 0.0266 g |
| Total | 0.0600 g | 0.0430 g | 0.0498 g | 0.0520 g | 0.0515 g | 0.0615 g | 0.0514 g |

After the normal gas input, stabilization is performed for 90 hours, and then the first input of electrolyte $(Li_{0.62}K_{0.38})_2CO_3$ is performed (about 0.05 g each time).

Referring to FIG. 13, in the initial input, the air electrode undergoes the lithiation process, which serves to make up for the consumed electrolyte, and it can be thus seen that the performance slightly increases and the IR slightly decreases. However, the opposite progress is observed from the input after the initial input. Eventually, after the last input, an increase in IR as well as a decrease in performance by 200 mV (based on 150 mA/cm$^2$) or more as compared to the initial performance are observed. This is a flooding phenomenon that exceeds the electrolyte capacity corresponding to the pore volume of matrix, cathode, and anode. Such excess of electrolyte not only prevents mass transfer of oxygen and carbonate ion but also decreases the three-phase interfaces (electrode-gas-electrolyte interface) as it forms a thick electrolyte film.

Air contains $N_2$ as well as $O_2$ and thus affects the reaction of $O_2$ which is a main reaction material at the reaction site in the air electrode. Here, it is possible to determine flooding of cell through the $O_2$ gain if the mass transfer resistance at the air electrode is increased by the excessive electrolyte.

Usually, it can be judged as flooding when the difference between the air gain and the $O_2$ gain is more than 90 mV at 150 mA/cm$^2$. Here, the $O_2$ gain in the 5th, 6th, and 7th inputs in which a decrease in performance is observed gradually increased to 82 mV, 87 mV, and 90 mV, respectively, at 150 mA/cm$^2$.

Meanwhile, the EIS measurement results in FIG. 14 shows that the $R_{CT}$ at the 10 Hz band does not greatly change, but the change in IR and the $R_{MT}$ at the 0.01 Hz band rapidly increase.

Finally, in case of IR change (see FIG. 15), IR decreases by an increase in the reaction area due to the added electrolyte at the initial stage of input. However, IR slightly increases because of an excessive amount of electrolyte in the latter input, and eventually it shows a rapid increase.

As a result, it can be judged that flooding has occurred. From these results, it can be seen that the addition of electrolyte to the interior of cell helps to improve the performance until the electrolyte is added in a certain amount at the initial stage, but the cell performance is deteriorated by an increase in the mass transfer resistance on the air electrode side when the electrolyte is added in more amount than this.

In particular, as a characteristic of performance deterioration due to excess of electrolyte, the $N_2$ cross-over at the outlet of the fuel electrode is almost similar to that at the initial stage (about 1% or less) while the cell performance deteriorates, resistance components of about 10 Hz or less increase in the impedance analysis, and the performance difference between pure oxygen and air is about 90 mV or more.

Example 1: $(Li_{0.62}K_{0.38})I$ Vapor Input

The calculations are first performed by using STANJAN chemical equilibrium solver (V3.93L IBM-PC, Stanford University 1981, 1984, 1985, 1986, 1987). As a result, it can be predicted that 100% of reactants (LiI and KI) react to generate $Li_2CO_3$ and $K_2CO_3$ when they are put as a solid phase.

As illustrated in FIG. 2, the molten carbonate electrolyte precursor LiI is put in the vessel 160 at the inlet of the air electrode, and the temperature of the vessel is controlled so as to have a desired LiI vapor pressure by using the independent temperature controller 190. Moreover, another molten carbonate electrolyte precursor KI is put in the vessel 160 at the inlet of the same air electrode, and the temperature of the vessel is controlled so as to have a desired KI vapor pressure by using the independent temperature controller 190.

Before inputting LiI and KI vapor, input of carbon dioxide gas and air (oxygen) of the air electrode gas is paused and the vessel is purged with nitrogen gas, and a carrier gas (inert gas such as helium or nitrogen, or the like) is supplied into each of the Li and KI vessels so as to supply Li vapor and KI vapor to the air electrode 120 in the MCFC unit cell 100.

$2(Li/K/Na)I+CO_2+\frac{1}{2}O_2 \rightarrow (Li/K/Na)_2CO_3+I_2$ (electrochemical reaction site in air electrode) [Reaction Formula 11]

The operating conditions for the electrolyte precursor input experiment are summarized in [Table 4].

TABLE 4

| | | |
|---|---|---|
| Temperature | | 650° C. |
| Pressure | | 1 atm |
| Sealing pressure | | 0.2 MPa |
| Gas utilization | | 0.1 at |
| (anode: H2/cathode: O$_2$ and CO$_2$) | | 150 mA/cm$^2$ |
| Gas flow rate | Anode | 357 sccm |
| Gas flow rate | Cathode | 952 sccm |
| Input gas composition | Anode | H$_2$/CO$_2$/H$_2$O = 0.72:0.18:0.1 |
| Input gas composition | Cathode | Air/CO$_2$ = 0.7:0.3 |
| Anode | | Ni—Ni5 wt % Al |
| Cathode | | In-situ Lithiated NiO |
| Matrix | | γ-LiAlO$_2$ |
| Electrolyte | | (Li/K)$_2$CO$_3$ = (70:30) |

A MCFC unit cell of 5×5 cm$^2$ is operated under the conditions presented in [Table 4], the operation thereof is temporarily stopped while maintaining the operating temperature and pressure, and nitrogen of an inert gas is then sufficiently supplied into the first gas supply device for 30 minutes for purging.

A reaction gas such as carbon dioxide and oxygen that possibly remain in the air electrode (first electrode portion) of the MCFC is thus completely removed. Thereafter, the molten carbonate electrolyte is supplied by performing the processes to be described below before the sudden performance deterioration of the MCFC occurs, that is, when the incidence rate of nitrogen cross-over is less than 1%.

In each of molten carbonate electrolyte precursor vessels 160, 300 mg of LiI powder and 228 mg of KI powder, which are solid at a room temperature, are respectively put, and the vessels are respectively inserted into the first gas supply device connected to the air electrode (first electrode) of the MCFC.

Subsequently, by using a heating device mounted outside the first gas supply device so as to enclose the vessel, the temperature of the vessels is controlled to a temperature of 469° C. or higher and 681° C. or higher being suitable for melting and vaporizing the electrolyte precursor compounds (since the melting point of LiI is 469° C. and the melting point of KI is 681° C.), and finally, the temperature of the vessels is raised to 640° C. and 750° C.

Herein, by monitoring the temperature of the vessel by using a thermocouple mounted inside the vessel, it is possible to keep the temperature of the vessel constant so that the molten carbonate electrolyte precursor powder is maintained in a molten state and has a desired vapor pressure.

A carrier gas (100 ml/min [1.67×10$^{-3}$ L/sec] of nitrogen) is input into the LiI powder completely melted in the precursor vessel 160 so that LiI vapor (about $9.2624 \times 10^{-4}$, see [Table 4]) is supplied to the air electrode (first electrode) of the MCFC.

In addition, a carrier gas (100 ml/min [$1.67 \times 10^{-3}$ L/sec] of nitrogen) is input into the KI powder completely melted in the other precursor vessel 160 so that KI vapor (about $5.7039 \times 10^{-4}$, see [Table 4]) is generated and supplied to the air electrode (first electrode) of the MCFC.

In addition, a reaction gas containing hydrogen (72%), carbon dioxide (18%), and water vapor (10%) is supplied to the fuel electrode (second electrode) of the MCFC through the second gas supply device at a flow rate of 357 ml/min.

Next, a current of 0.4279 mA/cm² (0.011 A, see Mathematical Equation 10 and Mathematical Equation 13) is applied for 542 minutes (see Mathematical Equation 11 and Mathematical Equation 14) so that the water electrolysis reaction takes place in the MCFC.

Herein, the amount of current applied is calculated by Mathematical Equation 10 and Mathematical Equation 13, and this is the sum of the calculated values. The time for current application (time required for evaporation) is calculated by Mathematical Equation 11 and Mathematical Equation 14, and the longer time among the calculated values is considered.

Amount of current applied (mA/cm²)=
$(W_{LiI,640°C} \times 6.67 \times 10^{-3}$ (L/sec)/22.4 (L/mol))$\times F$
$(A \cdot sec/mol) \times 1000 (mA/A)/$
25 cm² [Mathematical Equation 10]

Time required for LiI evaporation (min)=(amount of LiI supplied (g)/($W_{LiI,640°C} \times 0.1$ (L/min)/22.4 (L/mol)$\times (M_{LiI})$) [Mathematical Equation 11]

The amount of Li$_2$CO$_3$ generated can be calculated by Mathematical Equation 12 if the entire amount of LiI added reacts with carbon dioxide supplied by the electrochemical reaction of water electrolysis (see Reaction Formula 5) to generate Li$_2$CO$_3$ in the MCFC.

Amount of Li$_2$CO$_3$ generated (mg/cm²)=(amount of LiI supplied (g)/(2×($M_{LiI}$))× $M_{Li2CO3}$/25 cm² [Mathematical Equation 12]

In the same manner, the amount of current applied can be calculated by Mathematical Equation 13 in the case of KI, and the time required for KI evaporation can be calculated by Mathematical Equation 14. In addition, the amount of K$_2$CO$_3$ generated in the MCFC can be calculated by Mathematical Equation 15 if the entire amount of KI added reacts with carbon dioxide supplied by the electrochemical reaction of water electrolysis (see Reaction Formula 5) to generate K$_2$CO$_3$ in the MCFC.

Amount of current applied (mA/cm²)=
$(W_{KI,750°C} \times 6.67 \times 10^{-3}$ (L/sec)/22.4 (L/mol))$\times F$
$(A \cdot sec/mol) \times 1000 (mA/A)/25$ cm² [Mathematical Equation 13]

Time required for KI evaporation (min)=(amount of KI supplied (g))/($W_{KI,750°C} \times 0.1$ (L/min)/22.4 (L/mol)$\times (M_{KI})$) [Mathematical Equation 14]

Amount of K$_2$CO$_3$ generated (mg/cm²)=(amount of KI supplied (g)/(2×$M_{KI}$)× $M_{K2CO3}$/25 cm² [Mathematical Equation 15]

In Mathematical Equations 10 to 15, F is the Faraday constant, $W_{LiI,640°C}$ is the LiI vapor pressure $9.2624 \times 10^{-4}$ at the vessel temperature (640° C.), and $W_{KI,750°C}$ is the KI vapor pressures $5.7039 \times 10^{-4}$ at the vessel temperature (750° C.).

$M_{LiI}$ and $M_{KI}$ are respectively the molecular weight of LiI (133.85 g/mol) and the molecular weight of KI (166.0028 g/mol), and $M_{Li2CO3}$ and $M_{K2CO3}$ are respectively the molecular weight of Li$_2$CO$_3$ (73.89 g/mol) and the molecular weight of K$_2$CO$_3$ (138.20 g/mol).

As a result of calculation by Mathematical Equations 12 and 15, it is found that the Li$_2$CO$_3$ molten carbonate electrolyte is generated by 3.5 mg/cm² and the K$_2$CO$_3$ molten carbonate electrolyte is generated by 3.7 mg/cm².

The vapor pressure of LiI at the respective temperatures is presented in [Table 5] and the vapor pressure of KI at the respective temperatures is presented in [Table 6].

TABLE 5

| | Temp. (° C.) | N$_2$ mole fraction (vapor pressure) | LiI mole fraction (vapor pressure) | Number of moles of N$_2$ | Number of moles of LiI |
|---|---|---|---|---|---|
| LiI 0.3 g + N$_2$ 100 ccm | 550 | 0.99992 | 0.000084203 | 0.0040873 | 3.4419E−07 |
| | 598 | 0.99968 | 0.00032336 | 0.0040873 | 1.3221E−06 |
| | 600 | 0.99966 | 0.00034083 | 0.0040873 | 1.3935E−06 |
| | 610 | 0.99956 | 0.00044166 | 0.0040873 | 1.806E−06 |
| | 640 | 0.99907 | 0.00092624 | 0.0040873 | 3.7893E−06 |
| | 650 | 0.99883 | 0.0011719 | 0.0040873 | 4.7955E−06 |

TABLE 6

| | Temp. (° C.) | N$_2$ mole fraction (vapor pressure) | KI mole fraction (vapor pressure) | Number of moles of N$_2$ | Number of moles of KI |
|---|---|---|---|---|---|
| KI 0.228 g + N$_2$ 100 ccm | 700 | 0.9998 | 0.00019935 | 0.0040873 | 8.1496E−07 |
| | 750 | 0.99943 | 0.00057039 | 0.00408727 | 2.3327E−06 |

Meanwhile, Table 7 shows a change in the composition of the electrolyte generated by a change in the temperature of the electrolyte precursor vessel.

TABLE 7

| LiI precursor vessel temperature | Number of moles of Gas | mol % | mol % | Number of moles of gas | KI precursor vessel temperature |
|---|---|---|---|---|---|
| 550 | 3.44E−07 | 30% | 70% | 8.15E−07 | 700 |
| 598 | 1.32E−06 | 62% | 38% | 8.15E−07 | 700 |
| 600 | 1.39E−06 | 63% | 37% | 8.15E−07 | 700 |
| 610 | 1.81E−06 | 69% | 31% | 8.15E−07 | 700 |
| 650 | 4.8E−06 | 85% | 15% | 8.15E−07 | 700 |
| 640 | 3.79E−06 | 62% | 38% | 2.33E−06 | 750 |

It is possible to match the mole fraction of the precursor vapor phase not only at the temperatures presented in the above table but also at various other temperatures.

By using an experimental device as illustrated in FIG. 2, LiI and KI are put in the molten carbonate electrolyte precursor vessel 160, heated, and supplied to the air electrode side 120 as a gas phase for a certain time. Thereafter, as illustrated in FIG. 1B, carbon dioxide and oxygen are supplied to the air electrode side 120 by a water electrolysis method, and finally a molten carbonate electrolyte of (Li/K)$_2$CO$_3$ is converted therefrom.

Particularly, in order to have a composition of electrolyte of $(Li_{0.62}K_{0.38})_2CO_3$, 100 ccm of carrier gas (inert gas such as $N_2$, He, etc.) is allowed to flow into each precursor vessel while maintaining the temperature of the precursor vessel 160 containing 0.3 g of LiI at 640° C. and the temperature of the precursor vessel 160 containing 0.228 g KI at 750° C. by using the temperature controller 190 of the precursor input device so that the vapor pressure and molar ratio of LiI/KI vapor phase discharged from each precursor vessel 160 is 62:38.

In order to control the space time (retention time in the cell frame) and vaporization time of the precursor, 100 ccm of carrier gas is allowed to flow.

The time (min) required for vaporization of 0.3 g of LiI at 640° C. is calculated as 542.2 minutes by Mathematical Equation 11.

The time (min) required for vaporization of 0.228 g of KI at 750° C. is calculated as 539.4 minutes by Mathematical Equation 6.

The amount of current required to be applied at the time of EC mode operation is also calculated by the respective Mathematical Equations 10 and 13. The amount of current applied is 0.2659 (mA/cm$^2$) for LiI at 640° C. and 0.1638 (mA/cm$^2$) for KI at 750° C.

Meanwhile, [Table 8] shows the input schedule of $(Li_{0.62}K_{0.38})I$ electrolyte precursor vapor.

TABLE 8

| | Input order | | | | | | | |
|---|---|---|---|---|---|---|---|---|
| | 1 | 2 | 3 | 4 | 5 | 6 | 7 | 8 |
| Date | Jun. 13, 2017 | Jun. 14, 2017 | Jun. 16, 2017 | Jun. 17, 2017 | Jun. 18, 2017 | Jun. 20, 2017 | Jun. 21, 2017 | Jun. 22, 2017 |
| LiI | 0.0500 g | 0.0864 g | 0.0773 g | 0.1079 g | 0.0914 g | 0.1183 g | 0.1140 g | 0.5172 g |
| Li$_2$CO$_3$ | 0.0147 g | 0.0254 g | 0.0228 g | 0.0318 g | 0.0269 g | 0.0349 g | 0.0336 g | 0.1524 g |
| KI | 0.0380 g | 0.0656 g | 0.0587 g | 0.0821 g | 0.0694 g | 0.0899 g | 0.0866 g | 0.3931 g |
| K$_2$CO$_3$ | 0.0158 g | 0.0273 g | 0.0244 g | 0.0342 g | 0.0289 g | 0.0374 g | 0.0361 g | 0.1636 g |
| LiI + KI molten salt | 0.0880 g | 0.1520 g | 0.1360 g | 0.1900 g | 0.1608 g | 0.2082 g | 0.2006 g | 0.9103 g |

The amount of LiI and KI supplied to the cell is controlled by controlling the input time when inputting the LiI and KI electrolyte precursor vapor.

In other words, in case of inputting the entire amount of 0.3 g of LiI, it takes 9 hours according to Mathematical Equation 7 under the above experimental conditions, but the desired amount of LiI is input by inputting the LiI vapor for 1 hour and 30 minutes corresponding to ⅙ in order to actually supply 0.05 g of LiI in the first input. The amount of electrolyte precursor vapor input for each order is determined in this manner.

Gas phase input of LiI and KI is started after the normal gas is input, a stabilization time of 100 hours elapsed, and then the performance begins to decrease. Although deterioration in performance is slightly observed after initial input, this is regarded in the range of error.

It can be seen that the performance is improved through repeated gas phase input of the electrolyte precursor thereafter, and ultimately, the initial performance is maintained for a long time.

In the final input, in order to confirm the addition of molten carbonate electrolyte through the electrolyte precursor, the performance and impedance behavior of the cell are observed after excessive electrolyte precursor is intentionally input.

In the eighth input of FIG. 16, it can be seen that the performance deteriorates by a large amount of electrolyte precursor added. From this, it can be seen that in-situ input of a molten carbonate electrolyte through an electrolyte precursor has a similar behavior to direct input of $(Li_{0.62}K_{0.38})_2CO_3$ electrolyte of Comparative Example 1, and it can be confirmed that in-situ supply of electrolyte in the fuel cell through an electrolyte precursor is possible.

FIG. 17 illustrates a change in impedance at the time of supplying an electrolyte through the water electrolysis mode after input of $(Li_{0.62}K_{0.38})I$ electrolyte precursor vapor.

A phenomenon that the mass transfer resistance at 10 Hz or less greatly increased is observed when $(Li_{0.62}K_{0.38})I$ electrolyte precursor vapor is excessively input in the same manner as in the case of direct input of $(Li_{0.62}K_{0.38})_2CO_3$ electrolyte in FIG. 14.

This is in accordance with the phenomenon that the air electrode polarization resistance, particularly the air electrode mass transfer resistance, increases by the presence of an excessive amount of the molten carbonate electrolyte.

That is, as in the EIS results for direct input of $(Li_{0.62}K_{0.38})_2CO_3$, the $R_{CT}$ at 10 Hz band does not change much but IR slightly increases and $R_{MT}$ rapidly increases in the region of 10 Hz or less.

In both cases in which $(Li_{0.62}K_{0.38})_2CO_3$ electrolyte is directly input and $(Li_{0.62}K_{0.38})I$ electrolyte precursor vapor is input, the mole fraction of $N_2$ measured at the outlet of the fuel electrode is all 1% or less. It is found that the electrolyte is reliably supplied through the electrolyte precursor since the oxygen gain greatly increases to about 300 mV particularly after the $(Li_{0.62}K_{0.38})I$ electrolyte precursor vapor is excessively input.

Accordingly, it can be seen that the flooding phenomenon also occurs when the $(Li_{0.62}K_{3.38})I$ electrolyte precursor vapor.

From this, it has been confirmed that the purpose of "electrolyte addition" can be effectively achieved by inputting $(Li_{0.62}K_{0.38})I$ electrolyte precursor vapor.

In this regard, a clear performance improvement may be shown when LiOH et al. are used as the precursor compound for the electrolyte supplying method according to the example embodiments but it may be difficult to supply a desired composition of electrolyte due to their low vapor pressure in the long-term operation. LI and KI may be used since their vapor pressure is higher than that of LiOH et al. and they may form $Li_2CO_3$ and $K_2CO_3$ by a reaction of $O_2$ and $CO_2$, and further they are not hazardous to human health. Thus, LiI and KI may replace LiOH and KOH.

According to example embodiments of the present invention, it is possible to directly supply a molten carbonate electrolyte in the interior of a molten carbonate fuel cell by supplying a molten carbonate electrolyte precursor compound to a first electrode in a gaseous state and a reaction gas containing carbon dioxide to a second electrode and applying a current to the first and second electrodes or generating a current in the first and second electrodes.

In particular, in case in which the consumption of electrolyte occurs in a molten carbonate fuel cell to be operated by using a liquid electrolyte, it is possible to additionally replenish the electrolyte of the molten carbonate fuel cell by a required amount without changing the operating temperature and/or pressure of the molten carbonate fuel cell. Consequently, it is possible to solve the ultimate problem of a MCFC that the temperature of the molten carbonate fuel cell increases and the electrode structure changes by the consumptuion of the electrolyte and the accompanying cross-over phenomenon, resulting in deteriorated performance and limited operating time.

Moreover, in case in which the cell performance is much deteriorated by mechanical defects such as cracks or pinholes in the matrix and/or defects due to shortage of the molten carbonate electrolyte in the matrix caused by a long-term operation, it is possible to respectively supply a molten carbonate electrolyte precursor compound in a gaseous state or a vapor state and a reaction gas containing carbon dioxide to the first and second electrodes and then to diffuse the reaction gas from the second electrode to the first electrode by using the concentration difference of the reaction gas between the first and second electrodes and/or the pressure difference between the first and second electrodes.

Accordingly, even in case of MCFC which may exhibit relatively low performance by the above-described defects, it is possible to easily supply the molten carbonate electrolyte directly into the interior thereof (electrodes, matrix, wet seal areas, and the like). Particularly, in case in which the cell performance is low or greatly deteriorated by the above-described defects, it is possible to directly supply the molten carbonate electrolyte into the interior of the MCFC by using only the pressure difference and/or the concentration difference of the reaction gas, which thus provides an additional advantage.

In addition, according to example embodiments of the present invention, when it is required to add an electrolyte, a separate electrolyte inlet is not required for each unit cell (bipolar plate) of a large-capacity MCFC in the form of a stack but only the existing gas inlet is sufficient. As described above, it is possible to add the electrolyte without opening the stack during the operation and thus to minimize thermal damage and to cut down the cost required for manufacture and replacement of the constituents. Consequently, it is expected to be able to operate the MCFC stack up to 80,000 hours as well as to exceed the 40,000 hours of operation that breaks the breakeven point of the MCFC stack.

The embodiments or Examples of the present invention disclosed above are for illustrative purposes only and may be embodied in various forms and should not be construed as limited to the embodiments or Examples described herein.

Further, while the present invention has been described with respect to the specific embodiments or examples, it will be apparent to those skilled in the art that various changes and modifications may be made without departing from the spirit and scope of the invention as defined in the following claims.

What is claimed is:

1. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel; and
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell,
wherein the additional molten carbonate electrolyte is generated from at least one of carbonate ion, carbon dioxide and oxygen; and the gaseous molten carbonate electrolyte precursor compound.

2. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel; and
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell,
wherein the gaseous molten carbonate electrolyte precursor compound reacts with at least one of carbonate ion, carbon dioxide and oxygen to form a molten carbonate electrolyte, and
the gaseous molten carbonate electrolyte precursor compound is a material having a higher vapor pressure than lithium carbonate ($Li_2CO_3$), sodium carbonate ($Na_2CO_3$), or potassium carbonate ($K_2CO_3$) at an operating temperature of the molten carbonate fuel cell.

3. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel; and
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell,
wherein the gaseous molten carbonate electrolyte precursor compound is at least one selected from the group consisting of metal lithium (Li), $Li_2O$, LiOH and a hydrate of LiOH, LiF, LiCl, Li, $Li_3N$, $LiNH_2$, $Li_2C_2$, $LiMoO_4$, $LiAlH_4$, LiSn, LiPb, LiTi, LiHg, $Li_3Sb_2$, $Li_3Bi$, $Li_2SO_4$, $LiOCH_3$, $LiOC_2H_5$, metal sodium (Na), $Na_2O$, NaOH and a hydrate of NaOH, NaF, NaCl, NaI, $Na_3N$, $NaNH_2$, $Na_2SO_4$, $Na_2C_2O_4$, $NaC_2H_3O_2$, $NaOCH_3$, $NaOC_2H_5$, metal potassium (K), $K_2O$, KOH and a hydrate of KOH, KF, KCl, KI, $K_3N$, $KNH_2$, and $K_2SO_4$.

4. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel; and
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell,
wherein the gaseous molten carbonate electrolyte precursor compound comprises
LiI and KI;
LiI and NaI;
LiI, KI, and NaI;
LiI and KOH; or
LiI, KOH, and NaI.

5. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or a liquid molten carbonate electrolyte precursor compound in the molten carbonate electrolyte precursor vessel;
supplying the gaseous molten carbonate electrolyte precursor compound to a first electrode of the molten carbonate fuel cell;
supplying a reaction gas containing carbon dioxide to a second electrode of the molten carbonate fuel cell,
wherein the additional molten carbonate electrolyte is generated from at least one of a carbonate ion, carbon dioxide, or oxygen, and the gaseous molten carbonate electrolyte precursor compound,
wherein the carbonate ion is generated from the reaction gas and transfers to an electrochemical reaction site in the first electrode, and carbon dioxide is not supplied to the first electrode,
wherein oxygen generated from carbonate ion reacts with the molten carbonate electrolyte precursor compound to produce a molten carbonate electrolyte intermediate precursor compound, and the molten carbonate electrolyte intermediate precursor compound reacts with the carbon dioxide generated from carbonate ion to generate the molten carbonate electrolyte.

6. A method for supplying molten carbonate fuel cell with electrolyte, the method comprising:
providing a molten carbonate electrolyte precursor vessel outside a molten carbonate comprising a molten carbonate electrolyte;
generating a gaseous molten carbonate electrolyte precursor compound from a solid or liquid molten carbonate electrolyte precursor compound in the molten carbonate electrolyte precursor vessel;
supplying the molten carbonate electrolyte precursor compound generated in the molten carbonate electrolyte precursor vessel to a first electrode in a gaseous state;
supplying a reaction gas containing carbon dioxide to a second electrode; and
generating a molten carbonate electrolyte from carbonate ion and the molten carbonate electrolyte precursor compound in the molten carbonate fuel cell, thereby providing the molten carbonate electrolyte to the molten carbonate fuel cell;
wherein the carbonate ion is generated from the reaction gas and transfers to an electrochemical reaction site in the first electrode, and carbon dioxide is not supplied to the first electrode, and
wherein a mixed gas of a gaseous molten carbonate electrolyte precursor compound and a carrier gas which does not react with the first electrode is provided to the first electrode.

7. The method for supplying molten carbonate fuel cell with electrolyte according to claim 6, wherein the generating the molten carbonate electrolyte precursor compound from the solid molten carbonate electrolyte precursor compound comprises melting a molten carbonate electrolyte precursor compound powder.

8. The method for supplying molten carbonate fuel cell with electrolyte according to claim 6, wherein the generating the gaseous molten carbonate electrolyte precursor compound from the solid molten carbonate electrolyte precursor compound comprises dissolving a molten carbonate electrolyte precursor compound powder in a solvent and heating the solvent.

9. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel; and
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell,
wherein the gaseous molten carbonate electrolyte precursor compound is a compound comprising at least one selected from the group consisting of lithium (Li), sodium (Na) and potassium (K); or
a compound comprising at least one selected from the group consisting of lithium (Li), sodium (Na) and potassium (K) and additionally comprising at least one selected from the group consisting of cesium (Cs), lanthanum (La), and rubidium.

10. The method for supplying molten carbonate fuel cell with electrolyte according to claim 9, wherein the additional molten carbonate electrolyte is a Li—K-based molten carbonate electrolyte, a Li—Na-based molten carbonate electrolyte, or a Li—Na—K-based molten carbonate electrolyte; or
the additional molten carbonate electrolyte is a Li—K-based molten carbonate electrolyte, a Li—Na-based molten carbonate electrolyte, or a Li—Na—K-based molten carbonate electrolyte which additionally comprises at least one selected from the group consisting of $(Cs)Cs_2O$, $CsO_2$, CsH, CsF, CsCl, CsBr, CsI, CsOH and a hydrate of CsOH, $Cs_2CO_3$, metal rubidium (Rb), $Rb_2O$, RbH, RbF, RbCl, RbI, RbOH and a hydrate of RbOH, $Rb_2CO_3$, metal lanthanum (La), $La_2O_3$, LaH, LaN, LaC, LaF, $LaCl_2$, $LaCl_3$, $LaBr_3$, $La_3$, $LaC_2$, and $La_2CO_3$.

11. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel;
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell;
supplying the gaseous molten carbonate electrolyte precursor compound to a first electrode of the molten carbonate fuel cell; and
supplying a reaction gas containing carbon dioxide to a second electrode of the molten carbonate fuel cell, wherein
the reaction gas transfers to an electrochemical reaction site in the first electrode by either of a concentration difference of the reaction gas between the first and second electrodes or a pressure difference between the first and second electrodes.

12. The method for supplying molten carbonate fuel cell with electrolyte according to claim 11, wherein:
the reaction gas comprises carbon dioxide, water vapor and hydrogen; or the reaction gas comprises carbon dioxide and oxygen or oxygen-containing gas, and
the additional molten carbonate electrolyte is generated by a reaction of at least one of carbon dioxide and oxygen with the gaseous molten carbonate electrolyte precursor compound.

13. A method for supplying molten carbonate fuel cell with electrolyte, the method comprising:
providing a molten carbonate electrolyte precursor vessel outside a molten carbonate fuel cell comprising a molten carbonate electrolyte;
generating a gaseous molten carbonate electrolyte precursor compound from a solid or liquid molten carbonate electrolyte precursor compound in the molten carbonate electrolyte precursor vessel;
generating additional molten carbonate electrolyte from the gaseous molten carbonate electrolyte precursor compound generated in the molten carbonate electrolyte precursor vessel, thereby providing the additional molten carbonate electrolyte to the molten carbonate fuel cell;
supplying the gaseous molten carbonate electrolyte precursor compound to a first electrode of the molten carbonate fuel cell; and
supplying a reaction gas containing carbon dioxide to a second electrode of the molten carbonate fuel cell,
wherein the additional molten carbonate electrolyte is generated from carbonate ion and the gaseous molten carbonate electrolyte precursor compound, and
wherein the carbonate ion is generated from the reaction gas and transfers to an electrochemical reaction site in the first electrode, and carbon dioxide is not supplied to the first electrode.

14. The method for a supplying molten carbonate fuel cell with electrolyte according to claim 13, wherein the molten carbonate fuel cell is operated in a fuel cell mode in which a current is output,
the first electrode is a fuel electrode and the second electrode is an air electrode,
a reaction gas containing oxygen or oxygen-containing gas and carbon dioxide is supplied to the air electrode, and
carbonate ion generated in the air electrode by generating a current transfers to the fuel electrode and a molten carbonate electrolyte is generated at the fuel electrode.

15. The method for supplying molten carbonate fuel cell with electrolyte according to claim 13, wherein the additional molten carbonate electrolyte is generated by a reaction of at least one of oxygen and carbon dioxide generated from carbonate ion with the gaseous molten carbonate electrolyte precursor compound.

* * * * *